US012486243B2

(12) United States Patent
Schaub et al.

(10) Patent No.: US 12,486,243 B2
(45) Date of Patent: Dec. 2, 2025

(54) PROCESS FOR PREPARING CYCLIC CARBONATES WITH AN EXOCYCLIC VINYLIDENE GROUP

(71) Applicant: BASF SE, Ludwigshafen am Rhein (DE)

(72) Inventors: Thomas Schaub, Ludwigshafen (DE); Peter Rudolf, Ludwigshafen (DE); Ulrike Licht, Ludwigshafen (DE); A. Stephen K. Hashmi, Heidelberg (DE); Saumya Dabral, SN Heerenveen (NL); Chloe Johnson, Heidelberg (DE)

(73) Assignee: BASF SE, Ludwigshafen am Rhein (DE)

( * ) Notice: Subject to any disclaimer, the term of this patent is extended or adjusted under 35 U.S.C. 154(b) by 813 days.

(21) Appl. No.: 17/758,683

(22) PCT Filed: Jan. 5, 2021

(86) PCT No.: PCT/EP2021/050039
§ 371 (c)(1),
(2) Date: Jul. 12, 2022

(87) PCT Pub. No.: WO2021/144162
PCT Pub. Date: Jul. 22, 2021

(65) Prior Publication Data
US 2023/0094796 A1  Mar. 30, 2023

(30) Foreign Application Priority Data

Jan. 15, 2020  (EP) .................................... 20152025

(51) Int. Cl.
| | | |
|---|---|---|
| C07D 317/40 | (2006.01) | |
| B01J 31/04 | (2006.01) | |
| B01J 31/18 | (2006.01) | |
| B01J 31/24 | (2006.01) | |

(52) U.S. Cl.
CPC ............ *C07D 317/40* (2013.01); *B01J 31/04* (2013.01); *B01J 31/18* (2013.01); *B01J 31/2404* (2013.01); *B01J 2231/49* (2013.01); *B01J 2531/17* (2013.01)

(58) Field of Classification Search
CPC .................................................. C07D 317/40
See application file for complete search history.

(56) References Cited

U.S. PATENT DOCUMENTS

| | | |
|---|---|---|
| 6,639,114 B2 | 10/2003 | Ahlers et al. |
| 2013/0059178 A1 | 3/2013 | Ihara et al. |

FOREIGN PATENT DOCUMENTS

| | | |
|---|---|---|
| WO | WO-2011/157671 A1 | 12/2011 |
| WO | WO-2019/034648 A1 | 2/2019 |

OTHER PUBLICATIONS

International Preliminary Report on Patentability dated Jul. 19, 2022, in PCT/EP2021/050039, 8 pages.
Babunêk, et al., "Heavy fluorous phosphine-free ruthenium catalysts for alkene metathesis", Journal of Fluorine Chemistry, vol. 161, May 2014, pp. 66-75.
Barraza, et al., "Unexpected Rearrangement of 2-Bromoaniline under Biphasic Alkylation Conditions", Synlett, vol. 28, Issue 20, 2017, pp. 2891-2895.
Chen, et al., "Tuning the basicity of ionic liquids for efficient synthesis of alkylidene carbonates from CO 2 at atmospheric pressure", Chemical Communications, vol. 52, Issue 50, May 17, 2016, pp. 7830-7833.
Dabral, et al., "Silver-Catalyzed Carboxylative Cyclization of Primary Propargyl Alcohols with CO2", Organic Letters, vol. 21, Issue 5, Feb. 20, 2019, pp. 1422-1425.
Dabral, et al., "Synthesis and polymerisation of α-alkylidene cyclic carbonates from carbon dioxide, epoxides and the primary propargylic alcohol 1,4-butynediol", Green Chemistry, vol. 22, Issue 5, Feb. 6, 2020, pp. 1553-1558.
Extended European Search Report for EP Patent Application No. 20152025.1, Issued on May 28, 2020, 4 pages.
Frémont, et al., "Carbenes: Synthesis, properties, and organometallic chemistry", Coordination Chemistry Reviews, vol. 253, Issue 7-8, Apr. 2009, pp. 862-892.
Hu, et al., "Transformation of CO2 into α-alkylidene cyclic carbonates at room temperature cocatalyzed by CuI and ionic liquid with biomass-derived levulinate anion", ACS Sustainable Chemistry & Engineering, vol. 7, Issue 6, Feb. 26, 2019, pp. 5614-5619.
International Search Report for PCT Patent Application No. PCT/EP2021/050039, Issued on Feb. 16, 2021, 5 pages.
Johnson, et al., "Liquidliquidphase Synthesis of exoVinylene Carbonates from Primary Propargylic Alcohols: Catalyst Design and Recycling", Chemcatchem, Vo. 13, Issue 1, Jan. 12, 2021, pp. 353-361.
Li, et al., "A Microfluidic System for the Continuous Recycling of Unmodified Homogeneous Palladium Catalysts through Liquid/Liquid Phase Separation", ChemCatChem, vol. 5, Issue 7, May 16, 2013, pp. 1729-1733.
Müller, et al., "Chapter 3: Apparatus", Liquid-Liquid Extraction, Ullmann's Encyclopedia of Industrial Chemistry, vol. 21, ed. Ley, et al., Jan. 15, 2008, pp. 267-288.
Nakano, et al., "Efficient catalyst removal and recycling in copolymerization of epoxides with carbon dioxide via simple liquid-liquid phase separation", Chemical Communications, vol. 49, Issue 81, Sep. 3, 2013, pp. 9332-9334.

(Continued)

*Primary Examiner* — Matthew P Coughlin
(74) *Attorney, Agent, or Firm* — Grüneberg and Myers PLLC

(57) ABSTRACT

A process can be used for preparing cyclic carbonates with an exocyclic vinylidene group by reacting a propargylic alcohol with $CO_2$ in the presence of a silver catalyst having at least one bulky ligand a lipophilic carboxylate ligand. After completion of the reaction, the catalyst is separated from the cyclic carbonate by the use of two organic solvents of different polarity and having a miscibility gap. The silver catalyst is enriched in the less polar solvent and the cyclic carbonate in the more polar solvent.

10 Claims, No Drawings

(56) References Cited

OTHER PUBLICATIONS

Tomori, et al., "An improved synthesis of functionalized biphenyl-based phosphine ligands", The Journal of Organic Chemistry, vol. 65, Issue 17, Aug. 2, 2000, pp. 5334-5341.

Yuan, et al., "A recyclable AgI/OAc-catalytic system for the efficient synthesis of α-alkylidene cyclic carbonates: carbon dioxide conversion at atmospheric pressure", Green Chemistry, vol. 19, Issue 13, Apr. 17, 2017, pp. 2936-2940.

Zhao, et al., "Remarkable synergistic effect between copper (I) and ionic liquids for promoting chemical fixation of CO2", Journal of CO2 Utilization, vol. 22, Dec. 2017, pp. 374-381.

Written Opinion for PCT Patent Application No. PCT/EP2021/050039, Issued on Feb. 16, 2021. 6 pages.

PROCESS FOR PREPARING CYCLIC CARBONATES WITH AN EXOCYCLIC VINYLIDENE GROUP

CROSS-REFERENCE TO RELATED APPLICATIONS

This application is the National Stage entry under § 371 of International Application No. PCT/EP2021/050039, filed on Jan. 5, 2021, and which claims the benefit of priority to European Application No. 20152025.1, filed on Jan. 15, 2020. The content of each of these applications is hereby incorporated by reference in its entirety.

BACKGROUND OF THE INVENTION

Field of the Invention

The present invention relates to a process for preparing cyclic carbonates with an exocyclic vinylidene group by reacting a propargylic alcohol with $CO_2$ in the presence of a silver catalyst having at least one bulky ligand a lipophilic carboxylate ligand, where after completion of the reaction the catalyst is separated from the cyclic carbonate by the use two organic solvents of different polarity and having a miscibility gap, where the silver catalyst is enriched in the less polar solvent and the cyclic carbonate in the more polar solvent.

Description of Related Art Technical Background

Cyclic carbonates with an exocyclic vinylidene group are valuable compounds, especially for the use in electrolytes for batteries, as described in US 2013/0059178, or as monomers in polymer applications, as described in WO 2011/157671.

Cyclic carbonates having no other substituent apart from the exocyclic vinylidene group (to be more precise no substituent in the 5-position, relative to the 1,3-positions of the oxygen ring atom, the 2-position of the oxo group and the 4-position of the vinylidene group) are available via the reaction of the corresponding primary propargylic alcohols with $CO_2$ using silver catalysts with a bulky ligand, as described in Organic Letters 2019, 21, 1422-1425 or in WO 2019/034648. The reaction is carried out in an organic solvent like dichloromethane or acetone. In case of volatile products, the product can be separated from the catalyst via distillation and the catalyst recycled, requiring simply the addition of new solvent and reagent to start a new reaction cycle, as described in WO 2019/034648. But for non-volatile or thermally instable exo-vinylidene carbonates, this method cannot be applied, and the products must be separated from the catalyst via column chromatography, as also described in WO 2019/034648. For processes on a technical scale, work-up of the reaction mixture via column chromatography is not economical due to its high costs; moreover, the catalyst cannot be recycled in a simple manner.

Chem. Commun. 2016, 52, 7830-7833, ACS Sustainable Chem. Eng. 2019, 7, 5614-5619, Green Chem. 2017, 19, 2936-2940 and Journal of $CO_2$ Utilization 2017, 22, 374-381 describe the synthesis of 5,5-disubstituted cyclic carbonates with an exocyclic vinylidene group in 4-position by reaction of a tertiary propargylic alcohol with $CO_2$ in the presence of a silver or copper catalyst in the presence of an ionic liquid. The ionic liquid serves both as solvent and as a base. The product is separated from the reaction mixture by extraction with hexane.

While ionic liquids are useful and versatile agents on a laboratory scale, in view of their price they are not suitable for processes on industrial scale. Moreover, the above approach works only in the case of non-polar cyclic carbonates which are well extractable into the hexane phase. More polar products remain in the ionic liquid phase. If these are non-volatile or thermally instable, they cannot be separated from the ionic liquid by distillation. As explained above, for processes on a technical scale, work-up of the reaction mixture via column chromatography is not economical due to its high costs; moreover, the catalyst cannot be recycled in a simple manner.

SUMMARY OF THE INVENTION

It was therefore an object of the present invention to provide an economic process for preparing cyclic carbonates from primary propargylic alcohols and $CO_2$ which allows a simple separation of the catalyst from the product and which does not have to resort to expensive means, such as the use of ionic liquids as solvents. Especially, the method should also allow the economic preparation of non-volatile or thermally instable exo-vinylidene carbonates.

SUMMARY OF THE INVENTION

The object is achieved by a process for preparing cyclic carbonates I selected from the group consisting of compounds of formula Ia, compounds of formula Ib and mixtures thereof

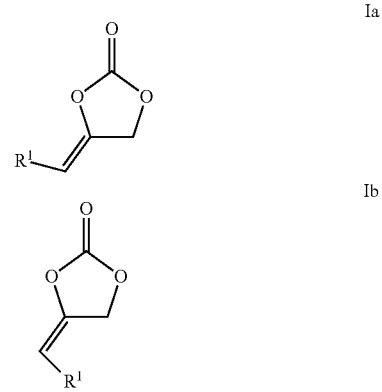

wherein
$R^1$ is an organic radical;
comprising the steps of
a) reacting a propargyl alcohol of formula II

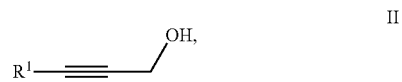

wherein $R^1$ is as defined above,
with carbon dioxide,
where the reaction is carried out in at least one organic solvent L1 or in a solvent mixture containing at least one organic solvent L1 and at least one organic solvent L2; where solvent L1 has a higher polarity than solvent L2, and where solvents L1 and L2 have a miscibility gap at least between 20 and 30° C.

where the reaction is further carried out in the presence of a silver catalyst Ag1 comprising at least one bulky ligand a carboxylate ligand, where the bulky ligand is selected from the group consisting of ligands of the formula III and ligands of the formula IV

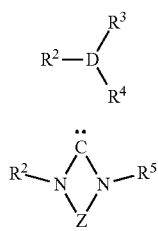

wherein

D is P, As or Sb;

each $R^2$ is independently an organic radical having from 1 to 40 carbon atoms;

$R^3$ and $R^4$ are identical or different, and are each an organic radical having from 1 to 40 carbon atoms, $R^5$ is an organic radical having from 1 to 40 carbon atoms and may be different from or identical to $R^2$ present in ligand IV;

and

Z is a divalent bridging group selected from $-CR^7{=}CR^8-$, $-CR^7{=}N-$, $-CR^7R^9-CR^8R^{10}-$ and $-CR^7R^9-CR^8R^{10}-CR^{11}R^{12}-$, wherein $R^7$, $R^8$, $R^9$, $R^{10}$, $R^{11}$ and $R^{12}$, independently of each other, are hydrogen or an organic radical having from 1 to 40 carbon atoms; or two adjacent radicals $R^7$ and $R^8$ and/or $R^{10}$ and $R^{11}$ together with the atoms connecting them form a monocyclic or polycyclic, substituted or unsubstituted, aliphatic or aromatic ring system which has from 4 to 40 carbon atoms and can also comprise at least one heteroatom selected from the group consisting of the elements Si, Ge, N, P, O and S as ring member;

and where the carboxylate ligand is according to formula V

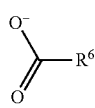

wherein $R^6$ is an organic radical having from 1 to 40 carbon atoms;

b1) in case that step a) has not been carried out in the presence of at least one solvent L2, adding solvent L2 to the reaction mixture obtained in step a);

b2) in case that step a) has been carried out in the presence of at least one solvent L2: optionally adding solvent L2 to the reaction mixture obtained in step a);

c) subjecting the reaction mixture obtained in step a) or b1) or step b2) to a phase separation to obtain a product phase containing the cyclic carbonate I and the at least one solvent L1, and a catalyst phase containing the silver catalyst and the at least one solvent L2; and d) if desired isolating the cyclic carbonate I from the product phase.

As a matter of course, the reaction mixture obtained in step a) is subjected to phase separation step c) only if in step a) a solvent mixture of L1 and L2 has been used and if optional step b2) has not been carried out. If in step a) only L1 (and no L2) has been used, the reaction mixture obtained in step b1) is subjected to phase separation step c). If in step a) a solvent mixture of L1 and L2 has been used and if optional step b2) has been carried out, the reaction mixture obtained in step b2) is subjected to phase separation step c).

DETAILED DESCRIPTION OF THE INVENTION

Definitions

If above or below it is defined that group $R^1$ in compound II (including A in compound II-bis or Poly or Y in II-poly) is "as defined above" (meaning $R^1$ is as defined in context with compound I), this does not necessarily imply that $R^1$ remains unchanged in the reaction of compound II with $CO_2$. Some groups which may be present in $R^1$ may react with $CO_2$ and result in compounds I with a radical $R^1$ different from $R^1$ in the starting compound II. For instance, if $R^1$ comprises oxiranyl groups, some or all of these may react under ring opening with $CO_2$. Generally however, $R^1$ is inert to the reaction conditions and is thus the same in the starting compounds II and the final compounds I.

In the present description, the term radical is used interchangeably with the term group, when defining the variables $R^x$ in the presented formulas.

The term "halogen" denotes in each case fluorine, chlorine, bromine or iodine.

The term "organic radical" as used in the present text refers to any radical having at least one carbon atom. The radical may also comprise heteroatoms, such as halogen atoms, N, O, S, Si or Ge. "Comprise" means that the organic radical may be substituted by a heteroatom-containing radical, may be interrupted by a heteroatom or heteroatom-containing group and/or may be bound via a heteroatom or heteroatom containing group. In general, the organic radical is however bound via a carbon atom to the remainder of the molecule. The organic radical is generally derived from a discrete molecule (a discrete molecule being a molecule with a defined molecular weight, as opposed to molecular weight distribution, such as is the case for polymers), but the organic radical $R^1$ may also be derived from a polymer. In the latter case, i.e. if $R^1$ is derived from a polymer, the starting compound II generally contains more than one group $-C{\equiv}C-CH_2OH$. This group may be bound directly or via a linking group to the polymer backbone. Just by way of example, a polymer or a monomer containing carboxyl groups or carboxyl derivatives prone to (trans)esterification reactions or containing oxiranyl rings such as present in glycidyl residues or containing chlorohydrin residues or isocyanate groups ($-NCO$) or other groups in the side chains which can react with an alcohol group may be reacted with 1,4-butynediol or another diol with a propargylic alcohol group to give a (polymeric) compound II in which $R^1$ is derived from a polymer containing numerous groups $-C{\equiv}C-CH_2OH$ in its side chain. If a monomer is reacted with 1,4-butynediol or another diol with a propargylic alcohol group, the polymer is of course obtained after polymerization of this monomer. In the product I resulting from reaction of the polymer with $CO_2$, $R^1$ is derived from a polymer containing numerous cyclic carbonate groups (to be more precise 1,3-dioxolan-2-one-4-yl rings) bound via an exocyclic vinylidene group. Alternatively, the monomer can be first reacted with $CO_2$ under the reaction conditions described above and below to give a monomer containing an exo-vinylidene-bound cyclic carbonate and the monomer is polymerized subsequently. Just by way of example, a polyacrylic acid or polymethacrylic acid or a polyacrylate or polymethacrylate prone to transesterification can be esterified with 1,4-butynediol to give a polymer with repeat units —[—$CH_2$—CH(C(=O)O$CH_2$C≡$CH_2$OH)—]— or —[—$CH_2$—C($CH_3$)(C(=O)O$CH_2$C≡$CH_2$OH)—]—; or a polyacrylate or polymethacrylate containing —NCO groups in the alcohol-derived part of the ester (the alcohol-derived part being e.g. derived from HO—$CH_2CH_2$—NCO) can be reacted in an addition reaction with 1,4-butynediol to give a polymer with repeat units —[—$CH_2$—CH(C(=O)O—$CH_2CH_2$—NH—C(=O)—O—$CH_2$C≡$CH_2$OH)—]— or —[—$CH_2$—C($CH_3$)(C(=O)O—$CH_2CH_2$—NH—C(=O)—O—$CH_2$C≡$CH_2$OH)—]—; or a polyacrylate or polymethacrylate containing glycidyl residues or chlorohydrin residues in the alcohol-derived part of the ester can be reacted in an addition or substitution reaction with 1,4-butynediol. Alternatively, a corresponding acrylate or methacrylate monomer is first prepared by the above-described esterification/addition/substitution reactions and then polymerized. In yet another alternative, a corresponding acrylate or methacrylate monomer (I.e. a (meth)acrylate containing —C≡C—$CH_2$OH in its alcohol-derived part can be grafted on a polymer with a suitable backbone, e.g. on a polyethylene or polypropylene polymer.

The term "organic radical having from 1 to 40 carbon atoms" as used in the present text refers to any radical having at least one carbon atom. The radical may also comprise heteroatoms, such as halogen atoms, N, O, S, Si or Ge. "Comprise" means that the organic radical may be substituted by a heteroatom-containing radical, may be interrupted by a heteroatom or heteroatom-containing group and/or may be bound via a heteroatom or heteroatom containing group. Examples are $C_1$-$C_{40}$-alkyl radicals, fluorinated $C_1$-$C_{10}$-alkyl radicals, $C_1$-$C_{12}$-alkoxy radicals, saturated, partially unsaturated or maximally unsaturated (including heteroaromatic) heterocyclic radicals containing 3 to 20 carbon atoms and one or more heteroatoms selected from N, O and S as ring members, $C_6$-$C_{40}$-aryl radicals, $C_6$-$C_{10}$-fluoroaryl radicals, $C_6$-$C_{10}$-aryloxy radicals, silyl radicals having from 3 to 24 carbon atoms, $C_2$-$C_{40}$-alkenyl radicals, $C_2$-$C_{40}$-alkynyl radicals, $C_7$-$C_{40}$-arylalkyl radicals or $C_8$-$C_{40}$-arylalkenyl radicals. An organic radical is in each case derived from an organic compound. Thus, the organic compound methanol can in principle give rise to three different organic radicals having one carbon atom, namely methyl ($H_3$C—), methoxy ($H_3$C—O—) and hydroxymethyl (HOC($H_2$)—).

Aliphatic radicals are radicals which contain no cycloaliphatic, aromatic or heterocyclic constituents. Examples are alkyl, alkenyl, and alkynyl radicals. If the term "aliphatic radical" as used herein is used without prefix ($C_n$-$C_m$), it indicates aliphatic radicals having in general 1 to 40 carbon atoms, preferably 1 to 30 carbon atoms, in particular 1 to 20 carbon atoms, specifically 1 to 10 or 1 to 6 or 1 to 4 carbon atoms. As a matter of course, alkenyl, and alkynyl radicals have at least 2 carbon atoms.

Cycloaliphatic or alicyclic radicals may contain one or more, e.g., one or two, alicyclic radicals; however, they contain no aromatic or heterocyclic constituents. Examples are cycloalkyl and cycloalkenyl radicals. If the term "cycloaliphatic radical" as used herein is used without prefix ($C_n$-$C_m$), it indicates aliphatic radicals having in general 3 to 40 carbon atoms, preferably 3 to 30 carbon atoms, in particular 3 to 20 carbon atoms, specifically 3 to 10 or 3 to 6 carbon atoms.

Aromatic radicals or aryl (radicals) are mono-, bi- or polycyclic carbocyclic (i.e. without heteroatoms as ring members) aromatic radicals. One example for a monocyclic aromatic radical is phenyl. In bicyclic aryl rings two aromatic rings are condensed, i.e. they share two vicinal C atoms as ring members. One example for a bicyclic aromatic radical is naphthyl. In polycyclic aryl rings, three or more rings are condensed. Examples for polycyclic aryl radicals are phenanthrenyl, anthracenyl, tetracenyl, 1H-benzo[a]phenalenyl, pyrenyl and the like. In the terms of the present invention "aryl" encompasses however also bi- or polycyclic radicals in which not all rings are aromatic, as long as at least one ring is; especially if the reactive site is on the aromatic ring (or on a functional group bound thereto). Exam pies are indanyl, indenyl, tetralinyl, 6,7,8,9-tetrahydro-5H-benzo[7]annulenyl, fluorenyl, 9,10-dihydroanthracenyl, 9,10-dihydrophenanthrenyl, 1H-benzo[a]phenalenyl and the like, and also ring systems in which not all rings are condensed, but for example spiro-bound or bridged, such as benzonorbornyl. In particular, the aryl group has 6 to 30, more particularly 6 to 20, specifically 6 to 10 carbon atoms as ring members.

Mixed aliphatic-cycloaliphatic radicals contain at least one aliphatic radical and also at least one cycloaliphatic radical, the bonding site to the remainder of the molecule being located either on a cycloaliphatic radical or on an aliphatic radical.

Mixed aliphatic-aromatic radicals contain at least one aliphatic radical and also at least one aromatic radical, the bonding site to the remainder of the molecule being located either on an aromatic radical or on an aliphatic radical.

Mixed cycloaliphatic-aromatic radicals contain at least one cycloaliphatic radical and also at least one aromatic radical, the bonding site to the remainder of the molecule being located either on a cycloaliphatic radical or on an aromatic radical.

Mixed aliphatic-cycloaliphatic-aromatic radicals contain at least one aliphatic radical, at least one cycloaliphatic radical and also at least one aromatic radical, the bonding site to the remainder of the molecule being located either on an aliphatic radical or on a cycloaliphatic radical or on an aromatic radical.

If the aliphatic residues in the aliphatic, mixed aliphatic-cycloaliphatic, mixed aliphatic-aromatic and mixed aliphatic-cycloaliphatic-aromatic radicals are interrupted by one or more non-adjacent groups —O—, —S—, —N($R^{13}$)—, —O—C(=O)—, —C(=O)—O—, —N($R^{13}$)—C(=O)—, —C(=O)—N($R^{13}$)—, —O—C(=O)—O—, —O—C(=O)—N($R^{13}$)—, —N($R^{13}$)—C(=O)—O— and/or —N($R^{13}$)—C(=O)—N($R^{13}$)—, this results for example in an aliphatic radical being substituted by a group —O—$R^x$, —S—$R^x$, —N($R^{13}$)—$R^x$, —O—C(=O)—$R^x$, —C(=O)—O—$R^x$, —N($R^{13}$)—C(=O)—$R^x$, —C(=O)—N($R^{13}$)—$R^x$, —O—C(=O)—O—$R^x$, —O—C(=O)—N($R^{13}$)—$R^x$, —N($R^{13}$)—C(=O)—O—$R^x$ and/or —N($R^{13}$)—C(=O)—N($R^{13}$)—$R^x$, where $R^x$ is an aliphatic radical.

If the cycloaliphatic residues in the cycloaliphatic, mixed aliphatic-cycloaliphatic, mixed cycloaliphatic-aromatic and mixed aliphatic-cycloaliphatic-aromatic radicals are interrupted by one or more non-adjacent groups —O—, —S—, —N(R$^{13}$)—, —O—C(=O)—, —C(=O)—O—, —N(R$^{13}$)—C(=O)—, —C(=O)—N(R$^{13}$)—, —O—C(=O)—O—, —O—C(=O)—N(R$^{13}$)—, —N(R$^{13}$)—C(=O)—O— and/or —N(R$^{13}$)—C(=O)—N(R$^{13}$)—, this results in a saturated or partially unsaturated heterocyclic ring containing the one or more of the above groups as ring members. Just to illustrate such rings, if the cycloaliphatic residues are interrupted by a group —O—, —S— or —N(R$^{13}$)—, this results, for example, in an oxiranyl, thiiranyl, aziridinyl, oxetanyl, thietanyl, azetidinyl, furanyl, dihydrofuranyl, tetrahydrofuranyl, thienyl, dihydrothienyl, tetrahydrothienyl, pyrrolidinyl, pyrrolinyl, pyrrolyl, pyranyl, dihydropyranyl, tetrahydropyranyl, thioypyranyl, dihydrothiopyranyl, tetrahydrothioipyranyl, piperidinyl, di hydropyridinyl, tetrahydropyridinyl, pyridinyl, etc. ring.

If the aromatic residues in the aromatic, mixed aliphatic-aromatic, mixed aliphatic-aromatic, mixed cycloaliphatic-aromatic and mixed aliphatic-cycloaliphatic-aromatic radicals are interrupted by one or more non-adjacent groups —O—, —S—, —N(R$^{13}$)—, —O—C(=O)—, —C(=O)—O—, —N(R$^{13}$)—C(=O)—, —C(=O)—N(R$^{13}$)—, —O—C(=O)—O—, —O—C(=O)—N(R$^{13}$)—, —N(R$^{13}$)—C(=O)—O— and/or —N(R$^{13}$)—C(=O)—N(R$^{13}$)—, this results in a partially unsaturated or maximally unsaturated heterocyclic ring, including heteroaromatic rings.

Aliphatic bridging groups are divalent aliphatic radicals. These do not contain any cycloaliphatic, aromatic or heterocyclic constituents. Examples are alkylene, alkenylene, and alkynylene radicals.

Cycloaliphatic bridging groups are divalent cycloaliphatic radicals. Divalent cycloaliphatic radicals may contain one or more, e.g., one or two, cycloaliphatic radicals. The cycloaliphatic radicals may be substituted by aliphatic radicals, but the bonding sites to the remainder of the molecule which they bridge are located on the cycloaliphatic radical.

Aromatic bridging groups are divalent aromatic radicals. Divalent aromatic radicals may contain one or more, e.g., one or two, aromatic radicals; however, they contain no alicyclic or heterocyclic constituents. The aromatic radicals may be substituted by aliphatic radicals, but both bonding sites to the remainder of the molecule are located on the aromatic radical(s).

Mixed aliphatic-cycloaliphatic bridging groups contain at least one divalent aliphatic radical and at least one divalent cycloaliphatic radical, the two bonding sites to the remainder of the molecule possibly being located either both on the cycloaliphatic radical(s) or both on the aliphatic radical(s) or one on an aliphatic radical and the other on a cycloaliphatic radical.

Mixed aliphatic-aromatic bridging groups contain at least one divalent aliphatic radical and at least one divalent aromatic radical, the two bonding sites to the remainder of the molecule possibly being located either both on the aromatic radical(s) or both on the aliphatic radical(s) or one on an aliphatic radical and the other on an aromatic radical.

Mixed aliphatic-cycloaliphatic-aromatic bridging groups contain at least one divalent aliphatic radical, at least one divalent cycloaliphatic radical and at least one divalent aromatic radical, the two bonding sites to the remainder of the molecule possibly being located either both on the cycloaliphatic radical(s) or both on the aliphatic radical(s) or both on the aromatic radical(s) or one on an aliphatic radical and the other on a cycloaliphatic or an aromatic radical or one on a cycloaliphatic radical and the other on an aromatic radical.

The term "alkyl" indicates a saturated straight-chain or branched aliphatic hydrocarbon radical having in general 1 to 40 ("$C_1$-$C_{40}$-alkyl") carbon atoms, preferably 1 to 30 ("$C_1$-$C_{30}$-alkyl") carbon atoms, more preferably 1 to 20 ("$C_1$-$C_{20}$-alkyl") carbon atoms, in particular 1 to 10 ("$C_1$-$C_{10}$alkyl") carbon atoms, specifically 1 to 6 ("$C_1$-$C_6$-alkyl") or 1 to 4 ("$C_1$-$C_4$-alkyl") or 1 or 2 ("$C_1$-$C_2$-alkyl") carbon atoms. $C_1$-$C_2$-Alkyl is methyl or ethyl. Examples for $C_1$-$C_3$-alkyl are, in addition to those mentioned for $C_1$-$C_2$-alkyl, propyl and isopropyl. Examples for $C_1$-$C_4$-alkyl are, in addition to those mentioned for $C_1$-$C_3$-alkyl, butyl, 1-methylpropyl (sec-butyl), 2-methylpropyl (isobutyl) or 1,1-dimethylethyl (tert-butyl). Examples for $C_1$-$C_6$-alkyl are, in addition to those mentioned for $C_1$-$C_4$-alkyl, pentyl, 1-methylbutyl, 2-methylbutyl, 3-methylbutyl, 2,2-dimethylpropyl, 1-ethylpropyl, 1,1-dimethylpropyl, 1,2-dimethylpropyl, hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, or 1-ethyl-2-methylpropyl. Examples for $C_1$-$C_{10}$-alkyl are, in addition to those mentioned for $C_1$-$C_6$-alkyl, heptyl, octyl, 2-ethylhexyl, nonyl, decyl and positional isomers thereof. Examples for $C_1$-$C_{20}$-alkyl are, in addition to those mentioned for $C_1$-$C_{10}$-alkyl, n-undecyl, n-dodecyl, n-tridecyl, n-tetradecyl, n-hexadecyl, n-heptadecyl, n-octadecyl, n-nonadecyl, n-eicosyl and position isomers thereof. Examples for $C_1$-$C_{30}$-alkyl are, in addition to those mentioned for $C_1$-$C_{20}$-alkyl, n-henicosyl, n-docosy, n-tricosyl, n-tetracosy, n-pentacosyl, n-hexacosyl, n-octacosy, n-nonacosyl, n-triacontyl and position isomers thereof.

The term "fluorinated alkyl" indicates saturated straight-chain or branched aliphatic hydrocarbon radicals having in general 1 to 30 ("fluorinated $C_1$-$C_{30}$-alkyl") carbon atoms, preferably 1 to 20 ("fluorinated $C_1$-$C_{20}$-alkyl") carbon atoms, in particular 1 to 10 ("fluorinated $C_1$-$C_{10}$-alkyl") carbon atoms, specifically 1 to 6 ("fluorinated $C_1$-$C_6$-alkyl") or 1 to 4 ("fluorinated $C_1$-$C_4$-alkyl") or 1 or 2 ("fluorinated $C_1$-$C_2$-alkyl")carbon atoms, where some or all of the hydrogen atoms in these groups are replaced by fluorine atoms. "Fluorinated methyl" is methyl in which 1, 2 or 3 of the hydrogen atoms are replaced by fluorine atoms. "Fluorinated $C_1$-$C_2$-alkyl" refers to alkyl groups having 1 or 2 carbon atoms (as mentioned above), where some or all of the hydrogen atoms in these groups are replaced by fluorine atoms. "Fluorinated $C_1$-$C_3$-alkyl" refers to straight-chain or branched alkyl groups having 1 to 3 carbon atoms (as mentioned above), where some or all of the hydrogen atoms in these groups are replaced by fluorine atoms. "Fluorinated $C_1$-$C_4$-alkyl" refers to straight-chain or branched alkyl groups having 1 to 4 carbon atoms (as mentioned above), where some or all of the hydrogen atoms in these groups are replaced by fluorine atoms. "Fluorinated $C_1$-$C_6$-alkyl" refers to straight-chain or branched alkyl groups having 1 to 6 carbon atoms (as mentioned above), where some or all of the hydrogen atoms in these groups are replaced by fluorine atoms. "Fluorinated $C_1$-$C_8$-alkyl" refers to straight-chain or branched alkyl groups having 1 to 8 carbon atoms (as mentioned above), where some or all of the hydrogen atoms in these groups are replaced by fluorine atoms. "Fluorinated $C_1$-$C_{10}$-alkyl" refers to straight-chain or branched alkyl groups having 1 to 10 carbon atoms (as mentioned above), where some or all of the hydrogen atoms in these groups are replaced by fluorine atoms; etc. Examples for fluorinated methyl are fluoromethyl, difluoromethyl and trifluoromethyl. Examples for fluorinated $C_1$-$C_2$-alkyl are fluoromethyl, difluoromethyl, trifluoromethyl, 1-fluoroethyl, 2-fluoroethyl, 2,2-difluoroethyl, 2,2,2-trifluoroethyl, or pentafluoroethyl. Examples for fluorinated $C_1$-$C_3$-alkyl are, in addition to those mentioned for fluorinated $C_1$-$C_2$-alkyl, 1-fluoropropyl, 2-fluoropropyl, 3-fluoropropyl, 1,1-difluoropropyl, 2,2-difluoropropyl, 1,2-difluoropropyl, 3,3-difluoropropyl, 3,3,3-trifluoropropyl, heptafluoropropyl, 1,1,1-trifluoroprop-2-yl, heptafluoropropyl, and the like. Examples for fluorinated $C_1$-$C_4$-alkyl are, in addition to those mentioned for fluorinated $C_1$-$C_3$-alkyl, 4-fluorobutyl, the nonafluorobutyls, the heptadecafluorooctyls and the like. In perfluorinated alkyl, all hydrogen atoms are replaced by fluorine atoms. Examples are trifluoromethyl, pentafluoroethyl, heptafluoropropyl, the nonafluorobutyls, the heptadecafluorooctyls and the like.

The term "haloalkyl" (also expressed as "alkyl which is partially or fully halogenated") indicates saturated straight-chain or branched aliphatic hydrocarbon radicals having in general 1 to 30 ("fluorinated $C_1$-$C_{30}$-alkyl") carbon atoms, preferably 1 to 20 ("fluorinated $C_1$-$C_{20}$-alkyl") carbon atoms, in particular 1 to 10 ("fluorinated $C_1$-$C_{10}$-alkyl") carbon atoms, specifically 1 to 6 ("fluorinated $C_1$-$C_6$-alkyl") or 1 to 4 ("fluorinated $C_1$-$C_4$-alkyl") or 1 or 2 ("fluorinated $C_1$-$C_2$-alkyl")carbon atoms, where some or all of the hydrogen atoms in these groups are replaced by halogen atoms as mentioned above, in particular fluorine, chlorine and/or bromine. "$C_1$-$C_2$-Haloalkyl" refers to alkyl groups having 1 or 2 carbon atoms (as mentioned above), where some or all of the hydrogen atoms in these groups are replaced by halogen atoms as mentioned above, in particular fluorine, chlorine and/or bromine. "$C_1$-$C_3$-Haloalkyl" refers to straight-chain or branched alkyl groups having 1 to 3 carbon atoms (as mentioned above), where some or all of the hydrogen atoms in these groups are replaced by halogen atoms as mentioned above, in particular fluorine, chlorine and/or bromine. "$C_1$-$C_4$-Haloalkyl" refers to straight-chain or branched alkyl groups having 1 to 4 carbon atoms (as mentioned above), where some or all of the hydrogen atoms in these groups are replaced by halogen atoms as mentioned above, in particular fluorine, chlorine and/or bromine. "$C_1$-$C_6$-Haloalkyl" refers to straight-chain or branched alkyl groups having 1 to 6 carbon atoms (as mentioned above), where some or all of the hydrogen atoms in these groups are replaced by halogen atoms as mentioned above, in particular fluorine, chlorine and/or bromine. Examples for $C_1$-$C_2$-haloalkyl are chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl or pentafluoroethyl. Examples for $C_1$-$C_3$-haloalkyl are, in addition to those mentioned for $C_1$-$C_2$-haloalkyl, 1-fluoropropyl, 2-fluoropropyl, 3-fluoropropyl, 1,1-difluoropropyl, 2,2-difluoropropyl, 1,2-difluoropropyl, 3,3-difluoropropyl, 3,3,3-trifluoropropyl, heptafluoropropyl, 1,1,1-trifluoroprop-2-yl, 3-chloropropyl and the like. Examples for $C_1$-$C_4$-haloalkyl are, in addition to those mentioned for $C_1$-$C_3$-haloalkyl, 4-chlorobutyl and the like.

Strictly speaking, the term "alkenyl" indicates monounsaturated (i.e. containing one C=C double bond) straight-chain or branched aliphatic hydrocarbon radicals having in general 2 to 40 ("$C_2$-$C_{40}$-alkenyl") carbon atoms, preferably 2 to 30 ("$C_2$-$C_{30}$-alkenyl") carbon atoms, more preferably 2 to 20 ("$C_2$-$C_{20}$-alkenyl") carbon atoms, in particular 2 to 10 ("$C_2$-$C_{10}$-alkenyl") carbon atoms, specifically 2 to 6 ("$C_2$-$C_6$-alkenyl") or 2 to 4 ("$C_2$-$C_4$-alkenyl") carbon atoms, where the C—C double bond can be in any position. As used in the present invention, the term encompasses however also "alkapolyenyl" groups, i.e. straight-chain or branched aliphatic hydrocarbon radicals having in general 4 to 40 ("$C_4$-$C_{40}$-alkapolyenyl") carbon atoms, preferably 4 to 30 ("$C_4$-$C_{30}$-alkapolyenyl") carbon atoms, more preferably 4 to 20 ("$C_4$-$C_{20}$-alkapolyenyl") carbon atoms, in particular 4 to 10 ("$C_4$-$C_{10}$-alkapolyenyl") carbon atoms, and two or more conjugated or isolated, but non-cumulated C—C double bonds. Examples for $C_2$-$C_3$-alkenyl in the strict sense (only 1 C—C double bond) are ethenyl, 1-propenyl, 2-propenyl or 1-methylethenyl. Examples for $C_2$-$C_4$-alkenyl in the strict sense (only 1 C—C double bond) are ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl and 2-methyl-2-propenyl. Examples for $C_2$-$C_6$-alkenyl in the strict sense (only 1 C—C double bond) are ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, 1-ethyl-2-methyl-2-propenyl and the like. Examples for $C_2$-$C_{10}$-alkenyl in the strict sense (only 1 C—C double bond) are, in addition to the examples mentioned for $C_2$-$C_6$-alkenyl, 1-heptenyl, 2-heptenyl, 3-heptenyl, 1-octenyl, 2-octenyl, 3-octenyl, 4-octenyl, 1-nonenyl, 2-nonenyl, 3-nonenyl, 4-nonenyl, 1-decenyl, 2-decenyl, 3-decenyl, 4-decenyl, 5-decenyl and the positional isomers thereof. Examples for $C_2$-$C_{20}$-alkenyl in the strict sense (only 1 C—C double bond) are, in addition to the examples mentioned for $C_2$-$C_{10}$-alkenyl, 1-undecenyl, 2-undecenyl, 3-undecenyl, 4-undecenyl, 5-undecenyl, 1-dodecenyl, 2-dodecenyl, 3-dodecenyl, 4-dodecenyl, 5-dodecenyl, 6-dodecenyl, 1-tridecenyl, 2-tridecenyl, 3-tridecenyl, 4-tridecenyl, 5-tridecenyl, 6-tridecenyl, 1-tetradecenyl, 2-tetradecenyl, 3-tetradecenyl, 4-tetradecenyl, 5-tetradecenyl, 6-tetradecenyl, 7-tetradecenyl, 1-pentadecenyl, 2-pentadecenyl, 3-pentadecenyl, 4-pentadecenyl, 5-pentadecenyl, 6-pentadecenyl, 7-pentadecenyl, 1-hexadecenyl, 2-hexadecenyl, 3-hexadecenyl, 4-hexadecenyl, 5-hexadecenyl, 6-hexadecenyl, 7-hexadecenyl, 8-hexadecenyl, 1-heptadecenyl, 2-heptadecenyl, 3-heptadecenyl, 4-heptadecenyl, 5-heptadecenyl, 6-heptadecenyl, 7-heptadecenyl, 8-heptadecenyl, 1-octadecenyl, 2-octadecenyl, 3-octadecenyl, 4-octadecenyl, 5-octadecenyl, 6-octadecenyl, 7-octadecenyl, 8-octadecenyl, 9-octadecenyl, 1-nonadecenyl, 2-nonadecenyl, 3-nonadecenyl, 4-nonadecenyl, 5-nonadecenyl, 6-nonadecenyl, 7-nonadecenyl, 8-nonadecenyl, 9-nonadecenyl, 1-eicosadecenyl, 2-eicosadecenyl, 3-eicosadecenyl, 4-eicosadecenyl, 5-eicosadecenyl, 6-eicosadecenyl, 7-eicosadecenyl, 8-eicosadecenyl, 9-eicosadecenyl, and the positional isomers thereof.

If the terminal C—C double bond is in a terminal position, i.e. if the radical contains a C=$CH_2$ group, the alkenyl group is also termed a vinyl group.

Examples for alkapolyenyl groups are buta-1,3-dien-1-yl, buta-1,3-dien-2-yl, penta-1,3-dien-1-yl, penta-1,3-dien-2-yl, penta-1,3-dien-3-yl, penta-1,3-dien-4-yl, penta-1,3-dien-5-yl, penta-1,4-dien-1-yl, penta-1,4-dien-2-yl, penta-1,4-dien-3-yl, and the like.

The term "alkynyl" as used herein indicates straight-chain or branched aliphatic hydrocarbon radicals having in general 2 to 40 ("$C_2$-$C_{40}$-alkynyl") carbon atoms, preferably 2 to 30 ("$C_2$-$C_{30}$-alkynyl") carbon atoms, more preferably 2 to 20 ("$C_2$-$C_{20}$-alkynyl") carbon atoms, in particular 2 to 10 ("$C_2$-$C_{10}$-alkynyl") carbon atoms, specifically 2 to 6 ("$C_2$-$C_6$-alkynyl") or 2 to 4 ("$C_2$-$C_4$-alkynyl") carbon atoms, and one triple bond in any position. Examples for $C_2$-$C_3$-alkynyl are ethynyl, 1-propynyl or 2-propynyl. Examples for $C_2$-$C_4$-alkynyl are ethynyl, 1-propynyl, 2-propynyl, 1-butynyl, 2-butynyl, 3-butynyl, 1-methyl-2-propynyl and the like. Examples for $C_2$-$C_6$-alkynyl are ethynyl, 1-propynyl, 2-propynyl, 1-butynyl, 2-butynyl, 3-butynyl, 1-methyl-2-propynyl, 1-pentynyl, 2-pentynyl, 3-pentynyl, 4-pentynyl, 1-methyl-2-butynyl, 1-methyl-3-butynyl, 2-methyl-3-butynyl, 3-methyl-1-butynyl, 1,1-dimethyl-2-propynyl, 1-ethyl-2-propynyl, 1-hexynyl, 2-hexynyl, 3-hexynyl, 4-hexynyl, 5-hexynyl, 1-methyl-2-pentynyl, 1-methyl-3-pentynyl, 1-methyl-4-pentynyl, 2-methyl-3-pentynyl, 2-methyl-4-pentynyl, 3-methyl-1-pentynyl, 3-methyl-4-pentynyl, 4-methyl-1-pentynyl, 4-methyl-2-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, 1-ethyl-1-methyl-2-propynyl and the like.

The term "cycloalkyl", if not specified as polycyclic, indicates monocyclic saturated hydrocarbon radicals having in general 3 to 40 ("$C_3$-$C_{40}$-cycloalkyl"), preferably 3 to 20 ("$C_3$-$C_{20}$-cycloalkyl"), in particular 3 to 10 ("$C_3$-$C_{10}$-cycloalkyl"), specifically 3 to 8 ("$C_3$-$C_8$-cycloalkyl") or more specifically 3 to 6 ("$C_3$-$C_6$-cycloalkyl") carbon atoms (and of course no heteroatoms) as ring members; i.e. all ring members are carbon atoms. Examples of cycloalkyl having 3 to 4 carbon atoms comprise cyclopropyl and cyclobutyl. Examples of cycloalkyl having 3 to 5 carbon atoms comprise cyclopropyl, cyclobutyl and cyclopentyl. Examples of cycloalkyl having 3 to 6 carbon atoms comprise cyclopropyl, cyclobutyl, cyclopentyl and cyclohexyl. Examples of cycloalkyl having 3 to 8 carbon atoms comprise cyclopropyl, cyclobutyl, cyclopentyl, cyclohexyl, cycloheptyl and cyclooctyl. Examples of cycloalkyl having 3 to 10 carbon atoms comprise cyclopropyl, cyclobutyl, cyclopentyl, cyclohexyl, cycloheptyl, cyclooctyl, cyclononyl and cyclodecyl.

The term "polycyclic cycloalkyl" indicates bi- or polycyclic saturated hydrocarbon radicals having in general 4 to 40 ("polycyclic $C_4$-$C_{40}$-cycloalkyl"), preferably 4 to 20 ("polycyclic $C_4$-$C_{20}$-cycloalkyl"), in particular 6 to 20 ("polycyclic $C_6$-$C_{40}$-cycloalkyl") carbon atoms (and of course no heteroatoms) as ring members; i.e. all ring members are carbon atoms. The bi- and polycyclic radicals can be condensed, bridged or spiro-bound rings. Examples of bicyclic condensed saturated radicals having 6 to 10 carbon atoms comprise bicyclo[3.1.0]hexyl, bicyclo[3.2.0]heptyl, bicyclo[3.3.0]octyl (1,2,3,3a,4,5,6,6a-octahydropentalenyl), bicyclo[4.2.0]octyl, bicyclo[4.3.0]nonyl (2,3,3a,4,5,6,7,7a-octahydro-1H-indene), bicyclo[4.4.0]decyl (decalinyl) and the like. Examples of bridged bicyclic condensed saturated radicals having 7 to 10 carbon atoms comprise bicyclo[2.2.1]heptyl, bicyclo[3.1.1]heptyl, bicyclo[2.2.2]octyl, bicyclo[3.2.1]octyl and the like. Examples of bicyclic spiro-bound saturated radicals are spiro[2.2]pentyl, spiro[2.4]heptyl, spiro[4.4]nonyl, spiro[4.5]decyl, spiro[5.5]undecyl and the like. Examples for saturated polycyclic radicals comprise 2,3,4,4a,4b,5,6,7,8,8a,9,9a-dodecahydro-1H-fluorenyl, 1,2,3,4,4a,5,6,7,8,8a,9,9a,10,10a-tetradecahydroanthracenyl, 1,2,3,4,4a,4b,5,6,7,8,8a,9,10,10a-tetradecahydrophenanthrenyl, 2,3,3a,4,5,6,6a,7,8,9,9a,9b-dodecahydro-1H-phenalenyl, adamantly and the like.

The term "cycloalkenyl", if not specified as polycyclic, indicates monocyclic partially unsaturated, non-aromatic hydrocarbon radicals having in general 3 to 40 ("$C_3$-$C_{40}$-cycloalkenyl"), preferably 3 to 20 ("$C_3$-$C_{20}$-cycloalkenyl"), in particular 3 to 10 ("$C_3$-$C_{10}$-cycloalkenyl"), specifically 3 to 8 ("$C_3$-$C_8$-cycloalkenyl") or more specifically 5 to 7 ("$C_5$-$C_7$-cycloalkenyl") carbon atoms (and of course no heteroatoms) as ring members; i.e. all ring members are carbon atoms; and one or more non-cumulative, preferably one, C—C double bonds in the ring. Examples for $C_5$-$C_6$-cycloalkenyl are cyclopent-1-en-1-yl, cyclopent-1-en-3-yl, cyclopent-1-en-4-yl, cyclopenta-1,3-dien-1-yl, cyclopenta-1,3-dien-2-yl, cyclopenta-1,3-dien-5-yl, cyclohex-1-en-1-yl, cyclohex-1-en-3-yl, cyclohex-1-en-4-yl, cyclohexa-1,3-dien-1-yl, cyclohexa-1,3-dien-2-yl, cyclohexa-1,3-dien-5-yl, cyclohexa-1,4-dien-1-yl and cyclohexa-1,4-dien-3-yl. Examples of $C_5$-$C_7$-cycloalkenyl are, in addition to those mentioned above for $C_5$-$C_6$-cycloalkenyl, cyclohept-1-en-1-yl, cyclohept-1-en-3-yl, cyclohept-1-en-4-yl, cyclohept-1-en-5-yl, cyclohepta-1,3-dien-1-yl, cyclohepta-1,3-dien-2-yl, cyclohepta-1,3-dien-5-yl, cyclohepta-1,3-dien-6-yl, cyclohepta-1,4-dien-1-yl, cyclohepta-1,4-dien-2-yl, cyclohepta-1,4-dien-3-yl and cyclohepta-1,4-dien-6-yl. Examples of $C_3$-$C_8$-cycloalkenyl are, in addition to those mentioned above for $C_5$-$C_7$-cycloalkenyl, cycloprop-1-en-1-yl, cycloprop-1-en-3-yl, cyclobut-1-en-1-yl, cyclobut-1-en-3-yl, cyclooct-1-en-1-yl, cyclooct-1-en-3-yl, cyclooct-1-en-4-yl, cyclooct-1-en-5-yl, cycloocta-1,3-dien-1-yl, cycloocta-1,3-dien-2-yl, cycloocta-1,3-dien-5-yl, cycloocta-1,3-dien-6-yl, cycloocta-1,4-dien-1-yl, cycloocta-1,4-dien-2-yl, cycloocta-1,4-dien-3-yl, cycloocta-1,4-dien-6-yl, cycloocta-1,4-dien-7-yl, cycloocta-1,5-dien-1-yl, and cycloocta-1,5-dien-3-yl.

The term "polycyclic cycloalkenyl" indicates bi- or polycyclic unsaturated hydrocarbon radicals having in general 4 to 40 ("polycyclic $C_4$-$C_{40}$-cycloalkenyl"), preferably 4 to 20 ("polycyclic $C_4$-$C_{20}$-cycloalkenyl"), in particular 6 to 20 ("polycyclic $C_6$-$C_{40}$-cycloalkenyl") carbon atoms (and of course no heteroatoms) as ring members; i.e. all ring members are carbon atoms; and one or more C—C double and/or triple bonds, where the ring is not throughout aromatic The bi- and polycyclic radicals can be condensed, bridged or spiro-bound rings. Examples for bicyclic condensed unsaturated radicals are 1,2,3,4,4a,5,8,8a-octahydronaphthalenyl, 1,2,3,4,4a,5,6,8a-octahydronaphthalenyl, 1,2,3,4,4a,5,6,7-octahydronaphthalenyl, 1,2,3,4,5,6,7,8-octahydronaphthalenyl, 1,2,3,4,5,8-hexahydronaphthalenyl, 1,4,4a,5,8,8a-hexahydronaphthalenyl, indanyl, indenyl, the hexahydroindenyls, such as 2,3,3a,4,7,7a-hexahydro-1H-indenyl or 2,3,3a,4,5,7a-hexahydro-1H-indenyl, the tetrahydroindenyls, such as 2,3,3a,7a-tetrahydro-1H-indenyl or 2,3,4,7-tetrahydro-1H-indenyl, and the like. Examples for tricyclic condensed unsaturated radicals are fluorenyl, the dihydrofluorenyl, the tetrahydrofluorenyl, the hexahydrofluorenyls and the decahydrofluorenyls.

"Alkoxy" is an alkyl group, as defined above, attached via an oxygen atom to the remainder of the molecule; generally a $C_1$-$C_{30}$-alkyl group ("$C_1$-$C_{30}$-alkoxy"), preferably a $C_1$-$C_{20}$-alkyl group ("$C_1$-$C_{20}$-alkoxy"), in particular a $C_1$-$C_{12}$-alkyl group ("$C_1$-$C_{12}$-alkoxy"), specifically a $C_1$-$C_6$-alkyl group ("$C_1$-$C_6$-alkoxy") or a $C_1$-$C_4$-alkyl group ("$C_1$-$C_4$-alkoxy") attached via an oxygen atom to the remainder of the molecule. "$C_1$-$C_2$-Alkoxy" is a $C_1$-$C_2$-alkyl group, as defined above, attached via an oxygen atom. "$C_1$-$C_3$-Alkoxy" is a $C_1$-$C_3$-alkyl group, as defined above, attached via an oxygen atom. $C_1$-$C_2$-Alkoxy is methoxy or ethoxy. $C_1$-$C_3$-Alkoxy is additionally, for example, n-propoxy and 1-methylethoxy (isopropoxy). $C_1$-$C_4$-Alkoxy is additionally, for example, butoxy, 1-methylpropoxy (sec-butoxy), 2-methylpropoxy (isobutoxy) or 1,1-dimethylethoxy (tert-butoxy). $C_1$-$C_6$-Alkoxy is additionally, for example, pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy or 1-ethyl-2-methylpropoxy. $C_1$-$C_8$-Alkoxy is additionally, for example, heptyloxy, octyloxy, 2-ethylhexyloxy and positional isomers thereof. $C_1$-$C_{12}$-Alkoxy is additionally, for example, nonyloxy, decyloxy, undecyloxy, dodecyloxy and positional isomers thereof.

The substituent "oxo" replaces a $CH_2$ group by a $C(=O)$ group.

"Aryl" is a mono-, bi- or polycyclic carbocyclic (i.e. without heteroatoms as ring members) aromatic radical. One example for a monocyclic aromatic radical is phenyl. In bicyclic aryl rings two aromatic rings are condensed, i.e. they share two vicinal C atoms as ring members. One example for a bicyclic aromatic radical is naphthyl. In polycyclic aryl rings, three or more rings are condensed. Examples for polycyclic aryl radicals are phenanthrenyl, anthracenyl, tetracenyl, 1H-benzo[a]phenalenyl, pyrenyl and the like. In the terms of the present invention "aryl" encompasses however also bi- or polycyclic radicals in which not all rings are aromatic, as long as at least one ring is; especially if the reactive site is on the aromatic ring (or on a functional group bound thereto). Examples are indanyl, indenyl, tetralinyl, 6,7,8,9-tetrahydro-5H-benzo[7]annulenyl, fluorenyl, 9,10-dihydroanthracenyl, 9,10-dihydrophenanthrenyl, 1H-benzo[a]phenalenyl and the like, and also ring systems in which not all rings are condensed, but for example spiro-bound or bridged, such as benzonorbornyl. In particular, the aryl group has 6 to 40, particularly 6 to 30, more particularly 6 to 20, specifically 6 to 10 carbon atoms as ring members.

Rings termed as heterocyclic rings or heterocyclyl or heteroaromatic rings or heteroaryl or hetaryl contain one or more heteroatoms as ring members, i.e. atoms different from carbon. In the terms of the present invention, these heteroatoms are N, O and S, where N and S can also be present as heteroatom groups, namely as NO, SO or $SO_2$. Thus, in the terms of the present invention, rings termed as heterocyclic rings or heterocyclyl or heteroaromatic rings or heteroaryl or hetaryl contain one or more heteroatoms and/or heteroatom groups selected from the group consisting of N, O, S, NO, SO and $SO_2$ as ring members.

In the terms of the present invention a heterocyclic ring or heterocyclyl is a saturated, partially unsaturated or maximally unsaturated, including aromatic heteromono-, bi- or polycyclic ring (if the ring is aromatic, it is also termed heteroaromatic ring or heteroaryl or hetaryl) containing one ore more, in particular 1, 2, 3 or 4 heteroatoms or heteroatom groups independently selected from the group consisting of N, O, S, NO, SO and $SO_2$ as ring members.

Unsaturated rings contain at least one C—C and/or C—N and/or N—N double bond(s). Maximally unsaturated rings contain as many conjugated C—C and/or C—N and/or N—N double bonds as allowed by the ring size. Maximally unsaturated 5- or 6-membered heteromonocyclic rings are generally aromatic. Exceptions are maximally unsaturated 6-membered rings containing O, S, SO and/or $SO_2$ as ring members, such as pyran and thiopyran, which are not aromatic. Partially unsaturated rings contain less than the maximum number of C—C and/or C—N and/or N—N double bond(s) allowed by the ring size.

The heterocyclic ring may be attached to the remainder of the molecule via a carbon ring member or via a nitrogen ring member. As a matter of course, the heterocyclic ring contains at least one carbon ring atom. If the ring contains more than one O ring atom, these are not adjacent. Heterocyclic rings are in particular 3- to 40-membered, particularly 3- to 30-membered, more particularly 3- to 20-membered, specifically 3- to 12-membered or 3- to 11-membered.

Heteromonocyclic rings are in particular 3- to 8-membered. Examples of a 3-, 4-, 5-, 6-, 7- or 8-membered saturated heteromonocyclic ring include: Oxiran-2-yl, thiiran-2-yl, aziridin-1-yl, aziridin-2-yl, oxetan-2-yl, oxetan-3-yl, thietan-2-yl, thietan-3-yl, 1-oxothietan-2-yl, 1-oxothietan-3-yl, 1,1-dioxothietan-2-yl, 1,1-dioxothietan-3-yl, azetidin-1-yl, azetidin-2-yl, azetidin-3-yl, tetrahydrofuran-2-yl, tetrahydrofuran-3-yl, tetrahydrothien-2-yl, tetrahydrothien-3-yl, 1-oxotetrahydrothien-2-yl, 1,1-dioxotetrahydrothien-2-yl, 1-oxotetrahydrothien-3-yl, 1,1-dioxotetrahydrothien-3-yl, pyrrolidin-1-yl, pyrrolidin-2-yl, pyrrolidin-3-yl, pyrazolidin-1-yl, pyrazolidin-3-yl, pyrazolidin-4-yl, pyrazolidin-5-yl, imidazolidin-1-yl, imidazolidin-2-yl, imidazolidin-4-yl, oxazolidin-2-yl, oxazolidin-3-yl, oxazolidin-4-yl, oxazolidin-5-yl, isoxazolidin-2-yl, isoxazolidin-3-yl, isoxazolidin-4-yl, isoxazolidin-5-yl, thiazolidin-2-yl, thiazolidin-3-yl, thiazolidin-4-yl, thiazolidin-5-yl, isothiazolidin-2-yl, isothiazolidin-3-yl, isothiazolidin-4-yl, isothiazolidin-5-yl, 1,2,4-oxadiazolidin-2-yl, 1,2,4-oxadiazolidin-3-yl, 1,2,4-oxadiazolidin-4-yl, 1,2,4-oxadiazolidin-5-yl, 1,2,4-thiadiazolidin-2-yl, 1,2,4-thiadiazolidin-3-yl, 1,2,4-thiadiazolidin-4-yl, 1,2,4-thiadiazolidin-5-yl, 1,2,4-triazolidin-1-yl, 1,2,4-triazolidin-3-yl, 1,2,4-triazolidin-4-yl, 1,3,4-oxadiazolidin-2-yl, 1,3,4-oxadiazolidin-3-yl, 1,3,4-thiadiazolidin-2-yl, 1,3,4-thiadiazolidin-3-yl, 1,3,4-triazolidin-1-yl, 1,3,4-triazolidin-2-yl, 1,3,4-triazolidin-3-yl, tetrahydropyran-2-yl, tetrahydropyran-3-yl, tetrahydropyran-4-yl, 1,3-dioxan-2-yl, 1,3-dioxan-4-yl, 1,3-dioxan-5-yl, 1,4-dioxan-2-yl, piperidin-1-yl, piperidin-2-yl, piperidin-3-yl, piperidin-4-yl, hexahydropyridazin-1-yl, hexahydropyridazin-3-yl, hexahydropyridazin-4-yl, hexahydropyrimidin-1-yl, hexahydropyrimidin-2-yl, hexahydropyrimidin-4-yl, hexahydropyrimidin-5-yl, piperazin-1-yl, piperazin-2-yl, 1,3,5-hexahydrotriazin-1-yl, 1,3,5-hexahydrotriazin-2-yl, 1,2,4-hexahydrotriazin-1-yl, 1,2,4-hexahydrotriazin-2-yl, 1,2,4-hexahydrotriazin-3-yl, 1,2,4-hexahydrotriazin-4-yl, 1,2,4-hexahydrotriazin-5-yl, 1,2,4-hexahydrotriazin-6-yl, morpholin-2-yl, morpholin-3-yl, morpholin-4-yl, thiomorpholin-2-yl, thiomorpholin-3-yl, thiomorpholin-4-yl, 1-oxothiomorpholin-2-yl, 1-oxothiomorpholin-3-yl, 1-oxothiomorpholin-4-yl, 1,1-dioxothiomorpholin-2-yl, 1,1-dioxothiomorpholin-3-yl, 1,1-dioxothiomorpholin-4-yl, azepan-1-, -2-, -3- or -4-yl, oxepan-2-, -3-, -4- or -5-yl, hexahydro-1,3-diazepinyl, hexahydro-1,4-diazepinyl, hexahydro-1,3-oxazepinyl, hexahydro-1,4-oxazepinyl, hexahydro-1,3-dioxepinyl, hexahydro-1,4-dioxepinyl, oxocane, thiocane, azocanyl, [1,3]diazocanyl, [1,4]diazocanyl, [1,5]diazocanyl, [1,5]oxazocanyl and the like. Examples of a 3-, 4-, 5-, 6-, 7- or 8-membered partially unsaturated heteromonocyclic ring include: 2,3-dihydrofuran-2-yl, 2,3-dihydrofuran-3-yl, 2,4-dihydrofuran-2-yl, 2,4-dihydrofuran-3-yl, 2,3-dihydrothien-2-yl, 2,3-dihydrothien-3-yl, 2,4-dihydrothien-2-yl, 2,4-dihydrothien-3-yl, 2-pyrrolin-2-yl, 2-pyrrolin-3-yl, 3-pyrrolin-2-yl, 3-pyrrolin-3-yl, 2-isoxazolin-3-yl, 3-isoxazolin-3-yl, 4-isoxazolin-3-yl, 2-isoxazolin-4-yl, 3-isoxazolin-4-yl, 4-isoxazolin-4-yl, 2-isoxazolin-5-yl, 3-isoxazolin-5-yl, 4-isoxazolin-5-yl, 2-isothiazolin-3-yl, 3-isothiazolin-3-yl, 4-isothiazolin-3-yl, 2-isothiazolin-4-yl, 3-isothiazolin-4-yl, 4-isothiazolin-4-yl, 2-isothiazolin-5-yl, 3-isothiazolin-5-yl, 4-isothiazolin-5-yl, 2,3-dihydropyrazol-1-yl, 2,3-dihydropyrazol-2-yl, 2,3-dihydropyrazol-3-yl, 2,3-dihydropyrazol-4-yl, 2,3-dihydropyrazol-5-yl, 3,4-dihydropyrazol-1-yl, 3,4-dihydropyrazol-3-yl, 3,4-dihydropyrazol-4-yl, 3,4-dihydropyrazol-5-yl, 4,5-dihydropyrazol-1-yl, 4,5-dihydropyrazol-3-yl, 4,5-dihydropyrazol-4-yl, 4,5-dihydropyrazol-5-yl, 2,3-dihydrooxazol-2-yl, 2,3-dihydrooxazol-3-yl, 2,3-dihydrooxazol-4-yl, 2,3-dihydrooxazol-5-yl, 3,4-dihydrooxazol-2-yl, 3,4-dihydrooxazol-3-yl, 3,4-dihydrooxazol-4-yl, 3,4-dihydrooxazol-5-yl, 3,4-dihydrooxazol-2-yl, 3,4-dihydrooxazol-3-yl, 3,4-dihydrooxazol-4-yl, 2-, 3-, 4-, 5- or 6-di- or tetrahydropyridinyl, 3-di- or tetrahydropyridazinyl, 4-di- or tetrahydropyridazinyl, 2-di- or tetrahydropyrimidinyl, 4-di- or tetrahydropyrimidinyl, 5-di- or tetrahydropyrimidinyl, di- or tetrahydropyrazinyl, 1,3,5-di- or tetrahydrotriazin-2-yl, 1,2,4-di- or tetrahydrotriazin-3-yl, 2,3,4,5-tetrahydro[1H]azepin-1-, -2-, -3-, -4-, -5-, -6- or -7-yl, 3,4,5,6-tetrahydro[2H]azepin-2-, -3-, -4-, -5-, -6- or -7-yl, 2,3,4,7-tetrahydro[1H]azepin-1-, -2-, -3-, -4-, -5-, -6- or -7-yl, 2,3,6,7-tetrahydro[1H]azepin-1-, -2-, -3-, -4-, -5-, -6- or -7-yl, tetrahydrooxepinyl, such as 2,3,4,5-tetrahydro[1H]oxepin-2-, -3-, -4-, -5-, -6- or -7-yl, 2,3,4,7-tetrahydro[1H]oxepin-2-, -3-, -4-, -5-, -6- or -7-yl, 2,3,6,7-tetrahydro[1H]oxepin-2-, -3-, -4-, -5-, 6- or -7-yl, tetrahydro-1,3-diazepinyl, tetrahydro-1,4-diazepinyl, tetrahydro-1,3-oxazepinyl, tetrahydro-1,4-oxazepinyl, tetrahydro-1,3-dioxepinyl, tetrahydro-1,4-dioxepinyl, 1,2,3,4,5,6-hexahydroazocine, 2,3,4,5,6,7-hexahydroazocine, 1,2,3,4,5,8-hexahydroazocine, 1,2,3,4,7,8-hexahydroazocine, 1,2,3,4,5,6-hexahydro-[1,5]diazocine, 1,2,3,4,7,8-hexahydro-[1,5]diazocine and the like.

Examples of a 3-, 4-, 5-, 6-, 7- or 8-membered maximally unsaturated (but not aromatic) heteromonocyclic ring are pyran-2-yl, pyran-3-yl, pyran-4-yl, thiopryran-2-yl, thiopryran-3-yl, thiopryran-4-yl, 1-oxothiopryran-2-yl, 1-oxothiopryran-3-yl, 1-oxothiopryran-4-yl, 1,1-dioxothiopryran-2-yl, 1,1-dioxothiopryran-3-yl, 1,1-dioxothiopryran-4-yl, 2H-oxazin-2-yl, 2H-oxazin-3-yl, 2H-oxazin-4-yl, 2H-oxazin-5-yl, 2H-oxazin-6-yl, 4H-oxazin-3-yl, 4H-oxazin-4-yl, 4H-oxazin-5-yl, 4H-oxazin-6-yl, 6H-oxazin-3-yl, 6H-oxazin-4-yl, 7H-oxazin-5-yl, 8H-oxazin-6-yl, 2H-1,3-oxazin-2-yl, 2H-1,3-oxazin-4-yl, 2H-1,3-oxazin-5-yl, 2H-1,3-oxazin-6-yl, 4H-1,3-oxazin-2-yl, 4H-1,3-oxazin-4-yl, 4H-1,3-oxazin-5-yl, 4H-1,3-oxazin-6-yl, 6H-1,3-oxazin-2-yl, 6H-1,3-oxazin yl, 6H-1,3-oxazin-5-yl, 6H-1,3-oxazin-6-yl, 2H-1,4-oxazin-2-yl, 2H-1,4-oxazin-3-yl, 2H-1,4-oxazin-5-yl, 2H-1,4-oxazin-6-yl, 4H-1,4-oxazin-2-yl, 4H-1,4-oxazin-3-yl, 4H-1,4-oxazin-4-yl, 4H-1,4-oxazin-5-yl, 4H-1,4-oxazin-6-yl, 6H-1,4-oxazin-2-yl, 6H-1,4-oxazin-3-yl, 6H-1,4-oxazin-5-yl, 6H-1,4-oxazin-6-yl, 1,4-dioxine-2-yl, 1,4-oxathiin-2-yl, 1H-azepine, 1H-[1,3]-diazepine, 1H-[1,4]-diazepine, [1,3]diazocine, [1,5]diazocine, [1,5]diazocine and the like.

Heteroaromatic monocyclic rings are in particular 5- or 6-membered. Examples for 5- or 6-membered monocyclic heteroaromatic rings are 2-furyl, 3-furyl, 2-thienyl, 3-thienyl, 1-pyrrolyl, 2-pyrrolyl, 3-pyrrolyl, 1-pyrazolyl, 3-pyrazolyl, 4-pyrazolyl, 5-pyrazolyl, 1-imidazolyl, 2-imidazolyl, 4-imidazolyl, 5-imidazolyl, 2-oxazolyl, 4-oxazolyl, 5-oxazolyl, 3-isoxazolyl, 4-isoxazolyl, 5-isoxazolyl, 2-thiazolyl, 4-thiazolyl, 5-thiazolyl, 3-isothiazolyl, 4-isothiazolyl, 5-isothiazolyl, 1,3,4-triazol-1-yl, 1,3,4-triazol-2-yl, 1,3,4-triazol-3-yl, 1,2,3-triazol-1-yl, 1,2,3-triazol-2-yl, 1,2,3-triazol-4-yl, 1,2,5-oxadiazol-3-yl, 1,2,3-oxadiazol-4-yl, 1,2,3-oxadiazol-5-yl, 1,3,4-oxadiazol-2-yl, 1,2,5-thiadiazol-3-yl, 1,2,3-thiadiazol-4-yl, 1,2,3-thiadiazol-5-yl, 1,3,4-thiadiazol-2-yl, 2-pyridinyl, 3-pyridinyl, 4-pyridinyl, 1-oxopyridin-2-yl, 1-oxopyridin-3-yl, 1-oxopyridin-4-yl, 3-pyridazinyl, 4-pyridazinyl, 2-pyrimidinyl, 4-pyrimidinyl, 5-pyrimidinyl, 2-pyrazinyl, 1,3,5-triazin-2-yl, 1,2,4-triazin-3-yl, 1,2,4-triazin-5-yl, 1,2,3,4-tetrazin-1-yl, 1,2,3,4-tetrazin-2-yl, 1,2,3,4-tetrazin-5-yl and the like.

"Heterobicyclic rings" or "heterobicyclyl" contain two rings which have at least one ring atom in common. At least one of the two rings contains a heteroatom or heteroatom group selected from the group consisting of N, O, S, NO, SO and $SO_2$ as ring member. The term comprises condensed (fused) ring systems, in which the two rings have two neighboring ring atoms in common, as well as spiro systems, in which the rings have only one ring atom in common, and bridged systems with at least three ring atoms in common. In terms of the present invention, the heterobicyclic rings include throughout aromatic bicyclic ring systems; these are also termed heteroaromatic bicyclic rings or bicyclic het(ero)aryl or heterobiaryl. The heterobicyclic rings are preferably 7-, 8-, 9-, 10- or 11-membered. The heteroaromatic bicyclic rings are preferably 9-, 10- or 11-membered. Throughout heteroaromatic heterobicyclic rings are 9- or 10-membered.

Examples for Fused Systems:

Examples for a 7-, 8-, 9-, 10- or 11-membered saturated heterobicyclic ring containing 1, 2 or 3 (or 4) heteroatoms or heteroatom groups selected from the group consisting of N, O, S, NO, SO and $SO_2$, as ring members are:

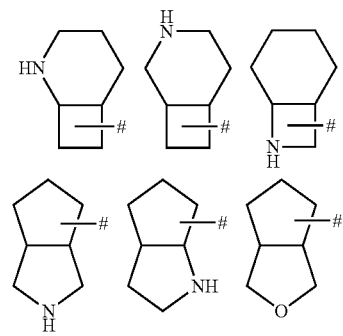

-continued
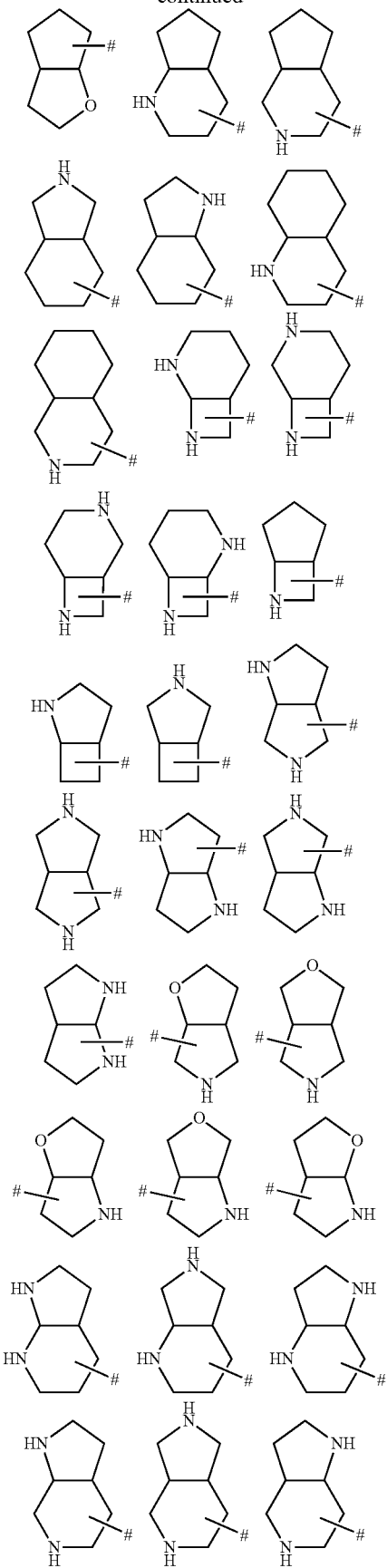
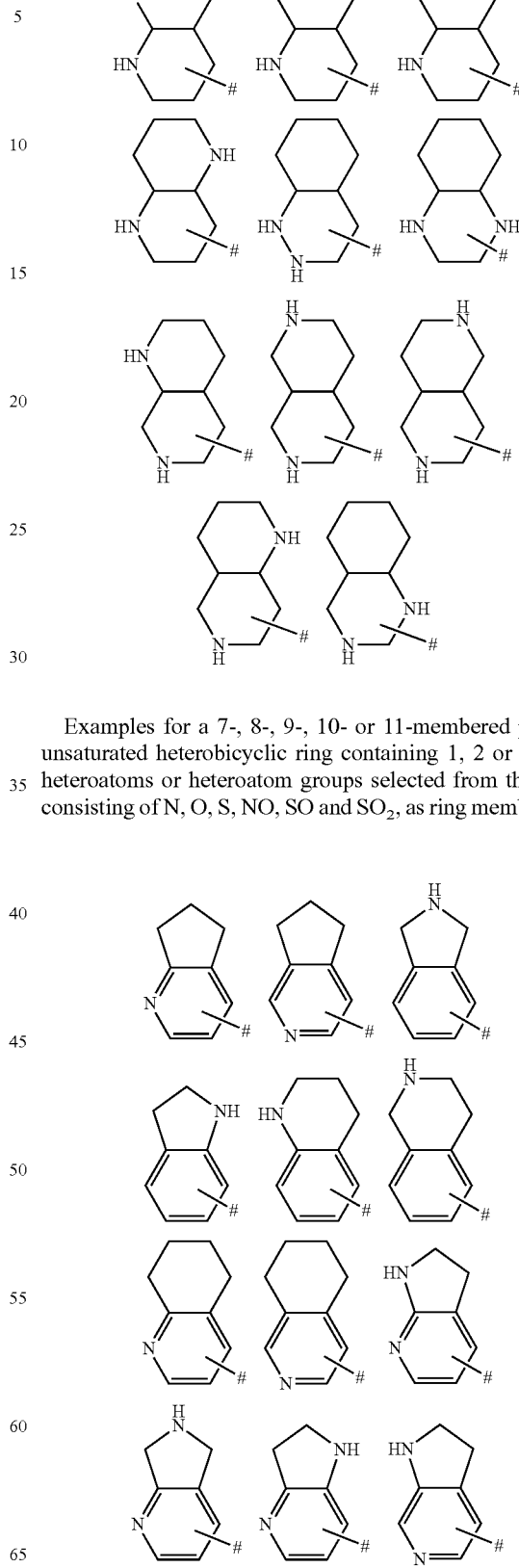
Examples for a 7-, 8-, 9-, 10- or 11-membered partially unsaturated heterobicyclic ring containing 1, 2 or 3 (or 4) heteroatoms or heteroatom groups selected from the group consisting of N, O, S, NO, SO and $SO_2$, as ring members are:

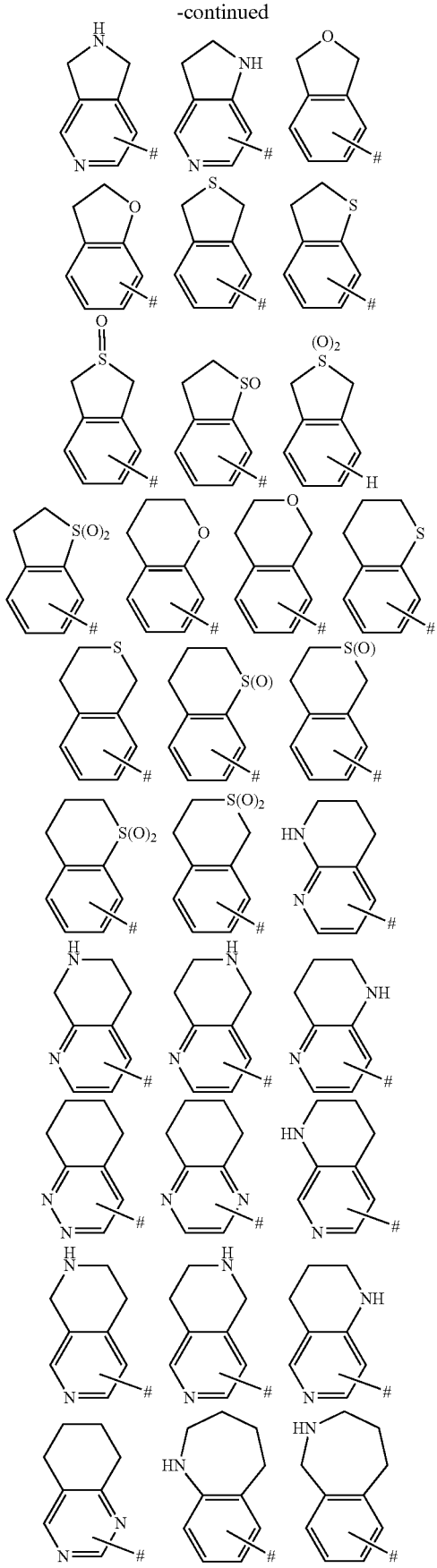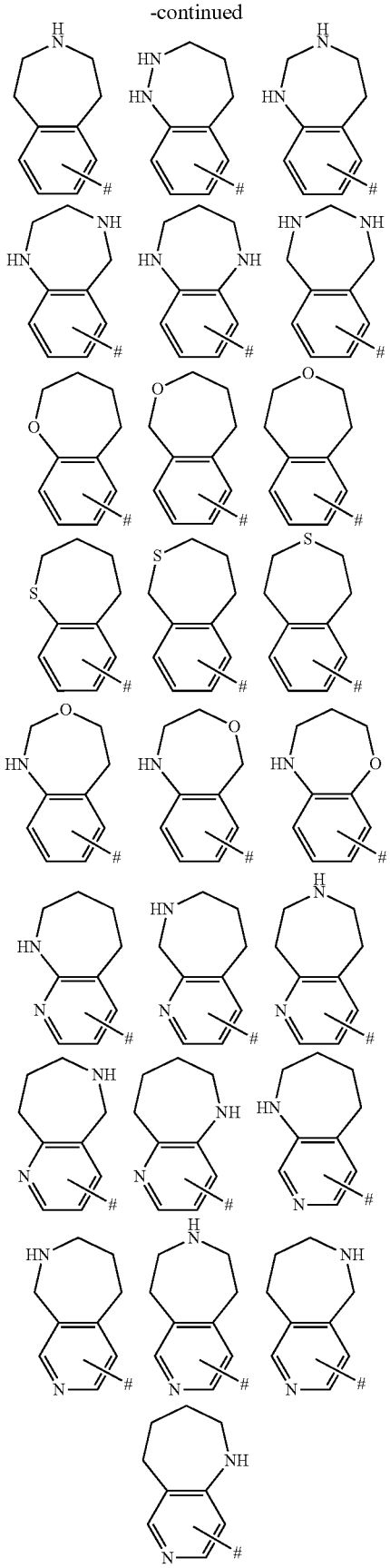

Examples for a 7-, 8-, 9-, 10- or 11-membered maximally unsaturated (but not throughout heteroaromatic) heterobicyclic ring containing 1, 2 or 3 (or 4) heteroatoms or heteroatom groups selected from the group consisting of N, O, S, NO, SO and $SO_2$, as ring members are:

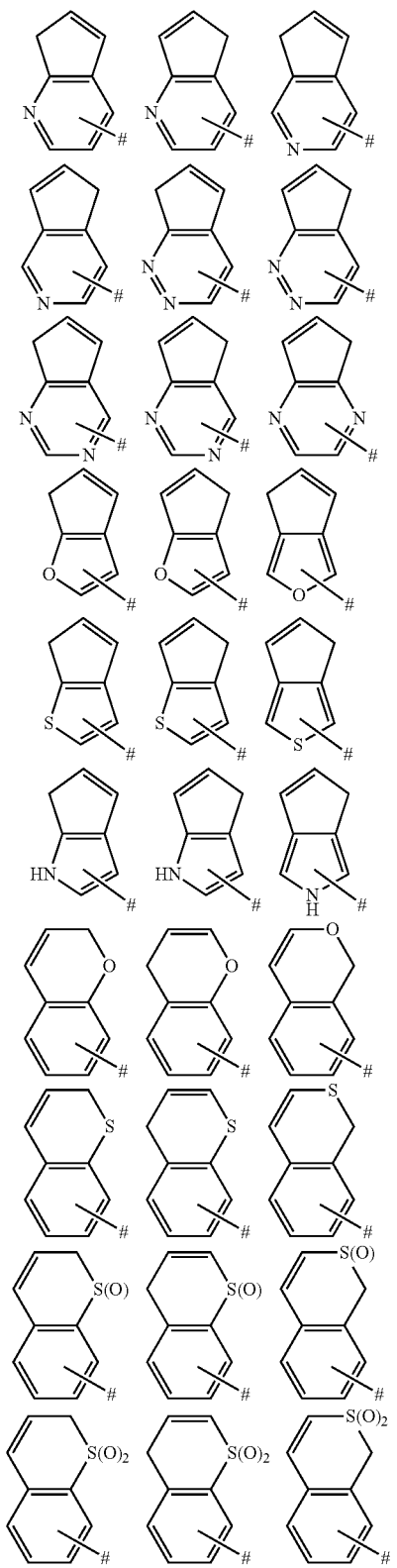

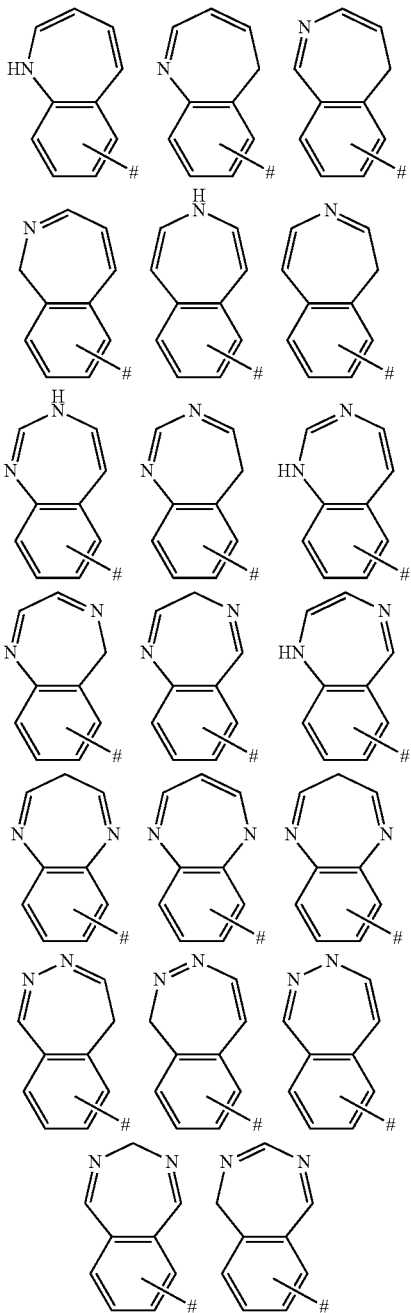

Examples for a 9- or 10-membered maximally unsaturated, throughout heteroaromatic heterobicyclic ring containing 1, 2 or 3 (or 4) heteroatoms or heteroatom groups selected from the group consisting of N, O, S, NO, SO and $SO_2$, as ring members are:

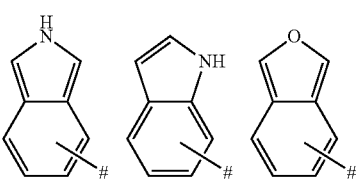

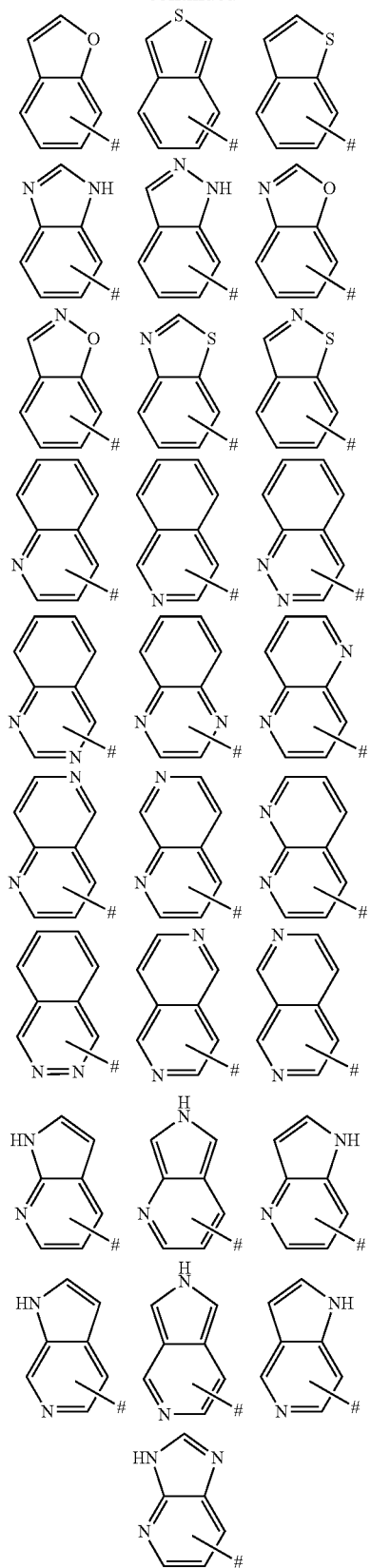

Examples for spiro-bound 7-, 8-, 9-, 10- or 11-membered heterobicyclic rings containing 1, 2 or 3 (or 4) heteroatoms or heteroatom groups selected from the group consisting of N, O, S, NO, SO and SO$_2$, as ring members are

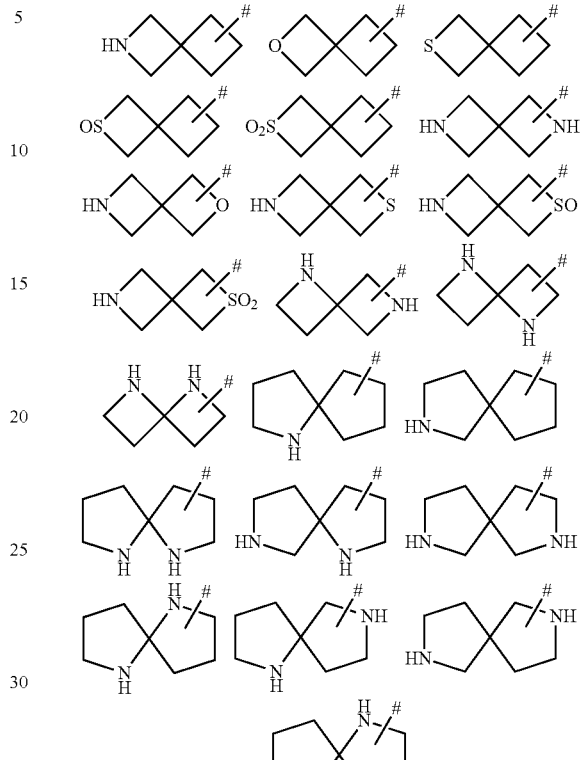

Examples for bridged 7-, 8-, 9-, 10- or 11-membered heterobicyclic rings containing 1, 2 or 3 (or 4) heteroatoms or heteroatom groups selected from the group consisting of N, O, S, NO, SO and SO$_2$, as ring members are

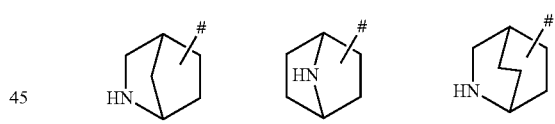

and the like.

In the above structures # denotes the attachment point to the remainder of the molecule. The attachment point is not restricted to the ring on which this is shown, but can be on either of the two rings, and may be on a carbon or on a nitrogen ring atom. If the rings carry one or more substituents, these may be bound to carbon and/or to nitrogen ring atoms.

Polycyclic heterocyclic rings (polyheterocyclyl) contain three or more rings, each of which having at least one ring atom in common with at least one of the other rings of the polycyclic system. The rings can be condensed, spiro-bound or bridged; mixed systems (e.g. one ring is spiro-bound to a condensed system, or a bridged system is condensed with another ring) are also possible. Throughout aromatic rings are not encompassed in the polycyclic heterocyclic ring (polyheterocyclyl); these are termed polycyclic heteroaromatic rings or heteropolyaryls.

Aryloxy, heterocyclyloxy and heteroaryloxy (also expressed as O-aryl, O-heterocyclyl and O-heteroaryl) are aryl, heterocyclyl and heteroaryl, respectively, as defined above, bound via an oxygen atom to the remainder of the molecule. Examples are phenoxy or pyridyloxy.

The aryl and heterocyclic rings may be unsubstituted or may carry one or more substituents. Suitable substituents are, for example, linear or branched $C_1$-$C_{18}$-alkyl, $C_2$-$C_{10}$-alkenyl or halogen, in particular fluorine.

Examples for natural or synthetic saturated fatty acids with 2 to 41 carbon atoms are acetic acid (2 C atoms in total), propionic acid (3 C atoms in total), butyric acid (4 C atoms in total), isobutyric acid (4C), valeric acid (5 C), caproic acid (6 C), enanthic acid (7 C), caprylic acid (8 C), 2-ethylhexanoic acid, pelargonic acid (9 C), neononanoic acid (9C; mixture of branched isomers of n-nonanoic acid) capric acid (10 C), 3-propylheptanoic acid (10 C), neodecanoic acid (10C; mixture of branched isomers of n-decanoic acid) undecanoic acid (11 C), lauric acid (12 C), tridecanoic acid (13 C), myristic acid (14 C), pentadecanoic acid (15 C), palmitic acid (16 C), margaric acid (17 C), stearic acid (18 C), nonadecanoic acid (19 C), arachidic acid (20 C), heneicosylic acid (21 C) and behenic acid (22 C). Examples for monounsaturated fatty acids are myristoleic acid (14 C), palmitoleic acid (C 16), oleic acid (18 C), elaidic acid (18 C), gandoleic acid (20 C); gondoic acid (20 C), cetoleic acid (22 C) and erucic acid (22 C). Examples for polyunsaturated fatty acids are linoleic acid (18 C), α-linoleic acid (18 C), γ-linoleic acid (18 C), α-eleostearic acid (18 C), β-eleostearic acid (18 C), stearidonic acid (18 C), arachidonic acid (20 C), docosadienic acid (22 C), docosatetraenoic acid (22 C), docosapentaenic acid (22 C) and docosahexaenic acid (22 C).

"(Meth)acrylate" means to subsume acrylate and methacrylate. "Poly(meth)acrylate" refers to polyacrylates, polymethacrylates or copolymers of acrylates and methacrylates.

In terms of the present invention, unless explicitly specified otherwise, "acrylate" and "methacrylate" refer to the esters of acrylic or methacrylic acid (and not to their salts). This applies of course also to polymers thereof.

Embodiments of the Invention

The remarks made below concerning preferred definitions of the variables and other reaction conditions are valid on their own as well as preferably in combination with each other.

Embodiments (E.x) of the Invention

General and preferred embodiments E.x are summarized in the following, non-exhaustive list. Further preferred embodiments become apparent from the paragraphs following this list.

E.1. A process for preparing cyclic carbonates I selected from the group consisting of compounds of formula Ia, compounds of formula Ib and mixtures thereof

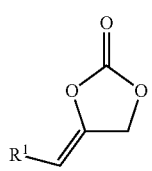
Ia

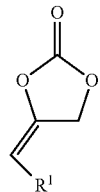
Ib 9
wherein
$R^1$ is an organic radical;
comprising the steps of
a) reacting a propargyl alcohol of formula II

II wherein $R^1$ has the same meaning as in formula Ia or Ib, with carbon dioxide,
where the reaction is carried out in at least one organic solvent L1 or in a solvent mixture containing at least one organic solvent L1 and at least one organic solvent L2; where solvent L1 has a higher polarity than solvent L2, and where solvents L1 and L2 have a miscibility gap at least between 20 and 30° C.;
where the reaction is further carried out in the presence of a silver catalyst Ag1 comprising at least one bulky ligand a carboxylate ligand,
where the bulky ligand is selected from the group consisting of ligands of the formula Ia III and ligands of the formula IV

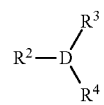
III

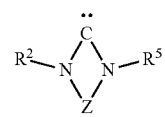
IV wherein
D is P, As or Sb;
each $R^2$ is independently an organic radical having from 1 to 40 carbon atoms;
$R^3$ and $R^4$ are identical or different, and are each an organic radical having from 1 to 40 carbon atoms,
$R^5$ is an organic radical having from 1 to 40 carbon atoms and may be different from or identical to $R^2$ present in ligand IV;
and
Z is a divalent bridging group selected from $—CR^7=CR^8—$, $—CR^7=N—$, $—CR^7R^9—CR^8R^{10}—$ and $—CR^7R^9—CR^8R^{10}—CR^{11}R^{12}—$, wherein
$R^7$, $R^8$, $R^9$, $R^{10}$, $R^{11}$ and $R^{12}$, independently of each other, are hydrogen or an organic radical having from 1 to 40 carbon atoms; or two adjacent radicals $R^7$ and $R^8$ and/or $R^{10}$ and $R^{11}$ together with the atoms connecting them form a monocyclic or polycyclic, substituted or unsubstituted, aliphatic or aromatic ring system which has from 4 to 40 carbon atoms and can also comprise at least one heteroatom selected from the group consisting of the elements Si, Ge, N, P, O and S as ring member;

and where the carboxylate ligand is according to formula V

wherein $R^6$ is an organic radical having from 1 to 40 carbon atoms;

b1) in case that step a) has not been carried out in the presence of at least one solvent L2: adding solvent L2 to the reaction mixture obtained in step a); or b2) in case that step a) has been carried out in the presence of at least one solvent L2: optionally adding solvent L2 to the reaction mixture obtained in step a);

c) subjecting the reaction mixture obtained in step a), b1) or b2) to a phase separation to obtain a product phase containing the cyclic carbonate I and the at least one solvent L1, and a catalyst phase containing the silver catalyst and the at least one solvent L2; and d) if desired isolating the cyclic carbonate I from the product phase.

E.2. The process as defined in embodiment 1, where $R^1$ is selected from the group consisting of hydrogen, aliphatic radicals, cycloaliphatic radicals, aromatic radicals, mixed aliphatic-cycloaliphatic radicals, mixed aliphatic-aromatic radicals, mixed cycloaliphatic-aromatic radicals and mixed aliphatic-cycloaliphatic-aromatic radicals, where the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic and mixed aliphatic-cycloaliphatic-aromatic radicals may be substituted by one or more halogen atoms; and where the aliphatic radicals, cycloaliphatic radicals and aromatic radicals have at least one of the following features (i) and/or (ii); and the mixed aliphatic-cycloaliphatic radicals, mixed aliphatic-aromatic radicals, mixed cycloaliphatic-aromatic radicals and mixed aliphatic-cycloaliphatic-aromatic radicals have at least one of the following features (i), (ii) and/or (iii):

(i) the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic and mixed aliphatic-cycloaliphatic-aromatic radicals are interrupted by one or more non-adjacent groups —O—, —S—, —N($R^{13}$)—, —O—C(=O)—, —C(=O)—O—, —N($R^{13}$)—C(=O)—, —C(=O)—N($R^{13}$)—, —O—C(=O)—O—, —OC(=O)—N($R^{13}$)—, —N($R^{13}$)—C(=O)—O— and/or —N($R^{13}$)—C(=O)—N($R^{13}$)—;

(ii) the aliphatic, cycloaliphatic, aromatic, mixed aliphatic-cycloaliphatic, mixed aliphatic-aromatic, mixed cycloaliphatic-aromatic and mixed aliphatic-cycloaliphatic-aromatic radicals carry one or more substituents selected from the group consisting of —OH, —SH, —N($R^{13}$)$_2$, —O—C(=O)H, —C(=O)OH, —N($R^{13}$)—C(=O)H, —C(=O)—NHR$^{13}$, —O—C(=O)—OH, —O—C(=O)—NHR$^{13}$, —N($R^{13}$)—C(=O)—OH and —N($R^{13}$)—C(=O)—NHR$^{13}$;

(iii) the aliphatic, cycloaliphatic and aromatic residues in the mixed aliphatic-cycloaliphatic, mixed aliphatic-aromatic, mixed cycloaliphatic-aromatic and mixed aliphatic-cycloaliphatic-aromatic radicals are bound to each other via a group —O—, —S—, —N($R^{13}$)—, —O—C(=O)—, —C(=O)—O—, —N($R^{13}$)—C(=O)—, —C(=O)—N($R^{13}$)—, —O—C(=O)—O—, C(=O)—N($R^{13}$)—, —N($R^{13}$)—C(=O)—O— or —N($R^{13}$)—C(=O)—N($R^{13}$)—; where each $R^{13}$ is independently hydrogen or $C_1$-$C_{10}$-alkyl.

E.3. The process as defined in embodiment 1, where the cyclic carbonate is a compound of the formula I-poly

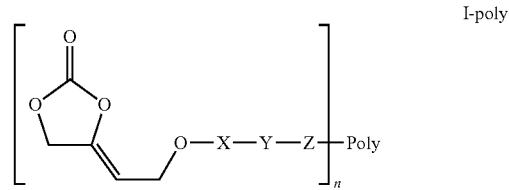

where

X is a bond or a group —C(=O)—, $^\#$—C(=O)—O—* or $^\#$—C(=O)—N($R^{13}$)—*, where $^\#$ is the attachment point to O and * is the attachment point to Y (or to Z if Y is a bond or to poly if Y and Z are a bond);

Y is a bond or a divalent aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group, where the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic and mixed aliphatic-cycloaliphatic-aromatic bridging groups may be substituted by one or more halogen atoms;

and where the aliphatic, cycloaliphatic or aromatic bridging group may have at least one of the following features (i) and/or (ii), and the mixed aliphatic-cycloaliphatic, mixed aliphatic-aromatic, mixed cycloaliphatic-aromatic or mixed aliphatic-cycloaliphatic-aromatic bridging group may have at least one of the following features (i), (ii) and/or (iii):

(i) the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group are interrupted by one or more non-adjacent groups —O—, —S—, —N($R^{13}$)—, —O—C(=O)—, —C(=O)—O—, —N($R^{13}$)—C(=O)—, —O—C(=O)—O—, —O—C(=O)—N($R^{13}$)—, —N($R^{13}$)—C(=O)—O— and/or —N($R^{13}$)—C(=O)—N($R^{13}$)—;

(ii) the aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group carries one or more substituents selected from the group consisting of —OH, —SH, —N($R^{13}$)$_2$, —O—C(=O)H, —C(=O)OH, —N($R^{13}$)—C(=O)H, —C(=O)—NH$R^{13}$, —O—C(=O)—OH, —O—C(=O)—NH$R^{13}$, —N($R^{13}$)—C(=O)—OH and —N($R^{13}$)—C(=O)—NH$R^{13}$;

(iii) the aliphatic, cycloaliphatic and/or aromatic residues in the mixed aliphatic-cycloaliphatic, mixed aliphatic-aromatic, mixed cycloaliphatic-aromatic or mixed aliphatic-cycloaliphatic-aromatic bridging group are bound to each other via a group —O—, —S—, —N($R^{13}$)—, —O—C(=O)—, —C(=O)—O—, —N($R^{13}$)—C(=O)—, —C(=O)N($R^{13}$)—, —O—C(=O)—O—, —O—C(=O)—N($R^{13}$)—, —N($R^{13}$)—C(=O)—O— or —N($R^{13}$)—C(=O)—N($R^{13}$)—;

where each $R^{13}$ is independently hydrogen or $C_1$-$C_{10}$-alkyl;

Z is a bond or a group —C(=O)—, $^\#$—C(=O)—O—* or $^\#$—C(=O)—N($R^{13}$)—* if X and Y are a bond; where $^\#$ is the attachment point to Y (or to X if Y is a bond or to O if X and Y are a bond) and * is the attachment point to Poly; or is a bond if Y is a bond and X is a group —C(=O)—, $^\#$—C(=O)—O*— or $^\#$—C(=O)—N($R^{13}$)—*, where $^\#$ is the attachment point to O; or is a bond or a group —O—, —S—, —N($R^{13}$)—, —C(=O)—, $^\#$—O—C(=O)—*, $^\#$—C(=O)—O—*, $^\#$—N($R^{13}$)—C(=O)—*, $^\#$—C(=O)—N($R^{13}$)—*, $^\#$—O—C(=O)—O—*, $^\#$—O—C(=O)—N($R^{13}$)—*, $^\#$—N($R^{13}$)—C(=O)—O—* or $^\#$—N($R^{13}$)—C(=O)—N($R^{13}$)—* if Y is a divalent aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group, where $^\#$ is the attachment point to Y;

n is from 1 to 1000; and

Poly is a residue derived from a polymer which has a number average molecular weight of from 200 to 10000;

and the propargyl alcohol is a compound of the formula II-poly

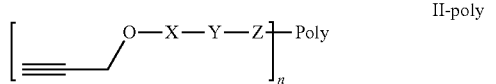

II-poly where X, Y, Z, n and Poly are as defined above.

E.4. The process as defined in embodiment 3, where

X is a bond or a group —C(=O)— or $^\#$—C(=O)—N($R^{13}$)—*, where $^\#$ is the attachment point to O and * is the attachment point to Y (or to Z if Y is a bond or to poly if Y and Z are a bond);

Y is a bond or a divalent aliphatic or mixed aliphatic-cycloaliphatic bridging group with 1 to 10 carbon atoms, where the aliphatic or mixed aliphatic-cycloaliphatic bridging group may be substituted by one or more halogen atoms;

and where the aliphatic bridging group may have at least one of the following features (i) and/or (ii), and the mixed aliphatic-cycloaliphatic bridging group may have at least one of the following features (i), (ii) and/or (iii):

(i) the aliphatic and/or cycloaliphatic residue in the aliphatic or mixed aliphatic-cycloaliphatic bridging group is interrupted by one or more non-adjacent groups —O—, —O—C(=O)—, —C(=O)—O—, and/or —O—C(=O)—O—;

(ii) the aliphatic or mixed aliphatic-cycloaliphatic bridging group carries one or more substituents selected from the group consisting of group consisting of —OH, —O—C(=O)H and —C(=O)OH;

(iii) the aliphatic and/or cycloaliphatic residues in the mixed aliphatic-cycloaliphatic bridging group are bound to each other via a group —O—, —O—C(=O)—, —C(=O)—O— or —O—C(=O)—O;

Z is a bond or a group —C(=O)— if X and Y are a bond; or is a bond if Y is a bond and X is a group —C(=O)—; or is a bond or a group $^\#$—O—C(=O)— if Y is a divalent aliphatic or mixed aliphatic-cycloaliphatic bridging group; and Poly is a residue derived from a poly-α-olefin or from a poly(meth)acrylate.

E.5. The process as defined in embodiment 4, where —X—Y—Z—, taken together, are —C(=O)—, $^\#$—CH$_2$—CH(OH)—CH$_2$—O—C(=O)—* or $^\#$—C(=O)—NH—CH$_2$CH$_2$—O—C(=O)—*, where $^\#$ is the attachment point to O and * is the attachment point to Poly.

E.6. The process as defined in embodiment 2, where the cyclic carbonate is a compound Ia, a compound Ib or a mixture thereof, in which $R^1$ is selected from the group consisting of hydrogen and $C_1$-$C_4$-alkyl carrying a group —O—$R^{14}$, where $R^{14}$ is selected from the group consisting of hydrogen, $C_1$-$C_4$-alkyl, $C_1$-$C_4$-haloalkyl, $C_1$-$C_6$-alkyl carrying 1, 2 or 3 radicals $R^{15}$; $C_1$-$C_6$-haloalkyl carrying 1, 2 or 3 radicals $R^{15}$; —C(=O)$R^{16}$, $C_3$-$C_6$-cycloalkyl, $C_3$-$C_6$-cycloalkyl carrying 1, 2 or 3 radicals $R^{17}$; phenyl and a 3-, 4-, 5- or 6-membered saturated, partially unsaturated or maximally unsaturated heterocyclic ring containing 1, 2 or 3 heteroatoms selected from N, O and S as ring members, where phenyl and the heterocyclic ring may carry one or more substituents selected from the group consisting of $C_1$-$C_4$-alkyl and $C_1$-$C_4$-alkoxy; where $R^{15}$ is selected from the group consisting of OH, $C_1$-$C_6$-alkoxy, oxiranyl, phenyl and a 3-, 4-, 5- or 6-membered saturated heterocyclic ring containing 1 or 2 oxygen atoms as ring members;

$R^{16}$ is selected from the group consisting of $C_1$-$C_6$-alkyl, $C_2$-$C_6$-alkenyl, $C_1$-$C_4$-alkoxy and —N$R^{18}R^{19}$, where $R^{18}$ is hydrogen or $C_1$-$C_4$-alkyl and $R^{19}$ is selected from the group consisting of hydrogen, $C_1$-$C_4$-alkyl, $C_1$-$C_4$-alkyl substituted by a group $R^{20}$, and phenyl which may carry 1, 2, 3, 4 or 5 substituents selected from the group consisting of $C_1$-$C_4$-alkyl and $C_1$-$C_4$-alkoxy; where $R^{20}$ is selected from the group consisting of —O—$R^{21}$, —N($R^{13}$)—$R^{21}$, —O—C(=O)—$R^{21}$, —C(=O)—O—$R^{21}$, —N($R^{13}$)—C(=O)—$R^{21}$, —C(=O)—N($R^{13}$)—$R^{21}$, —O—C(=O)—O—$R^{21}$, —O—C (=O)—N(R$^{13}$)—R$^{21}$, —N(R$^{13}$)—C(=O)—O—R$^{21}$ and —N(R$^{13}$)—C(=O)—N(R$^{13}$)—R$^{21}$, where R$^{21}$ is hydrogen,
C$_1$-C$_6$-alkyl or C$_2$-C$_6$-alkenyl, and where each R$^{13}$ is independently hydrogen or C$_1$-C$_{10}$-alkyl; and R$^{17}$ is selected from the group consisting of —O—R$^{21}$, —N(R$^{13}$)—R$^{21}$, —O—C(=O)—R$^{21}$, —C(=O)—O—R$^{21}$, —N(R$^{13}$)—C(=O)—R$^{21}$, —C(=O)—N(R$^{13}$)—R$^{21}$, —O—C(=O)—O—R$^{21}$, —O—C(=O)—N(R$^{13}$)—R$^{21}$, —N(R$^{13}$)—C(=O)—O—R$^{21}$ and —N(R$^{13}$)—C(=O)—N(R$^{13}$)—R$^{21}$, where R$^{21}$ is hydrogen, C$_1$-C$_6$-alkyl or C$_2$-C$_6$-alkenyl, and where each R$^{13}$ is independently hydrogen or C$_1$-C$_{10}$-alkyl;

or the cyclic carbonate is a compound of the formula I-bis

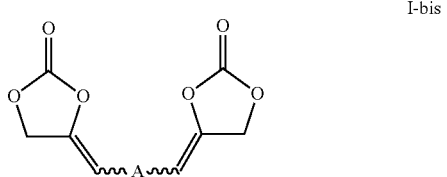

I-bis where
A is an aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group,
where the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic and mixed aliphatic-cycloaliphatic-aromatic radicals may be substituted by one or more halogen atoms; and where the aliphatic, cycloaliphatic or aromatic bridging group has at least one of the following features (i) and/or (ii), and the mixed aliphatic-cycloaliphatic, mixed aliphatic-aromatic, mixed cycloaliphatic-aromatic or mixed aliphatic-cycloaliphatic-aromatic bridging group has at least one of the following features (i), (ii) and/or (iii):

(i) the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group are interrupted by one or more non-adjacent groups —O—, —S—, —N(R$^{13}$)—, —O—C(=O)—, —C(=O)—O—, —N(R$^{13}$)—C(=O)—, —C(=O)—N(R$^{13}$)—, —O—C(=O)—O—, —O—C(=O)—N(R$^{13}$)—, —N(R$^{13}$)—C(=O)—O— and/or —N(R$^{13}$)—C(=O)—N(R$^{13}$)—;

(ii) the aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group carries one or more substituents selected from the group consisting of —OH, —SH, —N(R$^{13}$)$_2$, —O—C(=O)H, —C(=O)OH, —N(R$^{13}$)—C(=O)H, —C(=O)—NHR$^{13}$, —O—C(=O)—OH, —O—C(=O)—NHR$^{13}$, —N(R$^{13}$)C(=O)—OH and —N(R$^{13}$)—C(=O)—NHR$^{13}$;

(iii) the aliphatic, cycloaliphatic and/or aromatic residues in the mixed aliphatic-cycloaliphatic, mixed aliphatic-aromatic, mixed cycloaliphatic-aromatic or mixed aliphatic-cycloaliphatic-aromatic bridging group are bound to each other via a group —O—, —S—, —N(R$^{13}$)—, —O—C(=O)—, —C(=O)—O—, —N(R$^{13}$)—C(=O)—, —C(=O)N(R$^{13}$)—, —O—C(=O)—O—, —O—C(=O)—N(R$^{13}$)—, —N(R$^{13}$)—C(=O)—O— or —N(R$^{13}$)—C(=O)—N(R$^{13}$)—;
where each R$^{13}$ is independently hydrogen or C$_1$-C$_{10}$-alkyl;
and
the propargyl alcohol is a compound of the formula II, in which R$^1$ is selected from the group consisting of hydrogen and C$_1$-C$_4$-alkyl carrying a group —O—R$^{14}$, where R$^{14}$ is as defined above, or the propargyl alcohol is a compound of the formula II-bis

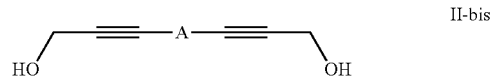

II-bis where A is as defined above.

E.7. The process as defined in embodiment 6, where the cyclic carbonate is a compound Ia, a compound Ib or a mixture thereof, in which R$^1$ is selected from the group consisting of hydrogen and —CH$_2$—O—R$^{14}$,
where
R$^{14}$ is selected from the group consisting of hydrogen, C$_1$-C$_4$-alkyl carrying 1, 2 or 3 radicals R$^{15}$; —C(=O)R$^{16}$ and C$_3$-C$_6$-cycloalkyl carrying 1, 2 or 3 radicals R$^{17}$; where
R$^{15}$ is selected from the group consisting of OH, C$_1$-C$_4$-alkoxy, phenyl and a 3-, 4-, 5- or 6-membered saturated heterocyclic ring containing 1 or 2 oxygen atoms as ring member;
R$^{16}$ is selected from the group consisting of C$_1$-C$_6$-alkyl, C$_2$-C$_6$-alkenyl, C$_1$-C$_4$-alkoxy and —NR$^{18}$R$^{19}$, where R$^{18}$ is hydrogen or C$_1$-C$_4$-alkyl and R$^{19}$ is selected from the group consisting of hydrogen, C$_1$-C$_4$-alkyl, C$_1$-C$_4$-alkyl substituted by a group R$^{20}$, and phenyl which may carry 1, 2, 3, 4 or 5 substituents selected from the group consisting of C$_1$-C$_4$-alkyl and C$_1$-C$_4$-alkoxy; where
R$^{20}$ is selected from the group consisting of —O—R$^{21}$, —N(R$^{13}$)—R$^{21}$, —O—C(=O)—R$^{21}$, —C(=O)—O—R$^{21}$, —N(R$^{13}$)—C(=O)—R$^{21}$, —C(=O)—N(R$^{13}$)—R$^{21}$, —O—C(=O)—O—R$^{21}$, —O—C(=O)—N(R$^{13}$)—R$^{21}$, —N(R$^{13}$)—C(=O)—O—R$^{21}$ and —N(R$^{13}$)—C(=O)—N(R$^{13}$)—R$^{21}$, where R$^{21}$ is hydrogen,
C$_1$-C$_6$-alkyl or C$_2$-C$_6$-alkenyl, and where each R$^{13}$ is independently hydrogen or C$_1$-C$_{10}$-alkyl; and
R$^{17}$ is selected from the group consisting of —O—R$^{21}$, —N(R$^{13}$)—R$^{21}$, —O—C(=O)—R$^{21}$, —C(=O)—O—R$^{21}$, —N(R$^{13}$)—C(=O)—R$^{21}$, —C(=O)—N(R$^{13}$)—R$^{21}$, —O—C(=O)—O—R$^{21}$, —O—C(=O)—N(R$^{13}$)—R$^{21}$, —N(R$^{13}$)—C(=O)—O—R$^{21}$ and —N(R$^{13}$)—C(=O)—N(R$^{13}$)—R$^{21}$, where R$^{21}$ is hydrogen, C$_1$-C$_6$-alkyl or C$_2$-C$_6$-alkenyl, and where each R$^{13}$ is independently hydrogen or C$_1$-C$_{10}$-alkyl;

or the cyclic carbonate is a compound of the formula I-bis as defined in embodiment 6, where A is selected from following bridging groups:
—CH$_2$—O—CH$_2$-1,4-phenylene-CH$_2$—O—CH$_2$—;
—CH$_2$—O—C(=O)—NH—1,4-toluylene-NH—C (=O)—O—CH$_2$—; —CH$_2$—O—CH$_2$—CH(OH)—CH$_2$—O—(CH$_2$)$_3$—O—CH$_2$—CH(OH)—CH$_2$—O—CH$_2$—; —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—; and —CH$_2$—(OCH$_2$CH$_2$)$_3$—O—CH$_2$—;

and the propargyl alcohol is a compound of the formula II, in which R$^1$ is selected from the group consisting of hydrogen and —CH$_2$—O—R$^{14}$, where R$^{14}$ is as defined above, or the propargyl alcohol is a compound of the formula II-bis as defined in embodiment 6, where A is as defined above.

E.8. The process as defined in embodiment 7, where the cyclic carbonate is a compound Ia, a compound Ib or a mixture thereof, in which R$^1$ is selected from the group consisting of hydrogen and —CH$_2$—O—R$^{14}$, where R$^{14}$ is selected from the group consisting of hydrogen, C$_1$-C$_4$-alkyl carrying 1, 2 or 3 radicals R$^{15}$; —C(O)CH$_3$, —C(=O)H and —C(O)OCH$_3$;

where R$^{15}$ is selected from the group consisting of OH and C$_1$-C$_4$-alkoxy;

or the cyclic carbonate is a compound of the formula I-bis as defined in embodiment 6, where A is —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—;

and the propargyl alcohol is a compound of the formula II, in which R$^1$ is selected from the group consisting of hydrogen and —CH$_2$—O—R$^{14}$, where R$^{14}$ is as defined above, or the propargyl alcohol is a compound of the formula II-bis as defined in embodiment 6, where A is as defined above.

E.9. The process as defined in embodiment 8, where the cyclic carbonate is a compound Ia, a compound Ib or a mixture thereof, in which R$^1$ is selected from the group consisting of hydrogen and —CH$_2$—O—R$^{14}$, where R$^{14}$ is selected from the group consisting of hydrogen and C$_1$-C$_4$-alkyl carrying 1 or 2 radicals R$^{15}$;

where R$^{15}$ is selected from the group consisting of OH and C$_1$-C$_4$-alkoxy;

or the cyclic carbonate is a compound of the formula I-bis as defined in embodiment 6, where A is —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—;

and the propargyl alcohol is a compound of the formula II, in which R$^1$ is selected from the group consisting of hydrogen and —CH$_2$—O—R$^{14}$, where R$^{14}$ is as defined above, or the propargyl alcohol is a compound of the formula II-bis as defined in embodiment 6, where A is as defined above.

E.10. The process as defined in embodiment 9, where the cyclic carbonate is a compound Ia, a compound Ib or a mixture thereof, in which R$^1$ is selected from the group consisting of hydrogen and —CH$_2$—O—R$^{14}$, where R$^{14}$ is —CH$_2$—CH(OH)—CH$_2$—O—C(CH$_3$)$_3$ or —CH$_2$—CH(OH)—CH$_2$—OH; or the cyclic carbonate is a compound of the formula I-bis as defined in embodiment 6, where A is —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—; and the propargyl alcohol is a compound of the formula II, in which R$^1$ is selected from the group consisting of hydrogen and —CH$_2$—O—R$^{14}$, where R$^{14}$ is —CH$_2$—CH(OH)—CH$_2$—O—C(CH$_3$)$_3$ or —CH$_2$—CH(OH)—CH$_2$—OH; or the propargyl alcohol is a compound of the formula II-bis as defined in embodiment 6, where A is —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—.

E.11. The process as defined in embodiment 10, where the cyclic carbonate is a compound Ia, a compound Ib or a mixture thereof, in which R$^1$ is selected from the group consisting of hydrogen and —CH$_2$—O—R$^{14}$, where R$^{14}$ is —CH$_2$—CH(OH)—CH$_2$—O—C(CH$_3$)$_3$; or the cyclic carbonate is a compound of the formula I-bis as defined in embodiment 6, where A is —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—; and the propargyl alcohol is a compound of the formula II, in which R$^1$ is selected from the group consisting of hydrogen and —CH$_2$—O—R$^{14}$, where R$^{14}$ is —CH$_2$—CH(OH)—CH$_2$—O—C(CH$_3$)$_3$; or the propargyl alcohol is a compound of the formula II-bis as defined in embodiment 6, where A is —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—.

E.12. The process as defined in embodiment 11, where the cyclic carbonate is a compound Ia, a compound Ib or a mixture thereof, in which R$^1$ is selected from the group consisting of hydrogen and —CH$_2$—O—R$^{14}$, where R$^{14}$ is —CH$_2$—CH(OH)—CH$_2$—O—C(CH$_3$)$_3$; and the propargyl alcohol is a compound of the formula II, in which R$^1$ is selected from the group consisting of hydrogen and —CH$_2$—O—R$^{14}$, where R$^{14}$ is —CH$_2$—CH(OH)—CH$_2$—O—O(CH$_3$)$_3$.

E.13. The process as defined in embodiment 12, where the cyclic carbonate is a compound Ia, a compound Ib or a mixture thereof, in which R$^1$ is hydrogen, and where the propargyl alcohol is a compound of the formula II, in which R$^1$ is hydrogen.

E.14. The process as defined in any of the preceding embodiments, where the bulky ligand is a ligand of formula III, where D is P or As, R$^2$ is a cyclic radical selected from the group consisting of monocyclic or polycyclic C$_3$-C$_{40}$-cycloalkyl, monocyclic or polycyclic C$_3$-C$_{40}$-cycloalkenyl, C$_6$-C$_{40}$-aryl and a 3- to 40 membered saturated, partially unsaturated or maximally unsaturated mono- or polycyclic heterocyclic ring, where the cyclic radical may be bound via an oxygen atom to D and where the cyclic radical may carry one or more substituents selected from the group consisting of C$_1$-C$_6$-alkyl, C$_1$-C$_6$-alkoxy, phenyl optionally substituted by 1, 2, 3, 4 or substituents R$^{22}$, naphthyl optionally substituted by 1, 2, 3, 4 or substituents R$^{22}$, a monocyclic 5- or 6-membered heteroaromatic ring containing 1, 2, 3 or 4 heteroatoms selected from the group consisting of N, O and S as ring members and optionally substituted by 1, 2 or 3 or substituents R$^{23}$, and a fused bicyclic 8- to 10-membered heteroaromatic ring system containing 1, 2, 3 or 4 heteroatoms selected from the group consisting of N, O and S as ring members and optionally substituted by 1, 2 or 3 or substituents R$^{23}$, where each R$^{22}$ is independently selected from the group consisting of C$_1$-C$_6$-alkyl, C$_1$-C$_6$-alkoxy, NR$^{24}$R$^{25}$, where R$^{24}$ and R$^{25}$, independently of each other, are hydrogen or C$_1$-C$_{12}$-alkyl; phenyl, naphthyl and a monocyclic saturated, partially unsaturated or maximally unsaturated 5- or 6-membered heterocyclic ring containing 1, 2, 3 or 4 heteroatoms selected from the group consisting of N, O and S as ring members, where the three last-mentioned cyclic radicals may in turn carry 1, 2, 3, 4 or 5 substituents selected from the group consisting of halogen, $C_1$-$C_4$-alkyl and $C_1$-$C_4$-alkoxy; and each $R^{23}$ has independently one of the meanings given for $R^{22}$;

and $R^3$ and $R^4$, independently of each other, are selected from the group consisting of $C_1$-$C_6$-alkyl, monocyclic or polycyclic $C_3$-$C_{40}$-cycloalkyl, monocyclic or polycyclic $C_3$-$C_{40}$-cycloalkenyl and $C_6$-$C_{10}$-aryl.

E.15. The process as defined in embodiment 14, where D is P;

$R^2$ is phenyl optionally substituted by 1, 2, 3, 4 or substituents $R^{22}$, ortho-biphenyl optionally substituted by 1, 2, 3, 4 or substituents $R^{22}$, naphthyl optionally substituted by 1, 2, 3, 4 or substituents $R^{22}$, ortho-binaphthyl optionally substituted by 1, 2, 3, 4 or substituents $R^{22}$, a monocyclic 5- or 6-membered heteroaromatic containing 1, 2 or 3 nitrogen atoms as ring members and optionally substituted by 1, 2 or 3 or substituents $R^{23}$, and a fused bicyclic 8- to 10-membered heteroaromatic ring system containing 1, 2 or 3 or 4 nitrogen atoms as ring members and optionally substituted by 1, 2 or 3 or substituents $R^{23}$, where each $R^{22}$ is independently selected from the group consisting of $C_1$-$C_4$-alkyl, $C_1$ alkoxy, $NR^{24}R^{25}$, where $R^{24}$ and $R^{25}$, independently of each other, are hydrogen or $C_1$-$C_{10}$-alkyl; phenyl optionally substituted by 1, 2, 3, 4 or 5 substituents selected from the group consisting of halogen, $C_1$-$C_4$-alkyl and $C_1$-$C_4$-alkoxy; and a monocyclic saturated, partially unsaturated or maximally unsaturated 5- or 6-membered heterocyclic ring containing 1, 2 or 3 heteroatoms selected from the group consisting of N and O as ring members; and each $R^{23}$ is independently phenyl optionally substituted by 1, 2, 3, 4 or 5 substituents selected from the group consisting of halogen, $C_1$-$C_4$-alkyl and $C_1$-$C_4$-alkoxy; and $R^3$ and $R^4$, independently of each other, are selected from the group consisting of branched $C_3$-$C_6$-alkyl, monocyclic $C_3$-$C_6$-cycloalkyl, adamantyl and phenyl.

E.16. The process as defined in embodiment 15, where D is P;

$R^2$ is phenyl substituted by $NR^{24}R^{25}$, where $R^{24}$ and $R^{25}$, independently of each other, are hydrogen or $C_1$-$C_{10}$-alkyl; or is ortho-biphenyl substituted by 1, 2, 3 or 4 substituents $R^{22}$, where each $R^{22}$ is independently selected from the group consisting of $C_1$-$C_4$-alkyl and $NR^{24}R^{25}$, where $R^{24}$ and $R^{25}$, independently of each other, are hydrogen or $C_1$-$C_{10}$-alkyl.

E.17. The process as defined in embodiment 16, where $R^{24}$ and $R^{25}$, independently of each other, are $C_3$-$C_{10}$-alkyl.

E.18. The process as defined in embodiment 14, where the bulky ligand is selected from the compounds of formulae A to W and mixtures thereof, where A to W are as defined below.

E.19. The process as defined in embodiment 18, where the bulky ligand is selected from the compounds of formulae D, V, W and mixtures thereof.

E.20. The process as defined in embodiment 19, where the bulky ligand is the compound of formula D (XPhos).

E.21. The process as defined in any of embodiments 1 to 13, where the bulky ligand is a ligand of formula IV, where $R^2$ and $R^5$, independently of each other, are $C_6$-$C_{10}$-aryl optionally substituted by 1, 2, 3, 4 or 5 substituents selected from the group consisting of $C_1$-$C_6$-alkyl, $C_1$-$C_6$-alkoxy and $C_3$-$C_6$-cycloalkyl, and Z is —$CR^7$=$CR^8$— where $R^7$ and $R^8$, independently of each other, are hydrogen or $C_1$-$C_6$-alkyl.

E.22. The process as defined in embodiment 21, where $R^2$ and $R^5$ are 2,6-diisopropylphenyl and Z is —CH=CH—.

E.23. The process as defined in any of the preceding embodiments, where $R^6$ is selected from the group consisting of $C_1$-$C_{40}$-alkyl, $C_2$-$C_{40}$-alkenyl, $C_1$-$C_6$-alkyl carrying a $C_3$-$C_{10}$-cycloalkyl ring, where the $C_3$-$C_{10}$-cycloalkyl ring may carry 1, 2, 3, 4 or 5 $C_1$-$C_6$-alkyl substituents; $C_1$-$C_4$-alkyl carrying a $C_6$-$C_{10}$-aryl ring, where the $C_6$-$C_{10}$-aryl ring may carry 1, 2, 3, 4 or 5 substituents selected from the group consisting of $C_1$-$C_6$-alkyl and $C_1$-$C_6$-alkoxy; and $C_6$-$C_{10}$-aryl which may carry 1, 2, 3, 4 or 5 substituents selected from the group consisting of $C_1$-$C_6$-alkyl and $C_1$-$C_6$-alkoxy.

E.24. The process as defined in embodiment 23, where $R^6$ is selected from the group consisting of $C_1$-$C_{30}$-alkyl, $C_6$-$C_{30}$-alkenyl and $C_1$-$C_4$-alkyl carrying a $C_3$-$C_6$-cycloalkyl ring.

E.25. The process as defined in embodiment 24, where $R^6$ is selected from the group consisting of $C_1$-$C_{22}$-alkyl and $C_1$-$C_4$-alkyl carrying a $C_5$-$C_6$-cycloalkyl ring.

E.26. The process as defined in embodiment 25, where $R^6$ is selected from the group consisting of $C_1$-$C_{20}$-alkyl and $C_2$-$C_4$-alkyl carrying a cyclohexyl ring.

E.27. The process as defined in embodiment 26, where $R^6$ is selected from the group consisting of $C_8$-$C_{18}$-alkyl and $C_2$-$C_4$-alkyl carrying a cyclohexyl ring.

E.28. The process as defined in any of embodiments 1 to 22, where $R^6$ is selected from the group consisting of $C_2$-$C_{40}$-alkyl, $C_2$-$C_{40}$-alkenyl, $C_1$-$C_6$-alkyl carrying a $C_3$-$C_{10}$-cycloalkyl ring, where the $C_3$-$C_{10}$-cycloalkyl ring may carry 1, 2, 3, 4 or 5 $C_1$-$C_6$-alkyl substituents; $C_1$-$C_4$-alkyl carrying a $C_6$-$C_{10}$-aryl ring, where the $C_6$-$C_{10}$-aryl ring may carry 1, 2, 3, 4 or 5 substituents selected from the group consisting of $C_1$-$C_6$-alkyl and $C_1$-$C_6$-alkoxy; and $C_6$-$C_{10}$-aryl which may carry 1, 2, 3, 4 or 5 substituents selected from the group consisting of $C_1$-$C_6$-alkyl and $C_1$-$C_6$-alkoxy.

E.29. The process as defined in embodiment 28, where $R^6$ is selected from the group consisting of $C_6$-$C_{30}$-alkyl, $C_6$-$C_{30}$-alkenyl and $C_1$-$C_4$-alkyl carrying a $C_3$-$C_6$-cycloalkyl ring.

E.30. The process as defined embodiment 29, where $R^6$ is selected from the group consisting of $C_6$-$C_{22}$-alkyl and $C_1$-$C_4$-alkyl carrying a $C_5$-$C_6$-cycloalkyl ring.

E.31. The process as defined in embodiment 30, where $R^6$ is selected from the group consisting of $C_8$-$C_{20}$-alkyl and $C_2$-$C_4$-alkyl carrying a cyclohexyl ring.

E.32. The process as defined in embodiment 31, where $R^6$ is selected from the group consisting of $C_8$-$C_{18}$-alkyl and $C_2$-$C_4$-alkyl carrying a cyclohexyl ring.

E.33. The process as defined in any of the preceding embodiments, where the silver catalyst Ag1 is a pre-formed catalyst or is formed in situ by reaction of a silver pre-catalyst, which is a silver compound or silver salt which does not contain the bulky ligand, with a compound of formula III, a carbene of formula IV or a precursor of the carbene of the formula IV; where in case that the silver pre-catalyst does not contain the carboxylate ligand V, the silver pre-catalyst is also reacted with the corresponding acid $R^6$—C(=O)OH of the carboxylate ligand V or with a salt thereof of the formula
$R^6$—C(=O)O$^-$M$^+$, where M$^+$ is a cation equivalent;
where in case of an situ formation of the silver catalyst Ag 1, the compound of formula III, the carbene of formula IV or the precursor of the carbene of the formula IV is used in an amount of from 0.2 to 1.8 mol per mol of silver present in the silver pre-catalyst.

E.34. The process as defined in embodiment 33, where the precursor of the carbene of the formula IV is a compound of the formula VI

VI wherein $R^2$, $R^5$ and Z are defined in any of embodiments 1, 21 or 22 and X$^-$ is an anion equivalent, where in case that the compound VI is used, this is used together with a base;

E.35. The process as defined in any of embodiments 33 or 34, where in case of an situ formation of the silver catalyst Ag 1, the compound of formula III, the carbene of formula IV or the precursor of the carbene of the formula IV is used in an amount of from 0.3 to 1.5 mol per mol of silver present in the silver pre-catalyst.

E.36. The process as defined in embodiment 35, where in case of an situ formation of the silver catalyst Ag 1, the compound of formula III, the carbene of formula IV or the precursor of the carbene of the formula IV is used in an amount of from 0.4 to 1.2 mol per mol of silver present in the silver pre-catalyst.

E.37. The process as defined in embodiment 36, where in case of an situ formation of the silver catalyst Ag 1, the compound of formula III, the carbene of formula IV or the precursor of the carbene of the formula IV is used in an amount of from 0.8 to 1.2 mol per mol of silver present in the silver pre-catalyst.

E.38. The process as defined in any of the preceding embodiments, where the silver catalyst Ag1 is used in step a) in an amount of from 0.001 to 50 mol %, based on the amount of the propargylic alcohol of the formula II.

E.39. The process as defined in embodiment 38, where the silver catalyst Ag1 is used in step a) in an amount of from 0.001 to 20 mol %, based on the amount of the propargylic alcohol of the formula II.

E.40. The process as defined in embodiment 39, where the silver catalyst $Ag_1$ is used in step a) in an amount of from 0.005 to 10 mol %, based on the amount of the propargylic alcohol of the formula II.

E.41. The process as defined in embodiment 40, where the silver catalyst Ag1 is used in step a) in an amount of from 0.01 to 5 mol %, based on the amount of the propargylic alcohol of the formula II.

E.42. The process as defined in embodiment 41, where the silver catalyst Ag1 is used in step a) in an amount of from 0.5 to 3 mol-%, based on the amount of the propargylic alcohol of the formula II.

E.43. The process as defined in any of the preceding embodiments, where the solvent L1 is a polar aprotic solvent with a dipole moment of at least $10 \cdot 10^{-30}$ C·m.

E.44. The process as defined in embodiment 43, where the solvent L1 is a polar aprotic solvent with a dipole moment of at least $11 \cdot 10^{-30}$ C·m.

E.45. The process as defined in any of the preceding embodiments, where the solvent L2 is a non-polar solvent with a dipole moment of at most $2 \cdot 10^{-30}$ C·m, E.46. The process as defined in embodiment 45, where the solvent L2 is a non-polar solvent with a dipole moment of at most $1 \cdot 10^{-30}$ C·m.

E.47. The process as defined in embodiment 46, where the solvent L2 is a non-polar solvent with a dipole moment of 0 C·m.

E.48. The process as defined in any of the preceding embodiments, where the solvent L1 is selected from the group consisting of amides, ureas, nitriles, sulfoxides, sulfones, ethers, esters, carbonates, nitro compounds and mixtures thereof, and the solvent L2 is selected from the group consisting of alkanes, cycloalkanes and
$C_1$-$C_2$-alkyl esters of $C_{12}$-$C_{20}$-fatty acids;

E.49. The process as defined in embodiment 48, where the solvent L1 is a polar aprotic solvent and selected from the group consisting of formamide, N-methylformamide, N,N-dimethylformamide, N,N-dimethylacetamide, tetramethylurea, N,N-dimethylimidazolinone, N,N-dimethylpropyleneurea, acetonitrile, propionitrile, benzonitrile, dimethylsulfoxide, sulfolane, dimethylcarbonate, diethylcarbonate, ethylene carbonate, propylene carbonate, nitromethane, nitrobenzene and mixtures thereof.

E.50. The process as defined in any of embodiments 48 or 49, where the solvent L2 is selected from the group consisting of $C_5$-$C_{15}$-alkanes, $C_5$-$C_8$-cycloalkanes which may carry a $C_1$-$C_2$-alkyl substituent, $C_1$-$C_2$-alkyl esters of $C_{12}$-$C_{20}$-fatty acids and mixtures thereof.

E.51. The process as defined in any embodiments 48 to 50, where
solvent L1 is acetonitrile and solvent L2 is selected from the group consisting of $C_5$-$C_{14}$-alkanes, $C_5$-$C_8$-cycloalkanes which may carry a $C_1$-$C_2$-alkyl substituent, and $C_1$-$C_2$-alkyl esters of saturated $C_{12}$-$C_{20}$ fatty acids; or
solvent L1 is dimethylformamide and solvent L2 is selected from the group consisting of $C_5$-$C_{14}$-alkanes, $C_5$-$C_8$-cycloalkanes which may carry a $C_1$-$C_2$-alkyl substituent, and $C_1$-$C_2$-alkyl esters of saturated $C_{12}$-$C_{20}$ fatty acids.

E.52. The process as defined in embodiment 51, where
solvent L1 is acetonitrile and solvent L2 is selected from the group consisting of $C_5$-$C_{12}$-alkanes and $C_6$-$C_8$-cycloalkanes; or
solvent L1 is dimethylformamide and solvent L2 is selected from the group consisting of $C_5$-$C_{12}$-alkanes and $C_5$-$C_8$-cycloalkanes.

E.53. The process as defined in embodiment 52, where solvent L1 is acetonitrile and solvent L2 is cyclohexane or decane, or solvent L1 is dimethylformamide and solvent L2 is hexane.

E.54. The process as defined in embodiment 53, where solvent L1 is acetonitrile and solvent L2 is cyclohexane or decane.

E.55. The process as defined in any of the preceding embodiments, where in step a) the propargyl alcohol is present in an amount of from 0.1 to 25% by weight, relative to the overall weight of all solvents used in step a).

E.56. The process as defined in embodiment 55, where in step a) the propargyl alcohol is present in an amount of from 0.5 to 20% by weight, relative to the overall weight of all solvents used in step a).

E.57. The process as defined in embodiment 56, where in step a) the propargyl alcohol is present in an amount of from 1 to 20% by weight, relative to the overall weight of all solvents used in step a).

E.58. The process as defined in embodiment 57, where in step a) the propargyl alcohol is present in an amount of from 1 to 15% by weight, relative to the overall weight of all solvents used in step a).

E.59. The process as defined in any of the preceding embodiments, where step a) is carried out at a pressure in the range of from 0.1 to 200 bar.

E.60. The process as defined in embodiment 59, where step a) is carried out at a pressure in the range of from 1 to 100 bar.

E.61. The process as defined in embodiment 60, where step a) is carried out at a pressure in the range of from 5 to 80 bar.

E.62. The process as defined in any of the preceding embodiments, where step a) is carried out at a temperature in the range of from 0 to 100° C.

E.63. The process as defined in embodiment 62, where step a) is carried out at a temperature in the range of from 10 to 80° C.

E.64. The process as defined in embodiment 63, where step a) is carried out at a temperature in the range of from 10 to 40° C.

E.65. The process as defined in any of the preceding embodiments, where in step a) no solvent L2 is used and step b1) is carried out.

E.66. The process as defined in any of the preceding embodiments, where in step c) the solvent L1 and the solvent L2 are present in an overall weight ratio of from 80:20 to 20:80

E.67. The process as defined in embodiment 66, where in step c) the solvent L1 and the solvent L2 are present in an overall weight ratio of from 70:30 to 30:70.

E.68. The process as defined in embodiment 67, where in step c) the solvent L1 and the solvent L2 are present in an overall weight ratio of from 60:40 to 40:60.

E.69. The process as defined in any of the preceding embodiments, where the product phase obtained in step c) contains more than 50% by weight of the cyclic carbonate I formed in step a), and the catalyst phase contains more than 50% by weight of the silver catalyst.

E.70. The process as defined in embodiment 69, where the product phase obtained in step c) contains more than 66.7% by weight of the cyclic carbonate I formed in step a), and the catalyst phase contains more than 66.7% by weight of the silver catalyst.

E.71. The process as defined in embodiment 70, where the product phase obtained in step c) contains more than 83.3% by weight of the cyclic carbonate I formed in step a), and the catalyst phase contains more than 83.3% by weight of the silver catalyst.

Radical $R^1$

In compounds I and II, $R^1$ is an organic radical. As explained above, this radical may be derived from a discrete molecule or from a polymer. If $R^1$ is derived from a polymer, the starting compound II generally contains more than one group —C≡C—$CH_2$OH (and logically the final product generally contains more than one cyclic carbonate group bound via a vinylidene group). As already explained above, this group may be bound directly or via a linking group to the polymer backbone. Just by way of example, a polymer or a monomer containing carboxyl groups or carboxy) derivatives prone to (trans)esterification reactions or containing oxiranyl rings such as present in glycidyl residues or containing chlorohydrin residues or isocyanate groups (—NCO) or other groups which can react with an alcohol group in the side chains may be reacted with 1,4-butynediol or another diol containing a propargylic alcohol group to give a (polymeric) compound II in which $R^1$ is derived from a polymer containing numerous groups —C≡C—$CH_2$OH in its side chain. If a monomer is reacted with 1,4-butynediol or another diol, the polymer is of course obtained after polymerization of this monomer. In the product I resulting from reaction of the polymer with $CO_2$, $R^1$ is derived from a polymer containing numerous cyclic carbonate groups (to be more precise 1,3-dioxolan-2-on-4-yl rings) bound via an exocyclic vinylidene group. Alternatively, the monomer can be first reacted with $CO_2$ under the reaction conditions described above and below to give a monomer containing an exo-vinylidene-bound cyclic carbonate and the monomer is polymerized subsequently. Alternatively, the monomer can be first reacted with $CO_2$ under the reaction conditions described above and below to give a monomer containing an exo-vinylidene-bound cyclic carbonate and the monomer is polymerized subsequently. Just by way of example, a polyacrylic acid or polymethacrylic acid or a polyacrylate or polymethacrylate prone to transesterification can be esterified with 1,4-butynediol to give a polymer with repeat units —[—$CH_2$—CH(C(=O)O$CH_2$C≡$CH_2$OH)—]— or —[—$CH_2$—C$CH_3$(C(=O)O$CH_2$C≡$CH_2$OH)—]—; or a polyacrylate or polymethacrylate containing NCO groups in the alcohol-derived part of the ester (the alcohol-derived part being e.g. derived from HO—$CH_2CH_2$—NCO) can be reacted in an addition reaction with 1,4-butynediol to give a polymer with repeat units —[—$CH_2$—CH(C(=O)O—$CH_2CH_2$—NH—C(=O)—O—$CH_2$C≡$CH_2$OH)—]— or —[—$CH_2$—C($CH_3$)(C(=O)O—$CH_2CH_2$—NH—C(=O)—O—$CH_2$C≡$CH_2$OH)—]—; or a polyacrylate or polymethacrylate containing glycidyl residues or chlorohydrin residues can be reacted in an addition or substitution reaction with 1,4-butynediol. Alternatively, a corresponding acrylate or methacrylate monomer is first prepared by the above-described esterification/addition/substitution reactions and then polymerized. In yet another alternative, a corresponding acrylate or methacrylate monomer can be grafted on a polymer with a suitable backbone, e.g. on a polyethylene or polypropylene polymer. The polymer residue is however not limited to these few examples; it can be derived from very different polymer types, such as polymers with a polyolefin backbone, poly(meth)acrylates, polyesters, polyethers, polyurethanes, polyureas, polyamides, polycarbonates etc.

Just to avoid any doubt, in case $R^1$ is derived from a discrete molecule, the starting compound may of course nevertheless contain more than one group —C≡C—$CH_2$OH (and the final compound logically also more than one cyclic carbonate group bound via an vinylidene group).

In a preferred embodiment, the cyclic carbonate is a compound Ia, a compound Ib or a mixture thereof, in which $R^1$ is selected from the group consisting of hydrogen, aliphatic radicals, cycloaliphatic radicals, aromatic radicals, mixed aliphatic-cycloaliphatic radicals, mixed aliphatic-aromatic radicals, mixed cycloaliphatic-aromatic radicals and mixed aliphatic-cycloaliphatic-aromatic radicals;

where the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic and mixed aliphatic-cycloaliphatic-aromatic radicals may be substituted by one or more halogen atoms; and where the aliphatic radicals, cycloaliphatic radicals and aromatic radicals have at least one of the following features (i) and/or (ii); and the mixed aliphatic-cycloaliphatic radicals, mixed aliphatic-aromatic radicals, mixed cycloaliphatic-aromatic radicals and mixed aliphatic-cycloaliphatic-aromatic radicals have at least one of the following features (i), (ii) and/or (iii):

(i) the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic and mixed aliphatic-cycloaliphatic-aromatic radicals are interrupted by one or more non-adjacent groups —O—, —S—, —N($R^{13}$)—, —O—C(=O)—, —C(=O)—O—, —N($R^{13}$)—C(=O)—, —C(=O)—N($R^{13}$)—, —O—C(=O)—O—, —O—C(=O)—N($R^{13}$)—, —N($R^{13}$)—C(=O)—O— and/or —N($R^{13}$)—C(=O)—N($R^{13}$)—;

(ii) the aliphatic, cycloaliphatic, aromatic, mixed aliphatic-cycloaliphatic, mixed aliphatic-aromatic, mixed cycloaliphatic-aromatic and mixed aliphatic-cycloaliphatic-aromatic radicals carry one or more substituents selected from the group consisting of —OH, —SH, —N($R^{13}$)$_2$, —O—C(=O)H, —C(=O)OH, —N($R^{13}$)—C(=O)H, —C(=O)—NH$R^{13}$, —O—C(=O)—OH, —O—C(=O)—NH$R^{13}$, —N($R^{13}$)—C(=O)—OH and —N($R^{13}$)—C(=O)—N H $R^{13}$;

(iii) the aliphatic, cycloaliphatic and aromatic residues in the mixed aliphatic-cycloaliphatic, mixed aliphatic-aromatic, mixed cycloaliphatic-aromatic and mixed aliphatic-cycloaliphatic-aromatic radicals are bound to each other via a group —O—, —S—, —N($R^{13}$)—, —O—C(=O)—, —C(=O)—O—, —N($R^{13}$)—C(=O)—, —C(=O)—N($R^{13}$)—, —O—C(=O)—O—, —O—C(=O)—N($R^{13}$)—, —N($R^{13}$)—C(=O)—O— or —N($R^{13}$)—C(=O)—N($R^{13}$)—;

where each $R^{13}$ is independently hydrogen or $C_1$-$C_{10}$-alkyl.

In a more preferred embodiment, the cyclic carbonate is a compound Ia, a compound Ib or a mixture thereof, in which $R^1$ is selected from the group consisting of hydrogen and $C_1$-$C_4$-alkyl carrying a group —O—$R^{14}$, where $R^{14}$ is selected from the group consisting of hydrogen, $C_1$-$C_4$-alkyl, $C_1$-$C_4$-haloalkyl, $C_1$-$C_6$-alkyl carrying 1, 2 or 3 radicals $R^{15}$; $C_1$-$C_6$-haloalkyl carrying 1, 2 or 3 radicals $R^{15}$; —C(=O)$R^{16}$, $C_3$-$C_6$-cycloalkyl, $C_3$-$C_6$-cycloalkyl carrying 1, 2 or 3 radicals $R^{17}$; phenyl and a 3-, 4-, 5- or 6-membered saturated, partially unsaturated or maximally unsaturated heterocyclic ring containing 1, 2 or 3 heteroatoms selected from N, O and S as ring members, where phenyl and the heterocyclic ring may carry one or more substituents selected from the group consisting of $C_1$-$C_4$-alkyl and $C_1$-$C_4$-alkoxy; where $R^{15}$ is selected from the group consisting of OH, $C_1$-$C_6$-alkoxy, oxiranyl, phenyl and a 3-, 4-, 5- or 6-membered saturated heterocyclic ring containing 1 or 2 oxygen atoms as ring members;

$R^{16}$ is selected from the group consisting of $C_1$-$C_6$-alkyl, $C_2$-$C_6$-alkenyl, $C_1$-$C_4$-alkoxy and —N$R^{18}R^{10}$, where $R^{18}$ is hydrogen or $C_1$-$C_4$-alkyl and $R^{19}$ is selected from the group consisting of hydrogen, $C_1$-$C_4$-alkyl, $C_1$-$C_4$-alkyl substituted by a group $R^{20}$, and phenyl which may carry 1, 2, 3, 4 or 5 substituents selected from the group consisting of $C_1$-$C_4$-alkyl and $C_1$-$C_4$-alkoxy; where $R^{20}$ is selected from the group consisting of —O—$R^{21}$, —N($R^{13}$)—$R^{21}$, —O—C(=O)—$R^{21}$, —C(=O)—O—$R^{21}$, —N($R^{13}$)—C(=O)—$R^{21}$, —C(=O)—N($R^{13}$)—$R^{21}$, —O—C(=O)—O—$R^{21}$, —O—C(=O)—N($R^{13}$)—$R^{21}$, —N($R^{13}$)—C(=O)—O—$R^{21}$ and —N($R^{13}$)—C(=O)—N($R^{13}$)—$R^{21}$, where $R^{21}$ is hydrogen, $C_1$-$C_6$-alkyl or $C_2$-$C_6$-alkenyl, and where each $R^{13}$ is independently hydrogen or $C_1$-$C_{10}$-alkyl; and $R^{17}$ is selected from the group consisting of —N($R^{13}$)—$R^{21}$, —O—C(=O)—$R^{21}$, —C(=O)—O—$R^{21}$, —N($R^{13}$)—C(=O)—$R^{21}$, —C(=O)—N($R^{13}$)—$R^{21}$, —O—C(=O)—O—$R^{21}$, —O—C(=O)—N($R^{13}$)—$R^{21}$, —N($R^{13}$)—C(=O)—O—$R^{21}$ and —N($R^{13}$)—C(=O)—N($R^{13}$)—$R^{21}$, where $R^{21}$ is hydrogen, $C_1$-$C_6$-alkyl or $C_2$-$C_6$-alkenyl, and where each $R^{13}$ is independently as defined above (i.e. hydrogen or $C_1$-$C_{10}$-alkyl);

or the cyclic carbonate is a compound of the formula I-bis

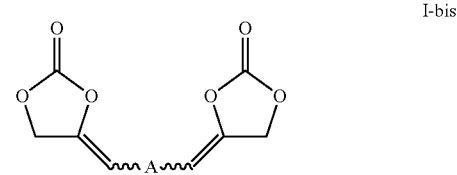

I-bis where

A is an aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group, where the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic and mixed aliphatic-cycloaliphatic-aromatic radicals may be substituted by one or more halogen atoms; and where the aliphatic, cycloaliphatic or aromatic bridging group has at least one of the following features (i) and/or (ii), and the mixed aliphatic-cycloaliphatic, mixed aliphatic-aromatic, mixed cycloaliphatic-aromatic or mixed aliphatic-cycloaliphatic-aromatic bridging group has at least one of the following features (i), (ii) and/or (iii):

(i) the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group are interrupted by one or more non-adjacent groups —O—, —S—, —N($R^{13}$)—, —O—C(=O)—, —C(=O)—O—, —N($R^{13}$)—C(=O)—, —C(=O)—N($R^{13}$)—, —O—C(=O)—O—, —O—C(=O)—N($R^{13}$)—, —N($R^{13}$)—C(=O)—O— and/or —N($R^{13}$)—C(=O)—N($R^{13}$)—;

(ii) the aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group carries one or more substituents selected from the group consisting of —OH, —SH, —N($R^{13}$)$_2$, —O—C(=O)H, —C(=O)OH, —N($R^{13}$)—C(=O)H, —C(=O)—NH$R^{13}$, —O—C(=O)—OH, —O—C(=O)—NH$R^{13}$, —N($R^{13}$)—C(=O)—OH and —N($R^{13}$)—C(=O)—NH$R^{13}$;

(iii) the aliphatic, cycloaliphatic and/or aromatic residues in the mixed aliphatic-cycloaliphatic, mixed aliphatic-aromatic, mixed cycloaliphatic-aromatic or mixed aliphatic-cycloaliphatic-aromatic bridging group are bound to each other via a group —O—, —S—, —N($R^{13}$)—, —O—C(=O)—, —C(=O)—O—, —N($R^{13}$)—C(=O)—, —C(=O)—N($R^{13}$)—, —O—C(=O)—O—, —O—C(=O)—N($R^{13}$)—, —N($R^{13}$)—C(=O)—O— or —N($R^{13}$)—C(=O)—N($R^{13}$)—;
where each $R^{13}$ is independently hydrogen or $C_1$-$C_{10}$-alkyl.

Consequently, the propargyl alcohol is preferably a compound of the formula II, in which $R^1$ is selected from the group consisting of hydrogen and $C_1$-$C_4$-alkyl carrying a group —O—$R^{14}$, where $R^{14}$ is as defined in the above preferred embodiment of the cyclic carbonate, or the propargyl alcohol is a compound of the formula II-bis

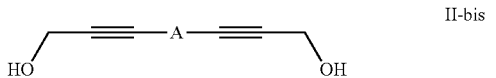

II-bis where A is as defined in the above preferred embodiment of the cyclic carbonate 1-bis.

More preferably, the cyclic carbonate is a compound Ia, a compound Ib or a mixture thereof, in which $R^1$ is selected from the group consisting of hydrogen and —$CH_2$—O—$R^{14}$, where $R^{14}$ is selected from the group consisting of hydrogen, $C_1$-$C_4$-alkyl carrying 1, 2 or 3 radicals $R^{15}$; —C(=O)$R^{16}$ and $C_3$-$C_6$-cycloalkyl carrying 1, 2 or 3 radicals $R^{17}$;
where
$R^{15}$ is selected from the group consisting of OH, $C_1$-$C_4$-alkoxy, phenyl and a 3-, 4-, 5- or 6-membered saturated heterocyclic ring containing 1 or 2 oxygen atoms as ring member;
$R^{16}$ is selected from the group consisting of $C_1$-$C_6$-alkyl, $C_2$-$C_6$-alkenyl, $C_1$-$C_4$-alkoxy and —$NR^{18}R^{19}$, where $R^{18}$ is hydrogen or $C_1$-$C_4$-alkyl and $R^{19}$ is selected from the group consisting of hydrogen, $C_1$-$C_4$-alkyl, $C_1$-$C_4$-alkyl substituted by a group $R^{20}$, and phenyl which may carry 1, 2, 3, 4 or 5 substituents selected from the group consisting of $C_1$-$C_4$-alkyl and $C_1$-$C_4$-alkoxy;
where
$R^{20}$ is selected from the group consisting of —O—$R^{21}$, —N($R^{13}$)—$R^{21}$, —O—C(=O)—$R^{21}$, —C(=O)—O—$R^{21}$, —N($R^{13}$)—C(=O)—$R^{21}$, —C(=O)—N($R^{13}$)—$R^{21}$, —O—C(=O)—O—$R^{21}$, —O—C(=O)—N($R^{13}$)—$R^{21}$, —N($R^{13}$)—C(=O)—O—$R^{21}$ and —N($R^{13}$)—C(=O)—N($R^{13}$)—$R^{21}$, where $R^{21}$ is hydrogen, $C_1$-$C_6$-alkyl or $C_2$-$C_6$-alkenyl, and where each $R^{13}$ is independently hydrogen or $C_1$-$C_{10}$-alkyl; and
$R^{17}$ is selected from the group consisting of —O—$R^{21}$, —N($R^{13}$)—$R^{21}$, —O—C(=O)—$R^{21}$, —C(=O)—O—$R^{21}$, —N($R^{13}$)—C(=O)—$R^{21}$, —C(=O)—N($R^{13}$)—$R^{21}$, —O—C(=O)—O—$R^{21}$, —O—C(=O)—N($R^{13}$)—$R^{21}$, —N($R^{13}$)—C(=O)—O—$R^{21}$ and —N($R^{13}$)—C(=O)—N($R^{13}$)—$R^{21}$, where $R^{21}$ is hydrogen, $C_1$-$C_6$-alkyl or $C_2$-$C_6$-alkenyl, and where each $R^{13}$ is independently hydrogen or $C_1$-$C_{10}$-alkyl;
or the cyclic carbonate is a compound of the formula I-bis as defined above, where A is selected from following bridging groups:
—$CH_2$—O—$CH_2$-1,4-phenylene-$CH_2$—O—$CH_2$—;
—$CH_2$—O—C(=O)—NH—1,4-toluylene-NH—C(=O)—O—$CH_2$—;
—$CH_2$—O—$CH_2$—CH(OH)—$CH_2$—O—($CH_2$)$_3$—O—$CH_2$—CH(OH)—$CH_2$—O—$CH_2$—;
—$CH_2$—O—$CH_2$—CH(OH)—$CH_2$—O-1,4-phenylene-C($CH_3$)$_2$-1,4-phenylene-O—$CH_2$—CH(OH)—$CH_2$—O—$CH_2$—; and
—$CH_2$—(O$CH_2$$CH_2$)$_3$—O—$CH_2$—;
and, consequently,
the propargyl alcohol is more preferably a compound of the formula II, in which $R^1$ is selected from the group consisting of hydrogen and —$CH_2$—O—$R^{14}$, where $R^{14}$ is as defined in the above more preferred embodiment of the cyclic carbonate, or the propargyl alcohol is a compound of the formula II-bis, where A is as defined in the above more preferred embodiment of the cyclic carbonate.

1,4-Toluylene is a divalent group of following formula:

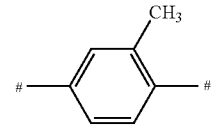

# denotes the attachment points (in the above formula to NH).

Even more preferably the cyclic carbonate is a compound Ia, a compound Ib or a mixture thereof, in which $R^1$ is selected from the group consisting of hydrogen and —$CH_2$—O—$R^{14}$,
where
$R^{14}$ is selected from the group consisting of hydrogen, $C_1$-$C_4$-alkyl carrying 1, 2 or 3 radicals $R^{15}$; —C(O)$CH_3$, —C(=O)H and —C(O)O$CH_3$;
where
$R^{15}$ is selected from the group consisting of OH and $C_1$-$C_4$-alkoxy;
or the cyclic carbonate is a compound of the formula I-bis as defined above, where A is —$CH_2$—O—$CH_2$—CH(OH)—$CH_2$-O-1,4-phenylene-C($CH_3$)$_2$-1,4-phenylene-O—$CH_2$—CH(OH)—$CH_2$—O—$CH_2$—;
and, consequently,
the propargyl alcohol is in particular a compound of the formula II, in which $R^1$ is selected from the group consisting of hydrogen and —$CH_2$—O—$R^{14}$, where $R^{14}$ is as defined in the above particular embodiment of the cyclic carbonate, or the propargyl alcohol is a compound of the formula II-bis, where A is as defined in the above particular embodiment of the cyclic carbonate.

In particular, the cyclic carbonate is a compound Ia, a compound Ib or a mixture thereof, in which $R^1$ is selected from the group consisting of hydrogen and —$CH_2$—O—$R^{14}$, where
$R^{14}$ is selected from the group consisting of hydrogen and $C_1$-$C_4$-alkyl carrying 1 or 2 radicals $R^{15}$;
where
$R^{15}$ is selected from the group consisting of OH and $C_1$-$C_4$-alkoxy;
or the cyclic carbonate is a compound of the formula I-bis as defined in embodiment 6, where A is —$CH_2$—O—$CH_2$—CH(OH)—$CH_2$—O-1,4-phenylene-C(CH$_3$)$_2$-1,4-phenylene-O—CH$_2$—CH(OH)—CH$_2$—O—CH$_2$—;
and, consequently,
the propargyl alcohol is a compound of the formula II, in which R$^1$ is selected from the group consisting of hydrogen and —CH$_2$—O—R$^{14}$, where R$^{14}$ is as defined above, or the propargyl alcohol is a compound of the formula II-bis as defined in embodiment 6, where A is as defined above.

More particularly, the cyclic carbonate is a compound Ia, a compound Ib or a mixture thereof, in which R$^1$ is selected from the group consisting of hydrogen and —CH$_2$—O—R$^{14}$, where R$^{14}$ is —CH$_2$—CH(OH)—CH$_2$—O—C(CH$_3$)$_3$ or —CH$_2$—CH(OH)—CH$_2$—OH; or the cyclic carbonate is a compound of the formula I-bis as defined in embodiment 6, where A is —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—;
and, consequently,
the propargyl alcohol is a compound of the formula II, in which R$^1$ is selected from the group consisting of hydrogen and —CH$_2$—O—R$^{14}$, where R$^{14}$ is —CH$_2$—CH(OH)—CH$_2$—O—C(CH$_3$)$_3$ or —CH$_2$—CH(OH)—CH$_2$—OH; or the propargyl alcohol is a compound of the formula II-bis as defined in embodiment 6, where A is —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—.

In a more particular embodiment, the cyclic carbonate is a compound Ia, a compound Ib or a mixture thereof, in which R$^1$ is selected from the group consisting of hydrogen and —CH$_2$—O—R$^{14}$, where R$^{14}$ is —CH$_2$—CH(OH)—CH$_2$—O—C(CH$_3$)$_3$; or the cyclic carbonate is a compound of the formula I-bis as defined above, where A is —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—;
and, consequently, the propargyl alcohol is more particularly a compound of the formula II, in which R$^1$ is selected from the group consisting of hydrogen and —CH$_2$—O—R$^{14}$, where R$^{14}$ is —CH$_2$—CH(OH)—CH$_2$—O—C(CH$_3$)$_3$; or the propargyl alcohol is a compound of the formula II-bis as defined above, where A is —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—.

This latter bridging group A has following formula:

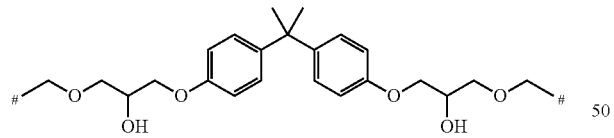

where # is the attachment point to the exo-vinylidene groups in 1-bis and to the triple bonds in II-bis.

Specifically, the cyclic carbonate is a compound Ia, a compound Ib or a mixture thereof, in which R$^1$ is hydrogen, and the propargyl alcohol is a compound of the formula II, in which R$^1$ is hydrogen.

In an alternative embodiment, R$^1$ is derived from a polymer.

Suitable polymers are for example polyolefins (to be more precise polymers with a polyolefin backbone), poly(meth)acrylates, polyesters, polyethers, polyurethanes, polyureas, polyamides, polycarbonates and mixed forms thereof; i.e. polymers containing monomers in polymerized form which are characteristic for different types of the above polymers, such as for example present in polyolefins grafted with (meth)acrylates resulting in polymers with a polyolefin backbone and poly(meth)acrylate side chains, or in block-copolymers with blocks derived from different polymer types or in polymers obtained from the reaction of isocyanates with both amines and alcohols, etc. In particular, the polymer is a poly(meth)acrylate, specifically a polymethacrylate.

In case that R$^1$ is derived from a polymer, the cyclic carbonate is preferably a compound of the formula I-poly

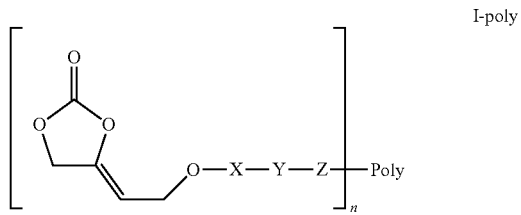

where
X is a bond or a group —C(=O)—, $^{\#}$—C(=O)—O—* or $^{\#}$—C(=O)—N(R$^{13}$)—*, where $^{\#}$ is the attachment point to O and * is the attachment point to Y (or to Z if Y is a bond or to poly if Y and Z are a bond);
Y is a bond or a divalent aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group, where the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic and mixed aliphatic-cycloaliphatic-aromatic bridging groups may be substituted by one or more halogen atoms;
and
where the aliphatic, cycloaliphatic or aromatic bridging group may have at least one of the following features (i) and/or (ii), and the mixed aliphatic-cycloaliphatic, mixed aliphatic-aromatic, mixed cycloaliphatic-aromatic or mixed aliphatic-cycloaliphatic-aromatic bridging group may have at least one of the following features (i), (ii) and/or (iii):
(i) the aliphatic, cycloaliphatic and/or aromatic residues in the aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group are interrupted by one or more non-adjacent groups —O—, —S—, —N(R$^{13}$)—, —O—C(=O)—, —C(=O)—O—, —N(R$^{13}$)—C(=O)—, —C(=O)—N(R$^{13}$)—, —O—C(=O)—O—, —O—C(=O)—N(R$^{13}$)—, —N(R$^{13}$)—C(=O)—O— and/or —N(R$^{13}$)—C(=O)—N(R$^{13}$)—;
(ii) the aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group carries one or more substituents selected from the group consisting of —OH, —SH, —N(R$^{13}$)$_2$, —O—C(=O)H, —C(=O)OH, —N(R$^{13}$)—C(=O)H, —C(=O)—NHR$^{13}$, —O—C(=O)—OH, —O—C(=O)—NHR$^{13}$, —N(R$^{13}$)—C(=O)—OH and —N(R$^{13}$)—C(=O)—NHR$^{13}$;

(iii) the aliphatic, cycloaliphatic and/or aromatic residues in the mixed aliphatic-cycloaliphatic, mixed aliphatic-aromatic, mixed cycloaliphatic-aromatic or mixed aliphatic-cycloaliphatic-aromatic bridging group are bound to each other via a group —O—, —S—, —N($R^{13}$)—, —O—C(=O)—, —C(=O)—O—, —N($R^{13}$)—C(=O)—, —C(=O)—N($R^{13}$)—, —O—C(=O)—O—, —O—C(=O)—N($R^{13}$)—, —N($R^{13}$)—C(=O)—O— or —N($R^{13}$)—C(=O)—N($R^{13}$)—;
where each $R^{13}$ is independently hydrogen or $C_1$-$C_{10}$-alkyl;

Z is a bond or a group —C(=O)—, #—C(=O)—O—* or #—C(=O)—N($R^{13}$)—* if X and Y are a bond;
where # is the attachment point to Y (or to X if Y is a bond or to O if X and Y are a bond) and * is the attachment point to Poly; or
is a bond if Y is a bond and X is a group —C(=O)—, #—C(=O)—O*— or #—C(=O)—N($R^{13}$)—*, where # is the attachment point to O; or
is a bond or a group —O—, —S—, —N($R^{13}$)—, —C(=O)—, #—O—C(=O)—*, #—C(=O)—O—*, #—N($R^{13}$)—C(=O)—*, #—C(=O)—N($R^{13}$)—*, #—O—C(=O)—O—*, #—O—C(=O)—N($R^{13}$)—*, #—N($R^{13}$)—C(=O)—O—* or #—N($R^{13}$)—C(=O)—N($R^{13}$)—* if Y is a divalent aliphatic, cycloaliphatic, aromatic, mixed aliphatic-cycloaliphatic, mixed aliphatic-aromatic, mixed cycloaliphatic-aromatic or mixed aliphatic-cycloaliphatic-aromatic bridging group, where # is the attachment point to Y;

n is from 1 to 1000; and

Poly is a residue derived from a polymer which has a number average molecular weight of from 200 to 10000;

and the propargyl alcohol is a compound of the formula II-poly

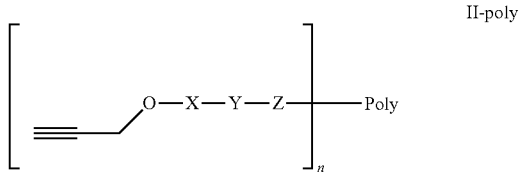

II-poly where X, Y, Z, n and Poly are as defined above.

More preferably,

X is a bond or a group —C(=O)— or #—C(=O)—N($R^{13}$)—*, where # is the attachment point to O and * is the attachment point to Y (or to Z if Y is a bond or to poly if Y and Z are a bond);

Y is a bond or a divalent aliphatic or mixed aliphatic-cycloaliphatic bridging group with 1 to 10 carbon atoms, where the aliphatic or mixed aliphatic-cycloaliphatic bridging group may be substituted by one or more halogen atoms;
and
where the aliphatic bridging group may have at least one of the following features (i) and/or (ii), and the mixed aliphatic-cycloaliphatic bridging group may have at least one of the following features (i), (ii) and/or (iii):

(i) the aliphatic and/or cycloaliphatic residue in the aliphatic or mixed aliphatic-cycloaliphatic bridging group is interrupted by one or more non-adjacent groups —O—, —O—C(=O)—, —C(=O)—O—, and/or —O—C(=O)—O—;
(ii) the aliphatic or mixed aliphatic-cycloaliphatic bridging group carries one or more substituents selected from the group consisting of group consisting of —OH, —OC(=O)H and —C(=O)OH;
(iii) the aliphatic and/or cycloaliphatic residues in the mixed aliphatic-cycloaliphatic bridging group are bound to each other via a group —O—, —O—C(=O)—, —C(=O)—O— or —O—C(=O)—O;

Z is a bond or a group —C(=O)— if X and Y are a bond;
or
is a bond if Y is a bond and X is a group —C(=O)—;
or
is a bond or a group #—O—C(=O)— if Y is a divalent aliphatic or mixed aliphatic-cycloaliphatic bridging group; and Poly is a residue derived from a poly-α-olefin or from a poly(meth)acrylate, in particular a poly(meth)acrylate and specifically a polymethacrylate.

In particular, taken together, are —C(=O)—, #—CH$_2$—CH(OH)—CH$_2$—O—C(=O)—* or #—C(=O)—NH—CH$_2$CH$_2$—O—C(=O)—*, where # is the attachment point to O and * is the attachment point to Poly. If in this case Poly is derived from a poly(meth)acrylate, the polymer I-poly contains [—CH$_2$—CH—(Z—Y—X—O—CH$_2$—CH=(1,3-dioxolan-2-on-4-diyl)] or [—CH$_2$—C(CH$_3$)—(Z—Y—X—O—CH$_2$—CH=(1,3-dioxolan-2-on-4-diyl)] repeat units.

Among $R^1$ being derived from a discrete molecule and from a polymer, preference is given to $R^1$ being derived from a discrete molecule; in particular from a discrete molecule as defined above.

Catalyst

In one preferred embodiment, the bulky ligand in the silver catalyst is a ligand of formula III. In another preferred embodiment, the bulky ligand in the silver catalyst is a ligand of formula IV. Among these, more preference is given to ligands III.

Preferably, in the bulky ligand of formula III,

D is P or As, $R^2$ is a cyclic radical selected from the group consisting of monocyclic or polycyclic $C_3$-$C_{40}$-cycloalkyl, monocyclic or polycyclic $C_3$-$C_{40}$-cycloalkenyl, $C_6$-$C_{40}$-aryl and a 3- to 40 membered saturated, partially unsaturated or maximally unsaturated mono- or polycyclic heterocyclic ring, where the cyclic radical may be bound via an oxygen atom to D and where the cyclic radical may carry one or more substituents selected from the group consisting of $C_1$-$C_6$-alkyl, $C_1$-$C_6$-alkoxy, phenyl optionally substituted by 1, 2, 3, 4 or substituents $R^{22}$, naphthyl optionally substituted by 1, 2, 3, 4 or substituents $R^{22}$, a monocyclic 5- or 6-membered heteroaromatic containing 1, 2, 3 or 4 heteroatoms selected from the group consisting of N, O and S as ring members and optionally substituted by 1, 2 or 3 or substituents $R^{23}$, and a fused bicyclic 8- to 10-membered heteroaromatic ring system containing 1, 2, 3 or 4 heteroatoms selected from the group consisting of N, O and S as ring members and optionally substituted by 1, 2 or 3 or substituents $R^{23}$,
where
each $R^{22}$ is independently selected from the group consisting of $C_1$-$C_6$-alkyl, $C_1$-$C_6$-alkoxy, NR$^{24}$R$^{25}$, where $R^{24}$ and $R^{25}$, independently of each other, are hydrogen or $C_1$-$C_{12}$-alkyl; phenyl, naphthyl and a monocyclic saturated, partially unsaturated or maximally unsaturated 5- or 6-membered heterocyclic containing 1, 2, 3 or 4 heteroatoms selected from the group consisting of N, O and S as ring members, where the three last-mentioned cyclic radicals may in turn carry 1, 2, 3, 4 or 5 substituents selected from the group consisting of halogen, $C_1$-$C_4$-alkyl and $C_1$-$C_4$-alkoxy; and each $R^{23}$ has independently one of the meanings given for $R^{22}$;

and $R^3$ and $R^4$, independently of each other, are selected from the group consisting of $C_1$-$C_6$-alkyl, monocyclic or polycyclic $C_3$-$C_{40}$-cycloalkyl, monocyclic or polycyclic $C_3$-$C_{40}$-cycloalkenyl and $C_6$-$C_{10}$-aryl.

More preferably,

D is P;

$R^2$ is phenyl optionally substituted by 1, 2, 3, 4 or substituents $R^{22}$, ortho-biphenyl optionally substituted by 1, 2, 3, 4 or substituents $R^{22}$, naphthyl optionally substituted by 1, 2, 3, 4 or substituents $R^{22}$, ortho-binaphthyl optionally substituted by 1, 2, 3, 4 or substituents $R^{22}$, a monocyclic 5- or 6-membered heteroaromatic containing 1, 2 or 3 nitrogen atoms as ring members and optionally substituted by 1, 2 or 3 or substituents $R^{23}$, and a fused bicyclic 8- to 10-membered heteroaromatic ring system containing 1, 2 or 3 or 4 nitrogen atoms as ring members and optionally substituted by 1, 2 or 3 or substituents $R^{23}$, where each $R^{22}$ is independently selected from the group consisting of $C_1$-$C_4$-alkyl, $C_1$-$C_4$-alkoxy, $NR^{24}R^{25}$, where $R^{24}$ and $R^{25}$, independently of each other, are hydrogen or $C_1$-$C_{10}$-alkyl; phenyl optionally substituted by 1, 2, 3, 4 or 5 substituents selected from the group consisting of halogen, $C_1$-$C_4$-alkyl and $C_1$-$C_4$-alkoxy; and a monocyclic saturated, partially unsaturated or maximally unsaturated 5- or 6-membered heterocyclic ring containing 1, 2 or 3 heteroatoms selected from the group consisting of N and O as ring members; and each $R^{23}$ is independently phenyl optionally substituted by 1, 2, 3, 4 or 5 substituents selected from the group consisting of halogen, $C_1$-$C_4$-alkyl and $C_1$-$C_4$-alkoxy; and $R^3$ and $R^4$, independently of each other, are selected from the group consisting of branched $C_3$-$C_6$-alkyl, monocyclic $C_3$-$C_6$-cycloalkyl, adamantyl phenyl.

Specifically,

D is P;

$R^2$ is phenyl substituted by $NR^{24}R^{25}$, where $R^{24}$ and $R^{25}$, independently of each other, are hydrogen or $C_1$-$C_{10}$-alkyl and are preferably $C_3$-$C_{10}$-alkyl; or is ortho-biphenyl substituted by 1, 2, 3 or 4 substituents $R^{22}$, where each $R^{22}$ is independently selected from the group consisting of $C_1$-$C_4$-alkyl and $NR^{24}R^{25}$, where $R^{24}$ and $R^{25}$, independently of each other, are hydrogen or $C_1$-$C_{10}$-alkyl, preferably $C_3$-$C_{10}$-alkyl.

In particular, the bulky ligand is selected from the compounds of formulae A to W and mixtures thereof:

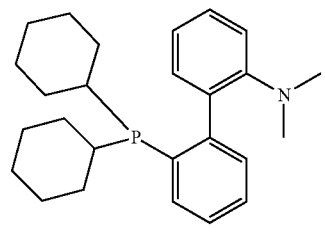

A

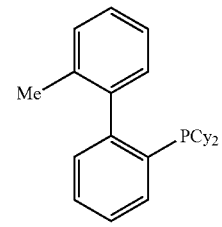

B

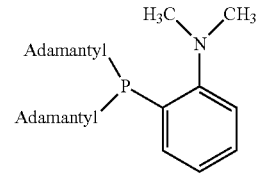

C

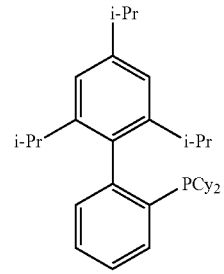

D

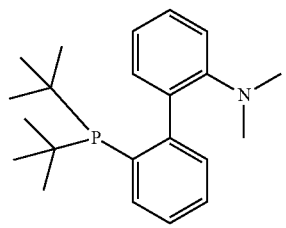

E

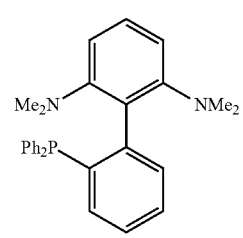

F

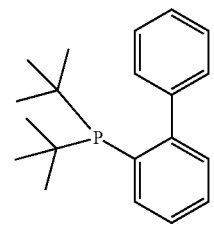

G

51
-continued
H
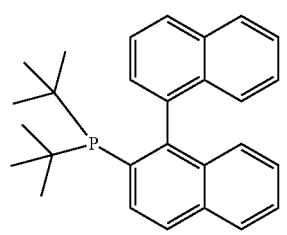
I
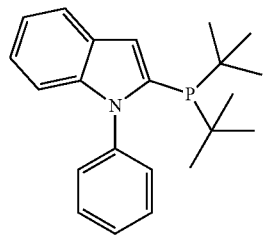
J
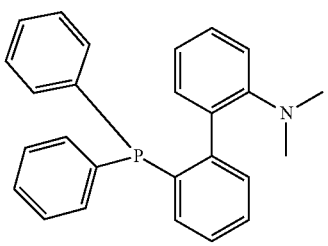
K
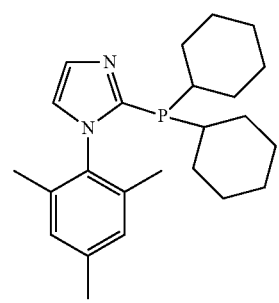
L
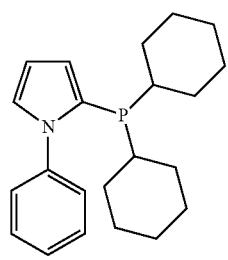
M
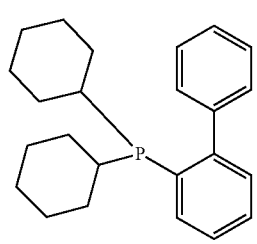
52
-continued
N
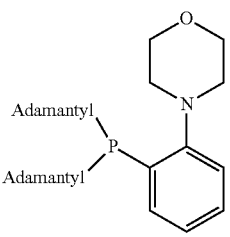
O
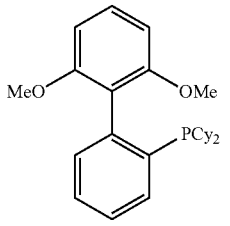
P
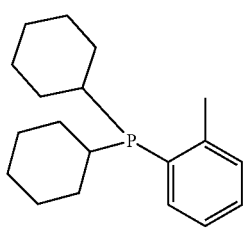
Q
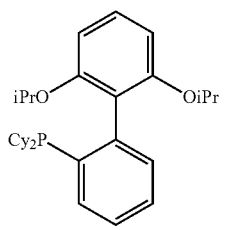
R
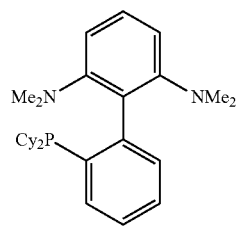
S
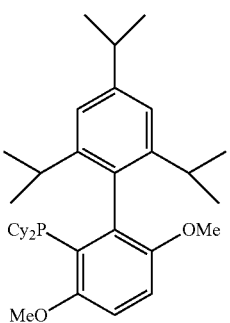

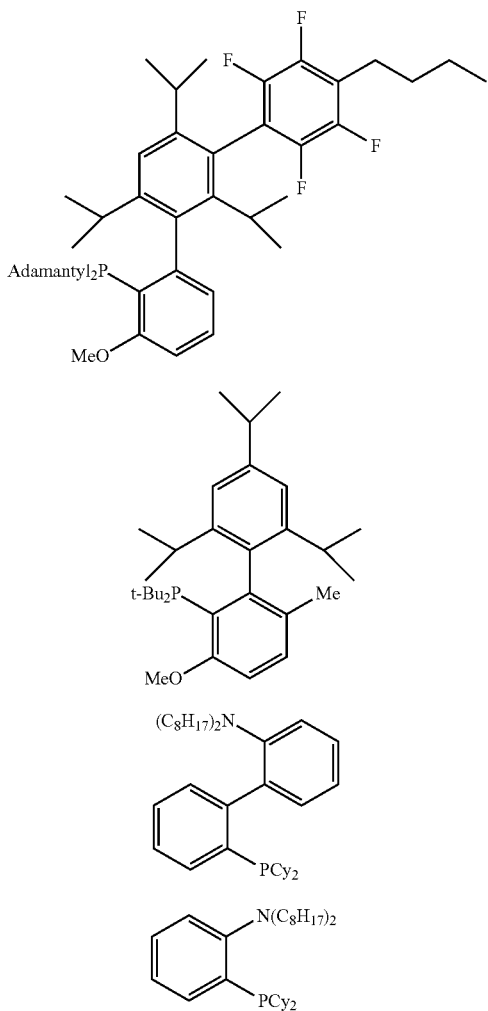

where Me is methyl, Cy is cyclohexyl, i-Pr is isopropyl, Ph is phenyl and t-Bu is tert-butyl.

The above ligands are known as Buchwald ligands. Many of them are commercially available, such as DavePhos (A), MePhos (B), XPhos (D), tBuDavePhos (E), JohnPhos (G), PhDavePhos (J), CyJohnPhos (M), SPhos (O), RuPhos (Q), CPhos (R), BrettPhos (S), AlPhos (T) and RockPhos (U).

In a specific embodiment, XPhos (compound of formula D), the ligand of the formula V, the ligand of the formula W or a mixture of V and W is used as ligand III. Very specifically, the compound of formula D (XPhos) is used.

In the ligand of formula IV, the double point indicates that the ligand is a carbene. Ligand IV is thus also termed an N-heterocyclic carbene ligand or short NHC-ligand. A silver catalyst containing the NHC ligand IV can be depicted as follows:

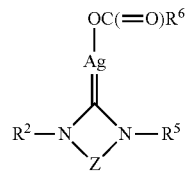

Preferably, in the ligand of formula IV, $R^2$ and $R^5$, independently of each other, are $C_6$-$C_{10}$-aryl optionally substituted by 1, 2, 3, 4 or 5 substituents selected from the group consisting of $C_1$-$C_6$-alkyl, $C_1$-$C_6$-alkoxy and $C_3$-$C_6$-cycloalkyl, and Z is —$CR^7$=$CR^8$—, where $R^7$ and $R^8$, independently of each other, are hydrogen or $C_1$-$C_6$-alkyl. In particular, $R^2$ and $R^5$ are 2,6-diisopropylphenyl and Z is —CH=CH—.

$R^6$ is preferably selected from the group consisting of $C_1$-$C_{40}$-alkyl, $C_2$-$C_{40}$-alkenyl, $C_1$-$C_6$-alkyl carrying a $C_3$-$C_{10}$-cycloalkyl ring, where the $C_3$-$C_{10}$-cycloalkyl ring may carry 1, 2, 3, 4 or 5 $C_1$-$C_6$-alkyl substituents; $C_1$-$C_4$-alkyl carrying a $C_6$-$C_{10}$-aryl ring, where the $C_6$-$C_{10}$-aryl ring may carry 1, 2, 3, 4 or 5 substituents selected from the group consisting of $C_1$-$C_6$-alkyl and $C_1$-$C_6$-alkoxy; and $C_6$-$C_{10}$-aryl which may carry 1, 2, 3, 4 or 5 substituents selected from the group consisting of $C_1$-$C_6$-alkyl and $C_1$-$C_6$-alkoxy. More preferably, $R^6$ is selected from the group consisting of $C_1$-$C_{40}$-alkyl, $C_2$-$C_{40}$-alkenyl and $C_1$-$C_4$-alkyl carrying a $C_3$-$C_6$-cycloalkyl ring. Even more preferably, $R^6$ is selected from the group consisting of $C_1$-$C_{30}$-alkyl, $C_6$-$C_{30}$-alkenyl and $C_1$-$C_4$-alkyl carrying a $C_3$-$C_6$-cycloalkyl ring, in particular from $C_1$-$C_{22}$-alkyl and $C_1$-$C_4$-alkyl carrying a $C_5$-$C_6$-cycloalkyl ring, specifically from $C_1$-$C_{20}$-alkyl and $C_2$-$C_4$-alkyl carrying a cyclohexyl ring, and very specifically from $C_8$-$C_{18}$-alkyl and $C_2$-$C_4$-alkyl carrying a cyclohexyl ring.

In case that $R^6$ is an alkyl group, the carboxylate $R^6$—COO⁻ is thus more preferably derived from natural or synthetic saturated fatty acids with 2 to 41 carbon atoms, even more preferably with 2 to 31 carbon atoms, in particular with 2 to 23 carbon atoms, specifically with 2 to 21 carbon atoms, and very specifically with 9 to 19 carbon atoms; and in case that $R^6$ is an alkenyl group, the carboxylate $R^6$—COO⁻ is thus more preferably derived from natural or synthetic unsaturated fatty acids with 3 to 41 carbon atoms, even more preferably with 7 to 31 carbon atoms. In case that $R^6$ is an alkyl group, the carboxylate $R^6$—COO⁻ is in particular derived from natural or synthetic saturated fatty acids with 2 to 23 carbon atoms, specifically from saturated fatty acids with 2 to 21 carbon atoms, and very specifically from saturated fatty acids with 9 to 19 carbon atoms.

In a specific embodiment, $R^6$ is lipophilic and has thus preferably at least 2 carbon atoms. Accordingly, in this case, $R^6$ is preferably selected from the group consisting of $C_2$-$C_{40}$-alkyl, $C_2$-$C_{40}$-alkenyl, $C_1$-$C_6$-alkyl carrying a $C_3$-$C_{10}$-cycloalkyl ring, where the
$C_3$-$C_{10}$-cycloalkyl ring may carry 1, 2, 3, 4 or 5 $C_1$-$C_6$-alkyl substituents; $C_1$-$C_4$-alkyl carrying a $C_6$-$C_{10}$-aryl ring, where the $C_6$-$C_{10}$-aryl ring may carry 1, 2, 3, 4 or 5 substituents selected from the group consisting of $C_1$-$C_6$-alkyl and $C_1$-$C_6$-alkoxy; and $C_6$-$C_{10}$-aryl which may carry 1, 2, 3, 4 or 5 substituents selected from the group consisting of
$C_1$-$C_6$-alkyl and $C_1$-$C_6$-alkoxy. More preferably, in this case, $R^6$ is selected from the group consisting of $C_2$-$C_{40}$-alkyl, $C_2$-$C_{40}$-alkenyl and $C_1$-$C_4$-alkyl carrying a $C_3$-$C_6$-cycloalkyl ring. Even more preferably, $R^6$ is selected from the group consisting of
$C_6$-$C_{30}$-alkyl, $C_6$-$C_{30}$-alkenyl and $C_1$-$C_4$-alkyl carrying a $C_3$-$C_6$-cycloalkyl ring, in particular from $C_6$-$C_{22}$-alkyl and $C_1$-$C_4$-alkyl carrying a $C_5$-$C_6$-cycloalkyl ring, specifically from $C_8$-$C_{20}$-alkyl and $C_2$-$C_4$-alkyl carrying a cyclohexyl ring, and very specifically from $C_8$-$C_{18}$-alkyl and $C_2$-$C_4$-alkyl carrying a cyclohexyl ring.

The silver catalyst Ag1 of the process of the invention can be employed in the form of a pre-formed metal complex which comprises silver, at least one bulky ligand selected from the group of ligands consisting of compounds of formula III and compounds of formula IV, preferably compounds of formula III, and a lipophilic carboxylate ligand according formula V as shown above.

Alternatively, the silver catalyst Ag1 is formed in situ in the reaction medium by combining a silver pre-catalyst, which is a silver compound or silver salt which does not contain the bulky ligand, with a compound of formula III, a carbene of formula IV or a precursor of the carbene of the formula IV to form a catalytically active silver complex Ag1 in the reaction medium. In case that the silver pre-catalyst does not contain the lipophilic carboxylate ion V, the silver pre-catalyst is also reacted with the corresponding acid $R^6$—C(═O)OH of the carboxylate V or with a salt thereof of the formula $R^6$—C(═O)O⁻M⁺, where M⁺ is a cation equivalent.

A suitable precursor of the carbene of the formula IV is the protonated form thereof, represented by formula VI,

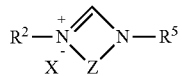

VI wherein $R^2$, $R^5$ and Z are defined as described above and X⁻ is an anion equivalent,
in combination with a base.

Suitable bases for deprotonating the protonated form of different NHC ligands according to formula VI are described by de Fremont et al., Coordination Chemistry Reviews 253 (2009) 876 to 881. The deprotonation of the protonated forms of NHC ligands can be carried out in ammonia or in non-protic solvents such as THF or ethers. The deprotonation requires anhydrous conditions and the use of strong bases, with $pK_a$ values above 14. Usually, potassium or sodium hydride with a catalytic amount of tert-butoxide is employed, but tert-butoxide itself, lithium aluminum hydride, n-butyllithium, methyllithium, tert-butyllithium, potassium hexamethyldisilazide (KHMDS) and 1,8-diazabicyclo[5.4.0]undec-7-ene (DBU) are also efficient alternatives.

Silver compounds that are useful as pre-catalyst are, for example Ag(OAc) (OAc=acetate), AgF, $AgNO_3$, silver trifluoroacetate, $Ag_2O$, $Ag_2CO_3$ and any silver salt with a lipophilic carboxylate ion according formula V given as $Ag(OOCR^6)$. If Ag(OAc), AgF, $AgNO_3$, silver trifluoroacetate, $Ag_2O$ or $Ag_2CO_3$ is used as the pre-catalyst, also the lipophilic carboxylate ligand must be added to the reaction medium, either in the form of the free acid $HOOCR^6$ or in the form of any salt $R^6$—C(═O)O⁻M⁺, where M⁺ is a cation equivalent. Suitable cation equivalents are metal cations, such as alkali metal cations, e.g. Li⁺, Na⁺, K⁺, Cs⁺or Rb⁺, or earth alkaline metal cations, such as $Ca^{2+}$, $Mg^{2+}$, $Sr^{2+}$ or $Ba^{2+}$; or ammonium cations $NR_4^+$, where each R is independently hydrogen, $C_1$-$C_{10}$-alkyl or $C_1$-$C_{10}$-alkoxy. Thus, the salt can be, for example, $M_1(OOCR^6)$ wherein $M_1$ can be Li⁺, Na⁺, K⁺, Cs⁺, Rb⁺or $NIR_4^+$, or $M_2(OOCR^6)_2$ wherein $M_2$ can be $Ca^{2+}$, $Mg^{2+}$, $Sr^{2+}$ or $Ba^{2+}$. Preferably, the pre-catalyst is $Ag(OOCR^6)$.

In case of an situ formation of the silver catalyst Ag1, the compound of formula III, the carbene of formula IV or the precursor of the carbene of the formula IV is suitably used in an amount of below 2 mol per mol of silver present in the silver pre-catalyst. Preferably, the compound of formula III, the carbene of formula IV or the precursor of the carbene of the formula IV is used in an amount of from 0.2 to 1.8 mol, preferably from 0.3 to 1.5 mol, in particular from 0.4 to 1.2 mol, specifically from 0.8 to 1.2 mol per mol of silver present in the silver pre-catalyst, and very specifically in approximately equimolar amounts to the silver present in the silver pre-catalyst.

Preferably, out of practical and economic reasons, the catalyst is formed in situ in step a).

The amount of silver catalyst Ag1 used in process step a) based on the amount of propargylic alcohol of formula II can be varied in a wide range. Usually the silver catalyst Ag1 is used in a sub-stoichiometric amount relative to the propargylic alcohol of formula II. Typically, the amount of silver catalyst Ag1 is not more than 50 mol %, frequently not more than 20 mol % and in particular not more than 10 mol % or not more than 5 mol % or not more than 3 mol %, based on the amount of propargylic alcohol of formula II. The silver catalyst Ag1 is used in step a) in an amount of preferably from 0.001 to 50 mol %, more preferably from 0.001 to 20 mol %, in particular from 0.005 to 10 mol %, specifically from 0.01 to 5 mol %, and very specifically from 0.05 to 3 mol %, based on the amount of the propargylic alcohol of the formula II. The above-given amounts of catalyst relate to the amount of silver contained therein.

Solvents

In the method of the present invention, solvents L1 and L2 are used. "Solvent" is a substance that dissolves a solute (a chemically different liquid, solid or gas), resulting in a solution. A solution is a homogenous mixture in which a gaseous, liquid or solid solute in dissolved in a solvent. A homogeneous mixture, in turn, is composed of two or more substances, where the particles of the solute cannot be seen by naked eye and which does not scatter light. In the present context, solvents L1 and L2 are liquid at 20° C. Solvents L1 and L2 differ in their polarity and thus have different solvatation power for different solutes. Solvent L1 has a weak solvatation power for non-polar starting materials or products, and L2 has a weak solvatation power for polar starting materials or products. In the present context, the term "solvent" is thus not restricted to a compound or medium which dissolves all starting materials, catalyst components and products in the proper sense. A solvent is understood more generally as a dispersing medium which dissolves (in the proper sense) only a part of the starting materials, catalyst components or products.

The solvents L1 and L2 used in the method of the present invention have a miscibility gap at least between 20 and 30° C. at 1013 mbar. "Miscibility gap" means that a mixture of solvents L1 and L2 is not stable, but de-mixes to form two separate phases. One of the two phases consists essentially of solvent L1 and the other essentially of the solvent L2. "Essentially" means that the phase contains less than 10% by weight, preferably less than 5% by weight of the other solvent, i.e. of the solvent which is not the main component, relative to the total weight of solvents L1 and L2. At 20° C., solvent L1 has a miscibility in solvent L2 of less than 5 g per liter of L2, preferably of less than 2 g per liter of L2 and in particular of less than 1 g per liter of L2, and solvent L2 has a miscibility in solvent L1 of less than 5 g per liter of L1, preferably of less than 2 g per liter of L1 and in particular of less than 1 g per liter of L1. Miscibility relates to the formation of a homogenous mixture which does not give a phase separation.

Preferably, the solvents L1 and L2 used in the method of the present invention have a miscibility gap at least between 20 and 80° C. at 1013 mbar, more preferably at least between 15 and 100° C. at 1013 mbar and in particular over the whole temperature range in which the solvents are liquid at 1013 mbar.

Preferably, the solvent L1 is a polar aprotic solvent with a dipole moment of at least $10 \cdot 10^{-30}$ C·m, in particular of at least $11 \cdot 10^{-30}$ C·m.

Preferably, the solvent L2 is a non-polar solvent with a dipole moment of at most $2 \cdot 10^{-30}$ C·m, preferably of at most $1 \cdot 10^{-30}$ C·m, in particular of 0 C·m.

Preferably, the solvent L1 is a polar aprotic solvent with a dipole moment of at least $10 \cdot 10^{-30}$ C·m, and the solvent L2 is a non-polar solvent with a dipole moment of at most $2 \cdot 10^{-30}$ C·m.

More preferably, the solvent L1 is a polar aprotic solvent with a dipole moment of at least $11 \cdot 10^{-30}$ C·m, and the solvent L2 is a non-polar solvent with a dipole moment of at most $1 \cdot 10^{-30}$ C·m.

In particular, the solvent L1 is a polar aprotic solvent with a dipole moment of at least $11 \cdot 10^{-30}$ C·m, and the solvent L2 is a non-polar solvent with a dipole moment of 0 C·m.

The solvent L1 is preferably selected from the group consisting of amides, ureas, nitriles, sulfoxides, sulfones, carbonates, nitro compounds and mixtures thereof.

Examples for suitable amides are formamide, N-methylformamide, N,N-dimethylformamide and N,N-dimethylacetamide.

Examples for suitable ureas are tetramethylurea, N,N-dimethylimidazolinone and N, N-dimethylpropyleneurea.

Examples for suitable nitriles are acetonitrile, propionitrile and benzonitrile.

An example for a suitable sulfoxide is dimethylsulfoxide.

An example for a suitable sulfene is sulfolane.

Examples for suitable carbonates are dimethylcarbonate, diethylcarbonate, ethylene carbonate and propylene carbonate.

Examples for suitable nitro compounds are nitromethane and nitrobenzene.

L1 is more preferably selected from the group consisting of formamide, N-methylformamide, N,N-dimethylformamide (DMF), N,N-dimethylacetamide, tetramethylurea, N,N-dimethylimidazolinone, N,N-dimethylpropyleneurea, acetonitrile, propionitrile, benzonitrile, dimethylsulfoxide, sulfolane, dimethylcarbonate, diethylcarbonate, ethylene carbonate, propylene carbonate, nitromethane, nitrobenzene and mixtures thereof.

In a specific embodiment, L1 is acetonitrile or DMF and is more specifically acetonitrile.

The solvent L2 is preferably selected from the group consisting of alkanes, cycloalkanes, $C_1$-$C_2$-alkyl esters of $C_{12}$-$C_{20}$-fatty acids and mixtures thereof.

Examples for suitable alkanes are $C_5$-$C_{15}$-alkanes, such as pentane, hexane, heptane, octane, nonane, decane, dodecane, tetradecane, pentadecane, structural isomers thereof and mixtures thereof.

Examples for suitable cycloalkanes are $C_5$-$C_8$-cycloalkanes which may carry a $C_1$-$C_2$-alkyl substituent, such as cyclopentane, cyclohexane, methylcyclopentane, methylcyclohexane, cyclooctane and the like.

Examples for suitable $C_1$-$C_2$-alkyl esters of $C_{12}$-$C_{20}$-fatty acids are methyllaurate, ethyllaurate, methylmyristate, ethylmyristate, methylpalmitate, ethylpalmitate, methylstearate, ethylstearate, methylarachidate and ethylarachidate.

More preferably, solvent L2 is selected from the group consisting of $C_5$-$C_{14}$-alkanes, $C_5$-$C_8$-cycloalkanes which may carry a $C_1$-$C_2$-alkyl substituent, $C_1$-$C_2$-alkyl esters of $C_{12}$-$C_{20}$-fatty acids and mixtures thereof. Even more preferably, solvent L2 is selected from the group consisting of $C_6$-$C_{12}$-alkanes, $C_5$-$C_6$-cycloalkanes which may carry a methyl substituent, methyl esters of $C_{16}$-$C_{20}$-fatty acids and mixtures thereof. In particular, solvent L2 is selected from the group consisting of pentane, hexane, heptane, octane, nonane, decane, dodecane, cyclopentane, cyclohexane, and mixtures thereof.

In a specific embodiment, L2 is cyclohexane, hexane or decane, more specifically cyclohexane or decane and is very specifically cyclohexane.

In a particular embodiment,
solvent L1 is acetonitrile and solvent L2 is selected from the group consisting of $C_5$-$C_{14}$-alkanes, $C_5$-$C_8$-cycloalkanes which may carry a $C_1$-$C_2$-alkyl substituent, and $C_1$-$C_2$-alkyl esters of saturated $C_{12}$-$C_{20}$ fatty acids; or
solvent L1 is dimethylformamide and solvent L2 is selected from the group consisting of $C_5$-$C_{14}$-alkanes, $C_5$-$C_8$-cycloalkanes which may carry a $C_1$-$C_2$-alkyl substituent, and $C_1$-$C_2$-alkyl esters of saturated $C_{12}$-$C_{20}$ fatty acids.

More particularly,
solvent L1 is acetonitrile and solvent L2 is selected from the group consisting of $C_5$-$C_{12}$-alkanes, $C_5$-$C_8$-cycloalkanes which may carry a methyl substituent, and methyl esters of saturated $C_{16}$-$C_{20}$ fatty acids; or
solvent L1 is dimethylformamide and solvent L2 is selected from the group consisting of $C_5$-$C_{12}$-alkanes, $C_5$-$C_8$-cycloalkanes which may carry a methyl substituent, and methyl esters of saturated $C_{16}$-$C_{20}$ fatty acids.

Even more particularly,
solvent L1 is acetonitrile and solvent L2 is selected from the group consisting of $C_5$-$C_{12}$-alkanes and $C_6$-$C_8$-cycloalkanes; or
solvent L1 is dimethylformamide and solvent L2 is selected from the group consisting of $C_5$-$C_{12}$-alkanes and $C_5$-$C_8$-cycloalkanes.

Specifically,
solvent L1 is acetonitrile and solvent L2 is cyclohexane; or
solvent L1 is acetonitrile and solvent L2 is hexane;
solvent L1 is acetonitrile and solvent L2 is octane; or
solvent L1 is acetonitrile and solvent L2 is decane; or
solvent L1 is acetonitrile and solvent L2 is dodecane; or
solvent L1 is dimethylformamide and solvent L2 is cyclohexane; or
solvent L1 is dimethylformamide and solvent L2 is hexane; or
solvent L1 is dimethylformamide and solvent L2 is octane; or
solvent L1 is dimethylformamide and solvent L2 is decane; or
solvent L1 is dimethylformamide and solvent L2 is dodecane.

Very specifically,
solvent L1 is acetonitrile and solvent L2 is cyclohexane; or
solvent L1 is acetonitrile and solvent L2 is decane; or
solvent L1 is dimethylformamide and solvent L2 is hexane.

Among these, preference is given to solvent L1 being acetonitrile and solvent L2 being cyclohexane or decane.

In step a) the propargyl alcohol is preferably present in an amount of from 0.1 to 25% by weight, more preferably from 0.5 to 20% by weight, in particular from 1 to 20% by weight, e.g. 1 to 15% by weight, relative to the overall weight of all solvents used in step a).

The $CO_2$ used for the carboxylation-cyclisation reaction can be used in pure form or, if desired, also in the form of mixtures with other, preferably inert gases, such as nitrogen or argon. Preference is given to using $CO_2$ in undiluted form.

The reaction is typically carried at a $CO_2$ pressure in the range from 0.1 to 200 bar, preferably in the range from 1 to 100 bar, more preferably in the range from 5 to 80 bar, in particular from 10 to 70 bar. If $CO_2$ in undiluted form, the pressure is exerted by $CO_2$. In this case, the reaction is typically carried at a $CO_2$ pressure in the range from 0.1 to 200 bar, preferably in the range from 1 to 100 bar, more preferably in the range from 5 to 80 bar, in particular from 10 to 70 bar.

Under certain conditions, $CO_2$ can also act as an additional solvent or can act as a solubilizing agent for the two liquid phases formed by the solvents L1 and L2 (if step a) is carried out in the presence of solvent L2) if the reaction conditions are such that $CO_2$ is liquid (e.g. pressure above 57.3 bar at 20° C.) or is in its supercritical phase (pressure above 73.8 bar at temperatures above 31° C.).

Process step a) can be performed in a wide temperature range. The reaction can be carried out at a temperature in the range of from 0 to 150° C., but seeing that high temperatures are not necessary, the reaction is preferably carried out at a temperature in the range of from 0 to 100° C., more preferably from 10 to 80° C. and in particular from 10 to 40° C.

The reaction can principally be performed continuously, semi-continuously or discontinuously. Preference is given to a continuous process.

The reaction can principally be performed in all reactors known by a person in the art for this type of reaction and therefore, will select the reactors accordingly. Suitable reactors are described and reviewed in the relevant prior art, e.g. appropriate monographs and reference works such as mentioned in U.S. Pat. No. 6,639,114, column 16, line 45-49. Preferably, for the reaction an autoclave is employed which may have an internal stirrer and an internal lining.

The composition obtained in the carboxylation-cyclisation reaction of the present invention comprises an unsubstituted exo-vinylidene carbonate, i.e. a cyclic carbonate of formula Ia or Ib.

After completion of step a), pressure is released before steps b1) (if carried out), b2) (if carried out) and c) ensue.

Step b1) has to be carried out if no solvent L2 is used in step a).

If in step a) a solvent mixture containing L1 and L2 has been used, under certain circumstances it may nevertheless be expedient to carry out step b2); i.e. to add further solvent L2, for example if the mixture contains too little L2 to allow an efficient phase separation. The ideal mixing ratio of solvents L1 and L2 depends on the specific solvents L1 and L2, the specific starting materials, catalysts, their respective concentrations and the phase separation method and can be determined by those skilled in the art.

Suitable amounts of solvent L2 added in step b1) or b2) are such that in step c) the solvent L1 and the solvent L2 are present in an overall weight ratio of preferably from 80:20 to 20:80, more preferably from 70:30 to 30:70 and in particular from 60:40 to 40:60.

In one embodiment of the invention, in step a) no solvent L2 is used and step b1) is carried out (step b2) is of course skipped in this case).

In another embodiment of the invention, in step a) a solvent mixture containing L1 and L2 is used and step b2) can be skipped; unless the amount of L2 is too small to allow an efficient phase separation; in which case step b2) is carried out.

In step c), the two organic liquid phases can be separated from one another and the non-polar organic phase enriched with the silver catalyst can be recycled as catalyst in the carboxylation reaction of step a).

The two liquid phases are generally separated by gravimetric phase separation. This may be carried out using, for example, standard apparatuses and standard methods which are described, for example, in E. Müller et al., "Liquid-Liquid Extraction" in Ullmann's Encyclopedia of Industrial Chemistry, 2005, Wiley-VCH Verlag GmbH&Co KGaA, DOI: 10.1002/14356007.b03_06, chapter 3 "Apparatus".

On a laboratory scale, phase separation can for example be carried out in a separatory funnel; on industrial scale, counter-current extraction apparatuses, such as mixer-settler apparatuses, extraction columns, agitated extraction columns, continuous packed bed liquid extraction apparatuses and the like are suitable.

Steps b1)/b2) and c) can be repeated once or several times. For instance, after phase separation in step c), L2 can be added to the separated phase containing L1 to obtain a more complete extraction of the catalyst Ag1. Generally, however, the separation is so proficient that it is not necessary to repeat steps b1)/b2) and c).

According to the invention, step c) results in a separation of the catalyst from the cyclic carbonate by the use of the two organic solvents having a miscibility gap. The silver catalyst Ag1 is enriched in the less polar solvent and the cyclic carbonate in the more polar solvent.

The silver catalyst Ag1 being enriched in the less polar solvent means a partition coefficient of the silver catalyst Ag1

$P$=[concentration of silver catalyst Ag1 in the non-polar organic phase]/[concentration of silver catalyst Ag1 in the polar organic phase]

of >1. The partition coefficient is preferably >2 and particularly preferably >5.

The products Ia or Ib or their mixture being enriched in the polar solvent phase means a partition coefficient of the products Ia or Ib or their mixture $P$=[concentration of product Ia or Ib in the polar organic phase]/[concentration of product Ia or Ib in the non-polar organic phase]

of >1. The partition coefficient is preferably >2 and particularly preferably >5.

Thus, the product phase obtained in step c) contains more than 50% by weight, preferably more than 66.7% by weight and in particular more than 83.3% by weight of the cyclic carbonate I formed in step a), and the catalyst phase contains more than 50% by weight, preferably more than 66.7% by weight and in particular more than 83.3% by weight of the silver catalyst. If desired, the cyclic carbonate I can be isolated from the product phase [step d)]. For example, the product can be obtained by evaporating the solvent from the polar organic phase, and, if desired, the solvent can be recycled to the carboxylation reaction. This isolation method is especially advantageous for syntheses carried out on an industrial scale. The polar organic solvent can also be used to further decrease the amount of product in the non-polar phase by a counter-current extraction. Vice versa, from the non-polar organic solvent phase a certain amount of the non-polar solvent can be removed by evaporation and also used to reduce the silver content in the polar organic phase by a countercurrent-extraction in order to recycle more of the silver catalyst.

The recycled silver catalyst can be reused into step a) with a satisfactory conversion rate after the first turnover. Even after several turnovers the catalytic activity is still satisfactory.

Work-up of the polar organic phase of the inventive process and the isolation of the cyclic carbonate of formula Ia or Ib can of course also be effected in another customary manner, for example by filtration or aqueous extractive work-up, but isolation via evaporation of the polar solvent is the most economic and simple route, at least on industrial scale. The cyclic carbonate of formula Ia or Ib or their mixture are generally obtained in sufficient purity by applying such measures or a combination thereof, obviating additional purification steps. Alternatively, further purification can be accomplished by methods commonly used in the art, such as recrystallisation.

The invention is illustrated by the examples which follow.

EXAMPLES

Figures in percent are each based on % by weight, unless explicitly stated otherwise.

General

All chemicals and solvents were purchased from Sigma-Aldrich or ABCR and used without further purification.

$^1$H and $^{13}$C NMR spectra were recorded on Bruker Avance 200 MHz and 400 MHz spectrometer and were referenced to the residual proton ($^1$H) or carbon ($^{13}$C) resonance peaks of the solvent.

Chemical shifts (δ) are reported in ppm.

USED ABBREVIATIONS

XPhos=2-Dicyclohexylphosphino-2',4',6'-triisopropylbiphenyl
THF=Tetrahydrofuran
DMF=N,N-dimethylformamide
Et$_2$O=Diethylether I. Synthesis of Ligands V and W The title compound was obtained via a modified synthesis as described in Synlett, 2017, 28, 2891-2895 (SI). 2-Bromoaniline (1.17 mL; 10.35 mmol), N,N-diisopropylethylamine (5.41 mL; 31.04 mmol) and 1-bromooctane (5.36 mL; 31.05 mmol) were added to anhydrous DMF (10 mL) in a pressure tube. The tube was tightly sealed and heated at 120° C. for 48 h. The reaction was cooled to room temperature, and diluted with petroleum ether/ethyl acetate (1:1 v/v; 100 mL). The organic phase was washed with water (3×100 mL), 10% aq. Na$_2$CO$_3$ (100 mL) and brine (100 mL) and dried over Na$_2$SO$_4$. The solution was evaporated to dryness and purified by silica column chromatography with petroleum ether as eluent. The product was obtained as a colourless oil (2.63 g; 64%).

$^1$H NMR (300 MHz, CDCl$_3$): δ=7.55 (dd, J=7.9, 1.5 Hz, 1H, H$_{Ar}$), 7.22 (ddd, J=8.1, 7.6, 1.9, 1H, H$_{Ar}$), 7.09 (dd, J=8.0, 1.6 Hz, 1H, H$_{Ar}$), 6.92-6.83 (m, 1H, H$_{Ar}$), 3.06-2.95 (m, 4H, CH$_2$N), 1.50-1.35 (m, 4H, CH$_2$), 1.35-1.16 (m, 20H, CH$_2$), 0.91-0.79 (m, 6H, CH$_3$).

$^{13}$C NMR (75 MHz, CDCl$_3$): δ 149.8, 133.7, 127.5, 124.2, 124.2, 122.3, 53.5, 31.9, 29.5, 29.3, 27.2, 27.0, 22.7, 14.1.

HRMS (ESI): m/z calcd. for C$_{22}$H$_{38}$BrN: 396.2260 [M+H]$^+$; found 396.2261.

2. Synthesis of Ligand V

The title compound was obtained via a modified synthesis as described in J. Org. Chem., 2000, 65, 5334-5341. Mg turnings (126 mg; 5.17 mmol), 2-bromo-N,N-dioctylaniline as obtained from example 1 (991 mg, 2.50 mmol) and THF (5 mL) were added to an oven-dried 25 mL 3-necked flask equipped with a stirrer bar and a reflux condenser under argon. 1,2-Dibromoethane (38 µL; 0.44 mmol) in THF (1 mL) was added dropwise via cannula over 5 mins and the mixture was heated to 50° C. for 5 min, then to reflux temperature for a further 16 h. The mixture was cooled to 60° C. 1-Bromo-2-chlorobenzene (252 µL; 2.85 mmol) was added dropwise over 10 min and the mixture was heated for 2 h at 60° C. After cooling to room temperature, CuCl (282 mg; 2.59 mmol) was added followed by the dropwise addition of a solution of chlorodicyclohexylphosphine (0.57 mL; 2.59 mmol) in THF (1 mL). After stirring the mixture for a further 16 h, the suspension was diluted with petroleum ether/ethyl acetate (1:1; 70 mL), 30% NH$_4$OH (25 mL) and brine (25 mL) and the mixture stirred for 10 min. The organic phase was collected and repeatedly washed with 5 mL portions of 30% NH$_4$OH until the aqueous phase was colourless. The organic phase was further washed with water (10 mL) and brine (5 mL) and dried over Na$_2$SO$_4$. The solvent was removed in vacuo and the residue was columned over silica using a hexane/diethyl ether solvent gradient (1:0 hexane/Et$_2$O up to 19:1). The obtained pale-yellow, viscous oil (553 mg; 43% crude yield) contained the desired ligand V as the major product, ligand W and an unidentified phosphine complex in a ratio of ca. 1:0.24:0.12. A pure product was obtained following further purification by gradient silica column chromatography using dichloromethane/acetone as eluent (94 mg; 7%).

$^1$H NMR (300 MHz, CDCl$_3$): 7.60-7.47 (m, 1H), 7.34-7.17 (m, 4H), 7.05-6.96 (m, 2H), 6.95-6.87 (m, 1H), 2.82-2.67 (m, 4H), 2.09-0.94 (m, 46H), 0.87 (m, 6H).

$^{13}$C NMR (75 MHz, CDCl$_3$): δδ 149.6 (d, J$_{CP}$=30.7 Hz), 149.6, 136.2 (d, J$_{CP}$=5.8 Hz), 135.1 (d, J$_{CP}$=20.2 Hz), 133.4 (d, J$_{CP}$=3.8 Hz), 132.7 (d, J$_{CP}$=3.2 Hz), 131.3 (d, J$_{CP}$=5.9 Hz), 127.9, 127.6, 125.9, 120.0, 120.0, 52.6, 37.1 (d, J$_{CP}$=16.3 Hz), 33.9 (d, J$_{CP}$=14.1 Hz), 31.9, 30.7 (d, J$_{CP}$=11.3 Hz), 30.6 (d, J$_{CP}$=17.5 Hz), 30.2 (d, J$_{CP}$=12.7 Hz), 30.0 (d, J$_{CP}$=8.5 Hz), 29.6, 29.4, 28.0 (d, J$_{CP}$=7.5 Hz), 27.8 (d, J$_{CP}$=10.5 Hz), 27.5, 27.4 (d, J$_{CP}$=9.3 Hz), 27.3 (d, J$_{CP}$=11.7 Hz), 27.2, 26.7, 26.6, 22.8, 14.2.

$^{31}$P NMR (122 MHz, CDCl$_3$): δ −11.3.

HRMS (ESI): m/z calcd. for C$_{40}$H$_{64}$NP: 590.4849 [M+H]$^+$; found 590.4850.

3. Synthesis of Ligand W

Mg turnings (39 mg; 1.60 mmol), 2-bromo-N,N-dioctylaniline (496 mg; 1.25 mmol) and THF (8 mL) were added to an oven-dried 25 mL 3-necked flask equipped with a stirrer bar and a reflux condenser under argon. 1,2-Dibromoethane (19 µL; 0.22 mmol) in THF (1 mL) was added dropwise via cannula over 5 mins and the mixture was heated to 50° C. for 5 mins, then to reflux temperature for a further 3 h. The mixture was cooled to room temperature and CuCl (141 mg; 1.43 mmol) was added followed by the dropwise addition of a solution of chlorodicyclohexylphosphine (0.29 mL; 1.30 mmol) in THF (1 mL). After stirring the mixture for a further 16 h, the suspension was diluted with petroleum ether/ethyl acetate (1:1; 40 mL), 30% NH$_4$OH (10 mL) and brine (10 mL) and the mixture stirred for 10 min. The organic phase was collected and repeatedly washed with 5 mL portions of 30% NH$_4$OH until the aqueous phase was colourless. The organic phase was further washed with water (10 mL) and brine (5 mL) and dried over Na$_2$SO$_4$. The solvent was removed in vacuo and the residue was columned over silica using a dichloromethane/acetone solvent gradient (1:0 $CH_2Cl_2$/acetone up to 19:1). The product was isolated as a colourless, viscous oil (221 mg; 34%). Oxidised phosphine was also detected by $^{31}P$ NMR and HRMS (<4% of sample).

$^1H$ NMR (500 MHz, $CDCl_3$): δ 7.38 (d, J=7.3 Hz, 1H), 7.24 (t, J=7.5 Hz, 1H), 7.11-7.04 (m, 1H), 7.01 (t, J=7.2 Hz, 1H), 3.10-3.02 (m, 4H), 1.94-1.85 (m, 2H), 1.84-1.71 (m, 4H), 1.65 (br s, 4H), 1.58-1.52 (m, 2H), 1.40 (br s, 2H), 1.33-1.00 (m, 30H), 0.86 (t, J=6.7 Hz, 6H).

$^{13}C$ NMR (75 MHz, $CDCl_3$): δ 157.8 (d, $J_{CP}$=19.4 Hz), 133.4 (d, $J_{CP}$=3.5 Hz), 133.2 (d, $J_{CP}$=16.9 Hz), 128.6, 122.7 (d, $J_{CP}$=3.6 Hz), 122.6, 54.7 (d, $J_{CP}$=5.8 Hz), 34.9 (d, $J_{CP}$=15.1 Hz), 31.9, 30.5 (d, $J_{CP}$=16.5 Hz), 29.8 (d, $J_{CP}$=11.0 Hz), 29.6, 29.3, 27.5, 27.5-27.3 (m), 26.6, 26.4, 22.7, 14.1.

$^{31}P$ NMR (122 MHz, $CDCl_3$): δ −13.2.

II. Synthesis of Cyclic Carbonates

General Reaction Procedure

A. Addition of the Solvent L2 after the Carboxylation Reaction

A 80 mL steel autoclave was charged with the propargyl alcohol (II) (5.0 mmol), silver salt, the bulky donor ligand the polar organic solvent L1.

The reaction mixture was pressurized with $CO_2$ and stirred at room temperature for 18 h. Then $CO_2$ overpressure was carefully released and the catalyst extracted with the non-polar organic solvent L2. After phase separation, conversion of the propargyl alcohol and the formation of the product was determined in both phases by $^1H$-NMR spectroscopy. Silver content in both phases was determined by ICP-MS.

Example 1

Alkynol: Propargylic alcohol ($R^1$=H); 280 mg (5 mmol)
Silver salt: Silver neodecanoate [Ag($C_9H_{19}$C(O)O)]; 14 mg (0.05 mmol)
Bulky donor ligand: XPhos; 23.8 mg (0.05 mmol)
Polar organic solvent L1: Acetonitrile; 10 mL
Non-polar organic solvent: Cyclohexane
$CO_2$ pressure: 20 bar After the reaction, the conversion of the propargylic alcohol was determined by NMR as 99% to the corresponding exo-vinylidenecarbonate. The reaction mixture was extracted with cyclohexane (10 mL) as the non-polar organic solvent L2. According to $^1H$-NMR of the solvent fractions, the exo-vinylidenecarbonate remained in the acetonitrile phase. Silver content in the non-polar organic phase was 370 mg/kg and in the polar organic phase 55 mg/kg (P=6.7)

Example 2

Alkynol: Propargylic alcohol ($R^1$=H); 280 mg (5 mmol)
Silver salt: Silver neodecanoate [Ag($C_9H_{19}$C(O)O)]; 14 mg (0.05 mmol)
Bulky donor ligand: XPhos; 23.8 mg (0.05 mmol)
Polar Organic Solvent L1: Acetonitrile; 10 mL
Non-polar organic solvent: Cyclohexane
$CO_2$ pressure: 20 bar After the reaction, the conversion of the propargylic alcohol was determined by NMR as 99% to the corresponding exo-vinylidenecarbonate. The reaction mixture was extracted with cyclohexane (2*5 mL) as the non-polar organic solvent L2. According to $^1H$-NMR of the solvent fractions, the exo-vinylidenecarbonate remained in the acetonitrile phase. All volatiles were removed from the combined cyclohexane fractions and the remaining catalyst residue was redissolved in acetonitrile (10 ml) and reused in the carboxylation under the same conditions as described above after adding fresh propargylic alcohol (but no further silver or bulky ligand). Conversion to the exo-vinylidenecarbonate according to $^1H$-NMR spectroscopy was again 99%.

Example 3

Alkynol: Propargylic alcohol ($R^1$=H); 280 mg (5 mmol)
Silver salt: Silver stearate [Ag($C_{17}H_{35C}$(O)O)]; 19.6 mg (0.05 mmol)
Bulky donor ligand: XPhos; 23.8 mg (0.05 mmol)
Polar organic solvent L1: Acetonitrile; 10 mL
Non-polar organic solvent: Decane
$CO_2$ pressure: 20 bar After the reaction, the conversion of the propargylic alcohol was determined by NMR as 99% to the corresponding exo-vinylidenecarbonate. Taking a 2 mL aliquot of the reaction solution, an extraction was carried out with decane (2 mL) as the non-polar solvent L2. Silver content in the non-polar organic phase was 390 mg/kg and in the polar organic phase 50 mg/kg (P=7.8)

Example 4

Alkynol: Propargylic alcohol ($R^1$=H); 280 mg (5 mmol)
Silver salt: Silver cyclohexanebutyrate [Ag(cyclohexyl-($CH_2$)$_3$—C(O)O)]; 13.9 mg (0.05 mmol)
Bulky donor ligand: XPhos; 23.8 mg (0.05 mmol)
Polar organic solvent L1: Acetonitrile; 10 mL
Non-polar organic solvent: Cyclohexane
$CO_2$ pressure: 20 bar After the reaction, the conversion of the propargylic alcohol was determined by NMR as 99% to the corresponding exo-vinylidenecarbonate. Taking a 2 mL aliquot of the reaction solution, an extraction was carried out with cyclohexane (2 mL) as the non-polar solvent L2. Silver content in the non-polar organic phase was 390 mg/kg and in the polar organic phase 65 mg/kg (P=6.0)

Example 5

Alkynol: Compound II wherein $R^1$=—$CH_2$—O—$CH_2$—CH(OH)—$CH_2$—O—C($CH_3$)$_3$; 1.08 g (5 mmol)
Silver salt: Silver neodecanoate [Ag($C_9H_{19}$C(O)O)]; 27.9 mg (0.10 mmol)
Bulky donor ligand: XPhos; 47.7 mg (0.10 mmol)
Internal standard: mesitylene 232 μL (1.67 mmol)
Polar organic solvent L1: Acetonitrile; 10 mL
Non-polar organic solvent: Cyclohexane
$CO_2$ pressure: 20 bar Upon addition of all the reagents and L1, an aliquot of the mixture was taken and diluted in $CDCl_3$ to determine t0 by $^1H$ NMR. Following the procedure described for Example 2, with cyclohexane as the non-polar solvent L2. After the reaction, the conversion of the propargylic alcohol was determined by NMR as 76% to the corresponding exo-vinylidenecarbonate. On the recycle, conversion to the exo-vinylidenecarbonate was determined by $^1H$ NMR as 67%. Silver content in the non-polar organic phase was 1200 mg/kg and in the polar organic phase 310 mg/kg (P=43.9)

Example 6

Alkynol: Compound II, wherein $R^1$=4,4'-((((propane-2,2-diylbis(4,1-phenylene))bis(oxy))bis(2-hydroxypropane-3,1- diyl)) bis(oxy))bis(but-2-yn-1-ol) (=compound of formula II-bis, wherein A is of the following formula:

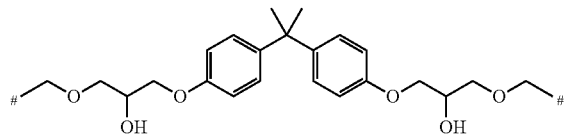 [SMILES: CCOCC(O)COc1ccc(C(C)(C)c2ccc(OCC(O)COCC)cc2)cc1]

500 mg (0.97 mmol)
Silver salt: Silver neodecanoate [Ag($C_9H_{19}$C(O)O)]; 14 mg (0.05 mmol)
Bulky donor ligand: XPhos; 23.8 mg (0.05 mmol)
Polar Organic Solvent L1: Acetonitrile; 10 mL
Non-polar organic solvent: Cyclohexane
$CO_2$-pressure: 20 bar After the reaction, the conversion of the propargylic alcohol was determined by NMR as 99% to the corresponding bis exo-vinylidenecarbonate. The reaction mixture was extracted with cyclohexane (2*5 mL) as the non-polar organic solvent L2. According to $^1$H-NMR of the solvent fractions, the exo-vinylidenecarbonate remained in the acetonitrile phase. Silver content in the non-polar organic phase was 100 mg/kg and in the polar organic phase 35 mg/kg (P=2.9)

Example 7

Alkynol: Compound II, wherein $R^1$=4,4'-((((propane-2,2-diylbis(4,1-phenylene))bis(oxy))bis(2-hydroxypropane-3,1-diyl)) bis(oxy))bis(but-2-yn-1-ol); 500 mg (0.97 mmol)
Silver salt: Silver neodecanoate [Ag($C_9H_{19}$C(O)O)]; 14 mg (0.05 mmol)
Bulky donor ligand: XPhos; 23.8 mg (0.05 mmol)
Polar Organic Solvent L1: Dimethylformamide; 10 mL
Non-polar organic solvent: Hexane
$CO_2$-pressure: 20 bar After the reaction, the conversion of the propargylic alcohol was determined by NMR as 56% to the corresponding bis exo-vinylidenecarbonate. The reaction mixture was extracted with hexane (2*5 mL) as the non-polar organic solvent L2. According to $^1$H-NMR of the solvent fractions, the exo-vinylidenecarbonate remained in the acetonitrile phase.

B. Addition of the Solvent L2 in the Carboxylation Reaction

A 80 mL steel autoclave was charged with the propargyl alcohol (II) (5.0 mmol), silver salt, the bulky donor ligand, the polar organic solvent L1 and the non-polar organic solvent L2. In case of recycling experiments, the non-polar organic solvent L2 phase from a previous reaction, containing the silver catalyst, was charged to the autoclave and the fresh polar organic solvent as well as propargyl alcohol was added. The reaction mixture was pressurized with $CO_2$ and stirred at room temperature for 18 h. Then $CO_2$ overpressure was carefully released. After phase separation, conversion of the propargyl alcohol and the formation of the product was determined in both phases by $^1$H-NMR spectroscopy. Silver content in both phases was determined by ICP-MS.

Example 8

Alkynol: Propargylic alcohol ($R^1$=H); 280 mg (5 mmol)
Silver salt: Silver neodecanoate [Ag($C_{10}H_{19}O_2$]; 14 mg (0.05 mmol)
Bulky donor ligand: XPhos; 23.8 mg (0.05 mmol)
Polar organic solvent: Acetonitrile; 5 mL
Non-polar organic solvent: Cyclohexane; 5 mL
$CO_2$-pressure: 20 bar After the reaction, the conversion of the propargylic alcohol was determined by NMR as 91% to the corresponding exo-vinylidenecarbonate. According to $^1$H-NMR of the solvent fractions, the exo-vinylidenecarbonate could only be detected in the acetonitrile phase. After phase separation, the cyclohexane phase containing the silver catalyst was reused in the carboxylation under the same conditions as described above after adding 280 mg propargylic alcohol and 5 mL of acetonitrile. Conversion to the exo-vinylidenecarbonate according to $^1$H-NMR spectroscopy in the second run with the recycled catalyst was 96%.

Example 9

Alkynol: Propargylic alcohol ($R^1$=H); 280 mg (5 mmol)
Silver salt: Silver neodecanoate [Ag($C_9H_{19}$C(O)O)]; 14.0 mg (0.05 mmol)
Bulky donor ligand: Compound of formula V (actually a mixture of V and W and unknown phosphine ligand as obtained in 1.2, ratio ca. 1.0:0.24:0.12); 29.5 mg (0.05 mmol)
Polar organic solvent L1: Acetonitrile; 10 mL
Non polar organic solvent L2: Cyclohexane; 10 mL
$CO_2$-pressure: 20 bar After the reaction, the conversion of the propargylic alcohol was determined by NMR as 30% to the corresponding exo-vinylidenecarbonate. An extraction was carried out with additional cyclohexane (3*10 mL). Silver content in the non-polar organic phase was 480 mg/kg and in the polar organic phase was 30 mg/kg (P=16.0) after the first extraction and 5 mg/kg after the third extraction.

Example 10

Alkynol: Propargylic alcohol ($R^1$=H); 280 mg (5 mmol)
Silver salt: Silver acetate [Ag($CH_3$C(O)O)]; 8.3 mg (0.05 mmol)
Bulky donor ligand: Compound of formula V (actually a mixture of V and W and unknown phosphine ligand as obtained in 1.2, ratio ca. 1.0:0.24:0.12); 29.5 mg (0.05 mmol)
Polar organic solvent L1: Acetonitrile; 10 mL
Non polar organic solvent L2: Cyclohexane; 10 mL
$CO_2$-pressure: 20 bar After the reaction, the conversion of the propargylic alcohol was determined by NMR as 50% to the corresponding exo-vinylidenecarbonate. An extraction was carried out with additional cyclohexane (3*10 mL). Silver content in the non-polar organic phase was 310 mg/kg and in the polar organic phase was 90 mg/kg (P=3.4) after the first extraction and 32 mg/kg after the third extraction.

Example 11

Alkynol: Propargylic alcohol ($R^1$=H); 280 mg (5 mmol)
Silver salt: Silver neodecanoate [Ag($C_9H_{19}$C(O)O)]; 14.0 mg (0.05 mmol)
Bulky donor ligand: Compound of formula W; 29.5 mg (0.05 mmol)
Polar organic solvent L1: Acetonitrile; 10 mL
Non polar organic solvent L2: Cyclohexane; 10 mL
$CO_2$-pressure: 20 bar After the reaction, the conversion of the propargylic alcohol was determined by NMR as 36% to the corresponding exo-vinylidenecarbonate. An extraction was carried out with additional cyclohexane (3*10 mL). Silver content in the non-polar organic phase was 600 mg/kg and in the polar organic phase was 21 mg/kg (P=28.6) after the first extraction and 2 mg/kg after the third extraction.

Example 12

Alkynol: Propargylic alcohol ($R^1$=H); 280 mg (5 mmol)
Silver salt: Silver neodecanoate [Ag($C_9H_{19}$C(O)O)]; 14.0 mg (0.05 mmol)
Bulky donor ligand: Compound of formula W; 29.5 mg (0.05 mmol)*
Polar organic solvent L1: Acetonitrile; 10 mL
Non polar organic solvent L2: Cyclohexane; 10 mL
$CO_2$-pressure: 50 bar After the reaction, the conversion of the propargylic alcohol was determined by NMR as 81% to the corresponding exo-vinylidenecarbonate. On the recycle, conversion to the exo-vinylidenecarbonate was determined by $^1$H NMR as 70%.

C. Substrate Screening by Addition of the Solvent L2 in the Carboxylation Reaction A 80 mL steel autoclave was charged with the propargyl alcohol (II), silver salt, the bulky donor ligand, the polar organic solvent $CH_3CN$ and the non-polar organic solvent cyclohexane. The reaction mixture was pressurized with $CO_2$ and stirred at room temperature for 18 h. Then $CO_2$ overpressure was carefully released. After phase separation, conversion of the propargyl alcohol and the formation of the product was determined in both phases by $^1$H-NMR spectroscopy. Silver content in both phases was determined by ICP-MS.

D. Recycling Under Addition of the Solvent L2 in the Carboxylation Reaction

Example 21

Alkynol: Compound II wherein $R^1$=—$CH_2$—O—$CH_2$—CH(OH)—$CH_2$—O—C($CH_3$)$_3$; 0.54 g (2.5 mmol)
Silver salt: Silver neodecanoate [Ag($C_9H_{19}$C(O)O)]; 7.0 mg (0.025 mmol)
Bulky donor ligand: V; 14.7 mg (0.025 mmol)
Polar organic solvent L1: Acetonitrile; 5 mL
Non-polar organic solvent L2: Cyclohexane; 2.5 mL
$CO_2$ pressure: 20 bar In the glove box, alkynol, silver(I) neodecanoate, ligand V, acetonitrile and cyclohexane were placed in a Premex autoclave with a Teflon insert. The autoclave was sealed and charged with 50 bar $CO_2$. After 18 h stirring at room temperature the $CO_2$ pressure was carefully released and the autoclave purged with argon before reintroducing into the glove box. Cyclohexane (2.5 mL) was added and the organic layers were separated in a separatory funnel. The acetonitrile layer was further washed with cyclohexane (2×5 mL). The combined cyclohexane washings were concentrated to approximately 2.5 mL and reintroduced into the autoclave, along with further substrate and acetonitrile for a subsequent run. Work-up after the second run was the same as after the first run and the whole procedure repeated in a third run. The acetonitrile phase was treated with 1.25 M methanolic HCl (50μ), filtered through a short pad of Celite and the solvent removed under reduced pressure to afford the product. The product yield was determined by $^1$H-NMR with Mesitylene as internal standard.

Yield of the exo-vinylenecarbonate after the first run: 90%
Yield of the exo-vinylenecarbonate after the first recycling: 81%

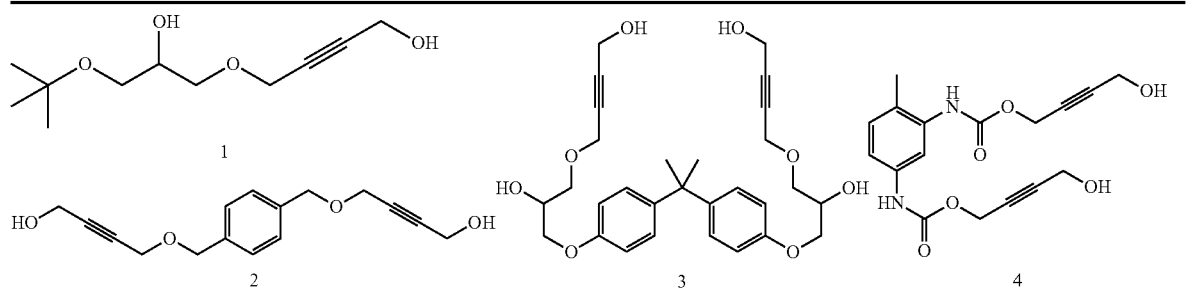

| Example | Substrate | Ligand | [Ag]/L loading/mol % | Conversion/%[b] | Mass recovery/%[c] | Selectivity Carbonate (A)/%[b] |
|---|---|---|---|---|---|---|
| 13 | | V | 1/1 | 94 | 80 | 82 |
| 14[d] | 1 | V | 2/2.5 | 99 | 88(68) | 72 |
| 15 | | W | 2/2.5 | 93 | 88 | 73 |
| 16 | 2 | V | 5/5 | 99 | 90 | 83 |
| 17[e] | | V | 2/2 | 98 | n.d. | 83 |
| 18 | 3 | V | 5/5 | 80 | 98 | 67 |
| 19 | | W | 5/5 | 70 | n.d. | 70 |
| 20 | 4 | W | 5/5 | 99 | 88 | 68 |

[a]Propargyl alcohol 1 (2.5 mmol) or bis-propargyl alcohol (2, 3 or 4: 1.0 mmol) in $CH_3CN$/cyclohexane (5:2 5 ml).
n.d. = not determined.
[b]Determined by $^1$H NMR after addition of acetone (5 mL) using mesitylene (1, 2 and 4) or 1,3,5-trimethoxybenzene (3) as internal standard.
[c]Acetonitrile product phase washed three times with cyclohexane and filtered over Celite following acidification with 1.25M methanolic HCl. Isolated yield of EVC following column chromatography in brackets.
[d]Ag partition coefficient, P = 10.4.
[e]Ag partition coefficient P = 4.8.

Yield of the exo-vinylenecarbonate after the first recycling: 71%

The invention claimed is:

1. A process for preparing at least one cyclic carbonate I selected from the group consisting of
a compound of formula Ia, a compound of formula Ib, a mixture of the compound of formula Ia and the compound of formula Ib, and a compound of formula I-bis;

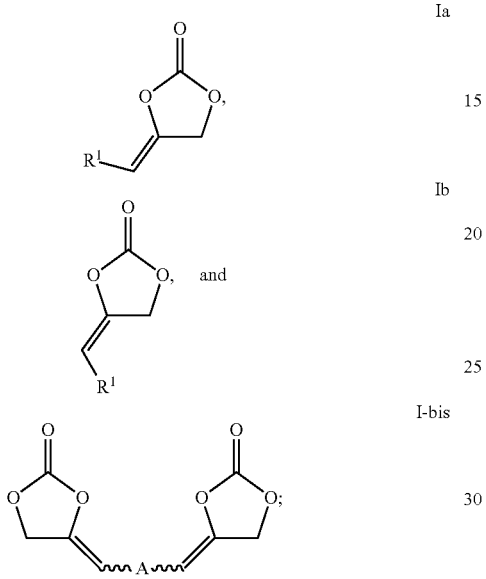

wherein
A is a bridging group selected from the group consisting of:
—CH$_2$—O—CH$_2$-1,4-phenylene-CH$_2$—O—CH$_2$—;
—CH$_2$—O—C(=O)—NH—1,4-toluylene-NH—C(=O)—O—CH$_2$—; —CH$_2$—O—CH$_2$—CH(OH)—CH$_2$—O—(CH$_2$)—O—CH—CH(OH)—CH$_2$—O—CH$_2$—; —CH$_2$—O—CH$_2$—CH(OH)—CH$_2$—O-1,4-phenylene-C(CH$_3$)$_2$-1,4-phenylene-O—CH$_2$—CH(OH)—CH$_2$—O—CH$_2$—; and —CH$_2$—(OCH$_2$CH$_2$)$_3$—O—CH$_2$—; and
is —CH$_2$—O—R$^{14}$,
wherein
R$^{14}$ is selected from the group consisting of hydrogen; C$_1$-C$_4$-alkyl carrying 1, 2, or 3 radicals R$^{15}$; —C(=O)R$^{16}$, and C$_3$-C$_6$-cycloalkyl carrying 1, 2, or 3 radicals R$^{17}$;
wherein
R$^{15}$ is selected from the group consisting of OH, C$_1$-C$_4$-alkoxy, phenyl, and a 3-, 4-, 5-, or 6-membered saturated heterocyclic ring containing 1 or 2 oxygen atoms as ring member;
R$^{16}$ is selected from the group consisting of C$_1$-C$_6$-alkyl, C$_2$-C$_6$-alkenyl, C$_1$-C$_4$-alkoxy, and —NR$^{18}$R$^{19}$, wherein R$^{18}$ is hydrogen or C$_1$-C$_4$-alkyl and R$^{19}$ is selected from the group consisting of hydrogen, C$_1$-C$_4$-alkyl, C$_1$-C$_4$-alkyl substituted by a group R$^{20}$, and phenyl which may carry 1, 2, 3, 4, or 5 substituents selected from the group consisting of C$_1$-C$_4$-alkyl and C$_1$-C$_4$-alkoxy;
wherein
R$^{20}$ is selected from the group consisting of —O—R$^{21}$, —N(R$^{13}$)—R$^{21}$, —O—C(=O)—R$^{21}$, —C(=O)—O—R$^{21}$, —N(R$^{13}$)—C(=O)—R$^{21}$—C(=O)—N(R$^{13}$)—R$^{21}$, —O—C(=O)—O—R$^{21}$, —O—C(=O)—N(R$^{13}$)—R$^{21}$—N(R$^{13}$)—C(=O)—O—R$^{21}$, and —N(R$^{13}$)—C(=O)—N(R$^{13}$)—R$^{21}$, wherein each R$^{21}$ is independently hydrogen, C$_1$-C$_6$-alkyl, or C$_2$-C$_6$-alkenyl, and wherein each R$^{13}$ is independently hydrogen or C$_1$-C$_{10}$-alkyl; and R$^{17}$ is selected from the group consisting of —O—R$^{21}$, —N(R$^{13}$)—R$^{21}$—O—C(=O)—R$^{21}$, —C(=O)—O—R$^{21}$, —N(R$^{13}$)—C(=O)—R$^{21}$, —C(=O)—N(R$^{13}$)—R$^{21}$, —O—C(=O)—O—R$^{21}$, —O—C(=O)—N(R$^{13}$)—R$^{21}$, —N(R$^{13}$)—C(=O)—O—R$^{21}$, and —N(R$^{13}$)—C(=O)—N(R$^{13}$)—R$^{21}$, wherein each R$^{21}$ is independently hydrogen, C$_1$-C$_6$-alkyl, or C$_2$-C$_6$-alkenyl, and wherein each R$^{13}$ is independently hydrogen or C$_1$-C$_{10}$-alkyl; and the process comprising;
a) reacting a proparoyl alcohol with carbon dioxide, to obtain a reaction mixture,
wherein, if the at least one cyclic carbonate I is the compound of formula Ia, the compound of formula Ib, or the mixture of the compound of formula Ia and the compound of formula Ib, the propargyl alcohol is a compound of formula II

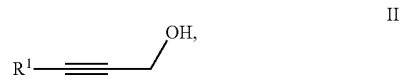

wherein R$^1$ is as defined above,
or
if the at least one cyclic carbonate I is the compound of the formula I-bis,
the propargyl alcohol is the compound of the formula II, in which R$^1$ is —CH$_2$—O—R$^{14}$, wherein R$^{14}$ is as defined above, or the propargyl alcohol is a compound of the formula II-bis

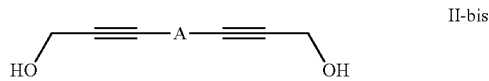

wherein A is as defined above;
wherein the reaction is carried out in at least one organic solvent L1 or in a solvent mixture containing the at least one organic solvent L1 and at least one organic solvent L2; wherein the at least one organic solvent L1 has a higher polarity than the at least one organic solvent L2, and wherein the at least one organic solvent L1 and the at least one organic solvent L2 have a miscibility gap at least between 2° and 30° C.;
wherein the reaction is carried out in the presence of a silver catalyst Ag1 comprising at least one bulky ligand and a carboxylate ligand,
wherein the at least one bulky ligand is at least one selected from the group consisting of a compound of formulae A to W and a mixture thereof:

A
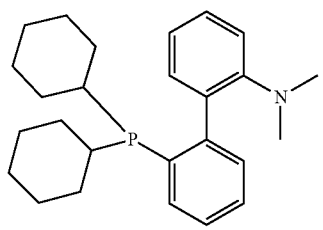
B
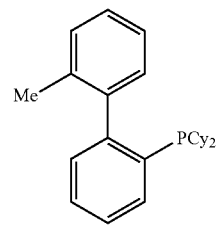
C
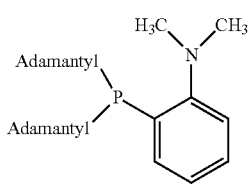
D
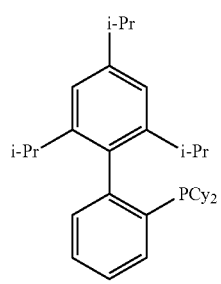
E
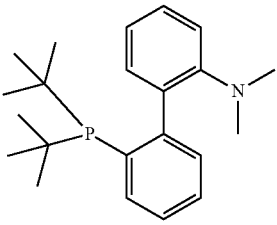
F
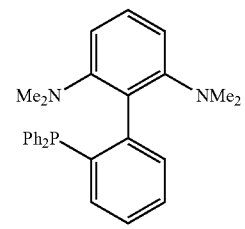
G
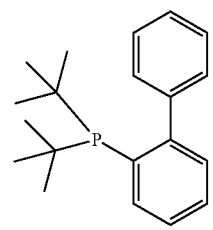
H
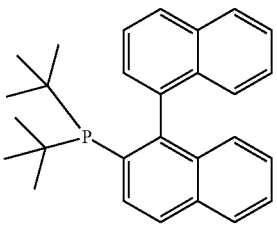
I
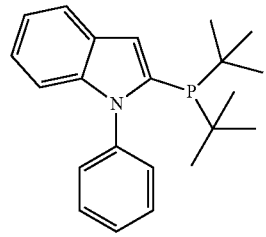
J
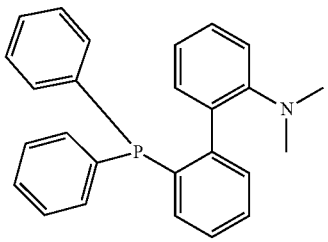
K
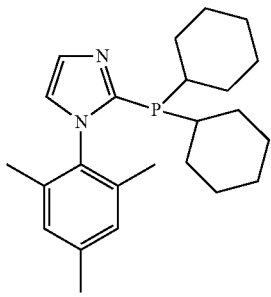
L
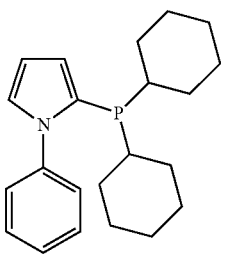
M
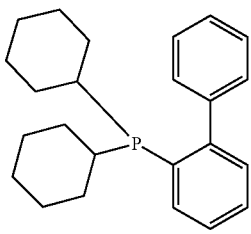

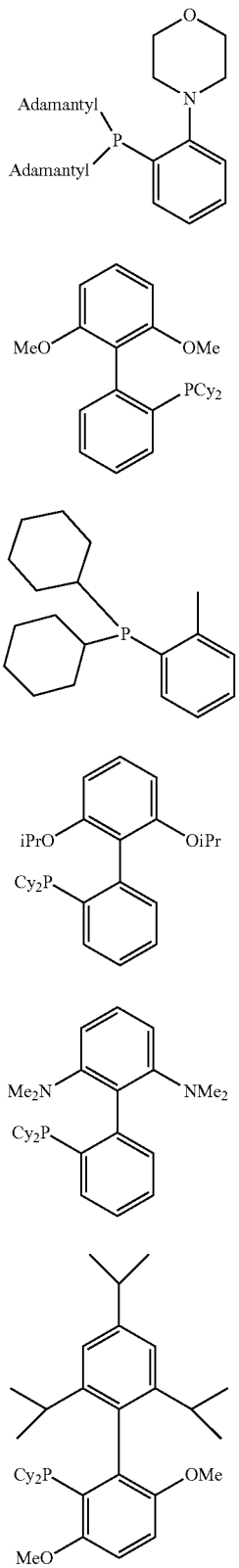

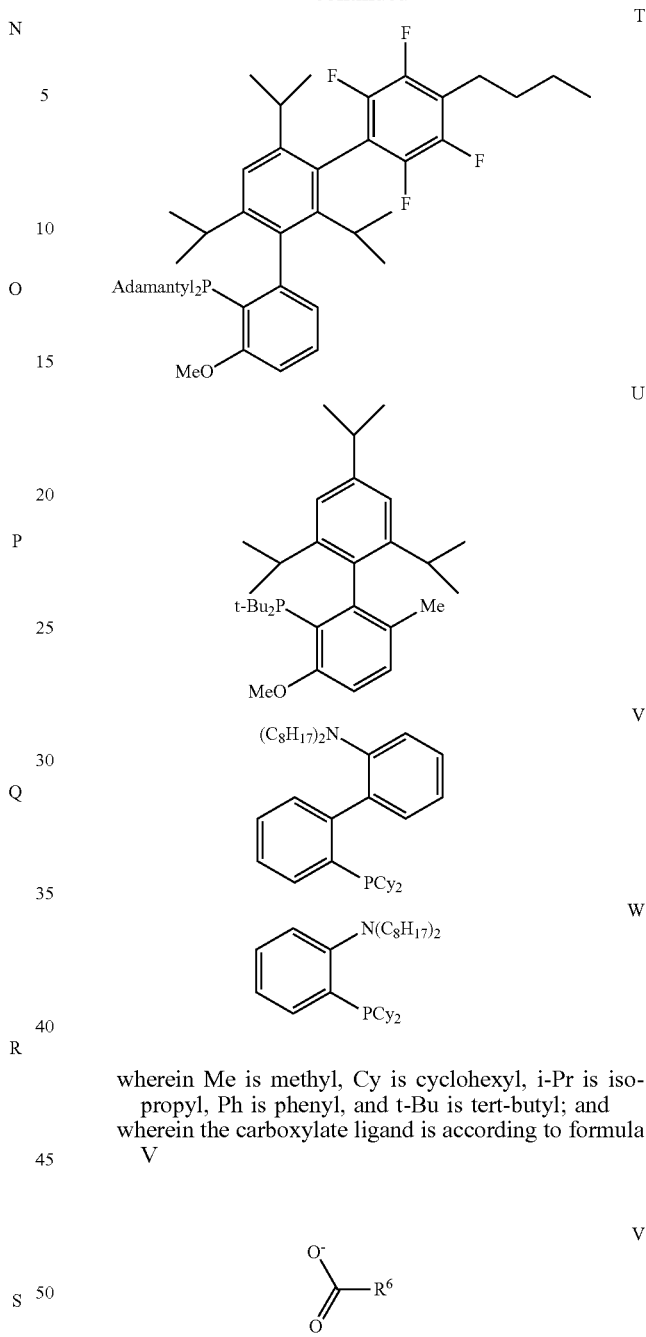

wherein Me is methyl, Cy is cyclohexyl, i-Pr is isopropyl, Ph is phenyl, and t-Bu is tert-butyl; and
wherein the carboxylate ligand is according to formula V wherein
R$^6$ is selected from the group consisting of $C_8$-$C_{18}$-alkyl and $C_2$-$C_4$-alkyl carrying a cyclohexyl ring;
b1) in case that a) has not been carried out in the presence of the at least one solvent L2: adding the at least one solvent L2 to the reaction mixture obtained in a); or
b2) in case that a) has been carried out in the presence of the at least one solvent L2: optionally, adding an additional amount of the at least one solvent L2 to the reaction mixture obtained in a);
c) subjecting the reaction mixture obtained in a), b1), or b2) to a phase separation to obtain a product phase containing the at least one cyclic carbonate I and the at least one solvent L1, and a catalyst phase containing the silver catalyst and the at least one solvent L2; and d) if desired, isolating the at least one cyclic carbonate I from the product phase.

2. The process as claimed in claim 1, wherein the at least one cyclic carbonate I is the compound of formula Ia, the compound of formula Ib, or the mixture thereof of the compound of formula Ia and the compound of formula Ib, in which R' is —$CH_2$—O—$R^{14}$, wherein $R^{14}$ is —$CH_2$—CH(OH)—$CH_2$—O—$C(CH_3)_3$; and wherein the propargyl alcohol is the compound of the formula II, in which R' is —$CH_2$—O—$R^{14}$, wherein $R^{14}$ is —$CH_2$—CH(OH)—$CH_2$—O—$C(CH_3)_3$.

3. The process as claimed in claim 1, wherein the silver catalyst Ag1 is used in a) in an amount of from 0.001 to 50 mol %, based on an amount of the propargylic alcohol of the formula II.

4. The process as claimed in claim 1, wherein the at least one solvent L1 is a polar aprotic solvent with a dipole moment of at least $10 \cdot 10^{-30}$ C·m; and the at least one solvent L2 is a non-polar solvent with a dipole moment of at most $2 \cdot 10^{-30}$ C·m.

5. The process as claimed in claim 1, wherein the at least one solvent L1 is at least one selected from the group consisting of an amide, a urea, a nitrile, a sulfoxide, a sulfone, a carbonate, a nitro compound, and a mixture thereof, and wherein the at least one solvent L2 is at least one selected from the group consisting of an alkane, a cycloalkane, a $C_1$-$C_2$-alkyl ester of a $C_{12}$-$C_{20}$-fatty acid, and a mixture thereof.

6. The process as claimed in claim 5, wherein the at least one solvent L1 is acetonitrile and the at least one solvent L2 is at least one selected from the group consisting of a $C_5$-$C_{14}$-alkane, a $C_5$-$C_8$-cycloalkane which may carry a $C_1$-$C_2$-alkyl substituent, and a $C_1$-$C_2$-alkyl ester of a saturated $C_{12}$-$C_{20}$ fatty acid; or wherein the at least one solvent L1 is dimethylformamide and the at least one solvent L2 is at least one selected from the group consisting of a $C_5$-$C_{14}$-alkane, a $C_5$-$C_8$-cycloalkane which may carry a $C_1$-$C_2$-alkyl substituent, and a $C_1$-$C_2$-alkyl ester of a saturated $C_{12}$-$C_{20}$ fatty acid.

7. The process as claimed in claim 5, wherein the at least one solvent L1 is a polar aprotic solvent and is at least one selected from the group consisting of formamide, N-methylformamide, N,N-dimethylformamide, N,N-dimethylacetamide, tetramethylurea, N,N-dimethylimidazolinone, N,N-dimethylpropyleneurea, acetonitrile, propionitrile, benzonitrile, dimethylsulfoxide, sulfolane, dimethylcarbonate, diethylcarbonate, ethylene carbonate, propylene carbonate, nitromethane, nitrobenzene, and a mixture thereof; and wherein the at least one solvent L2 is at least one selected from the group consisting of a $C_5$-$C_{15}$-alkane, a $C_5$-$C_8$-cycloalkane which may carry a $C_1$-$C_2$-alkyl substituent, a $C_1$-$C_2$-alkyl ester of a $C_{12}$-$C_{20}$ fatty acid, and a mixture thereof.

8. The process as claimed in claim 7, wherein the at least one solvent L1 is acetonitrile and the at least one solvent L2 is cyclohexane or decane.

9. The process as claimed in claim 1, wherein a) is carried out at a pressure in a range of from 0.1 to 200 bar, and at a temperature in a range of from 0 to 100° C.

10. The process as claimed in claim 1, wherein in c) the at least one solvent L1 and the at least one solvent L2 are present in an overall weight ratio of from 80:20 to 20:80.

* * * * *